US012640975B2

(12) United States Patent
MolavianJazi et al.

(10) Patent No.: US 12,640,975 B2
(45) Date of Patent: May 26, 2026

(54) TIME DIVISION DUPLEX FOR NETWORK CONTROLLED REPEATERS

(71) Applicant: Samsung Electronics Co., Ltd., Suwon-si (KR)

(72) Inventors: Ebrahim MolavianJazi, San Jose, CA (US); Aristides Papasakellariou, Houston, TX (US); Marian Rudolf, Longueuil (CA)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/883,944

(22) Filed: Sep. 12, 2024

(65) Prior Publication Data

US 2025/0112813 A1 Apr. 3, 2025

Related U.S. Application Data

(60) Provisional application No. 63/541,190, filed on Sep. 28, 2023.

(51) Int. Cl.
 H04B 3/36 (2006.01)
 H04B 7/17 (2006.01)
 (Continued)

(52) U.S. Cl.
 CPC ....... H04L 27/2656 (2013.01); H04W 52/146 (2013.01); H04W 72/0446 (2013.01)

(58) Field of Classification Search
 CPC . H04L 27/2656; H04L 5/0094; H04L 5/1469; H04L 5/0044; H04L 5/14;
 (Continued)

(56) References Cited

U.S. PATENT DOCUMENTS

2013/0016649 A1* 1/2013 Damnjanovic ....... H04W 88/04
 370/315
2022/0399984 A1* 12/2022 Luo .......................... H04L 5/14
 (Continued)

FOREIGN PATENT DOCUMENTS

WO 2023170525 A1 9/2023

OTHER PUBLICATIONS

International Search Report and Written Opinion issued Jan. 10, 2025 regarding International Application No. PCT/KR2024/014611, 8 pages.
 (Continued)

*Primary Examiner* — Phuong Phu

(57) ABSTRACT

Apparatuses and methods for time-division duplex (TDD) for network controlled repeaters (NCRs). A method for an NCR includes identifying, by an NCR mobile termination (NCR-MT) entity, information for first TDD uplink-down-link (UL-DL) patterns for a first cell associated with an NCR control link (C-link) and information for second TDD UL-DL patterns for a second cell associated with an NCR backhaul link (BH-link). The method further includes receiving, by the NCR-MT entity on the NCR C-link, downlink signals or channels on the first cell in first down-link or flexible symbols or slots of the first TDD UL-DL patterns and receiving, by an NCR forwarding (NCR-Fwd) entity on the NCR BH-link, radio frequency signals on the second cell in second downlink or flexible symbols or slots of the second TDD UL-DL patterns. The first and second cells are associated with different carrier frequencies. The first and second TDD UL-DL patterns are different.

20 Claims, 22 Drawing Sheets

(51) Int. Cl.
| | |
|---|---|
| *H04L 25/20* | (2006.01) |
| *H04L 25/52* | (2006.01) |
| *H04L 27/26* | (2006.01) |
| *H04W 52/14* | (2009.01) |
| *H04W 72/0446* | (2023.01) |

(58) Field of Classification Search
CPC .......... H04L 27/26025; H04W 52/146; H04W 72/0446; H04W 88/04; H04W 52/243; H04W 72/231; H04W 16/28; H04B 7/15528
USPC ......................................... 375/211, 138, 260
See application file for complete search history.

(56) References Cited

U.S. PATENT DOCUMENTS

| | | | |
|---|---|---|---|
| 2023/0209510 A1* | 6/2023 | Iwabuchi .............. | H04L 5/0044 |
| | | | 370/329 |
| 2023/0283348 A1 | 9/2023 | MolavianJazi et al. | |
| 2023/0283358 A1 | 9/2023 | Rudolf et al. | |
| 2025/0047545 A1* | 2/2025 | Tian ...................... | H04L 5/1469 |
| 2025/0113213 A1* | 4/2025 | MolavianJazi ....... | H04W 16/28 |
| 2025/0113315 A1* | 4/2025 | MolavianJazi ... | H04L 27/26025 |
| 2025/0113341 A1* | 4/2025 | MolavianJazi .... | H04B 7/15528 |
| 2025/0167874 A1* | 5/2025 | Zhu ...................... | H04W 72/231 |
| 2025/0212185 A1* | 6/2025 | Wang .................... | H04L 5/0094 |
| 2025/0374070 A1* | 12/2025 | Novlan .............. | H04W 52/243 |

OTHER PUBLICATIONS

Cewit et al., "Discussion on signaling side control information and NCR behaviour", 3GPP TSG RAN WG1 Meeting #112, R1-2301145, Feb. 2023, 10 pages.

Lenovo, "Discussion on side control information and NCR behavior", 3GPP TSG RAN WG1 #112, R1-2300920, Feb. 2023, 8 pages.

"5G; NR; Physical channels and modulation (3GPP TS 38.211 version 17.4.0 Release 17)", ETSI TS 138 211 V17.4.0, Jan. 2023, 141 pages.

"5G; NR; Multiplexing and channel coding (3GPP TS 38.212 version 17.4.0 Release 17)", ETSI TS 138 212 V17.4.0, Jan. 2023, 206 pages.

"5G; NR; Physical layer procedures for control (3GPP TS 38.213 version 17.4.0 Release 17)", ETSI TS 138 213 V17.4.0, Jan. 2023, 263 pages.

"5G; NR; Physical layer procedures for data (3GPP TS 38.214 version 17.4.0 Release 17)", ETSI TS 138 214 V17.4.0, Jan. 2023, 236 pages.

"3rd Generation Partnership Project; Technical Specification Group Radio Access Network; NR; Physical layer measurements (Release 17)", 3GPP TS 38.215 V17.4.0, Dec. 2023, 27 pages.

"5G; NR; Medium Access Control (MAC) protocol specification (3GPP TS 38.321 version 17.3.0 Release 17)", ETSI TS 138 321 V17.3.0, Jan. 2023, 254 pages.

"3rd Generation Partnership Project; Technical Specification Group Radio Access Network; NR; Radio Resource Control (RRC) protocol specification (Release 17)", 3GPP TS 38.331 V17.2.0, Sep. 2022, 1298 pages.

"5G; NR; NR and NG-RAN Overall description; Stage-2 (3GPP TS 38.300 version 17.3.0 Release 17)", ETSI TS 138 300 V17.3.0, Jan. 2023, 213 pages.

"5G; NR; User Equipment (UE) radio access capabilities (3GPP TS 38.306 version 17.5.0 Release 17)", ETSI TS 138 306 V17.5.0, Jul. 2023, 257 pages.

"3rd Generation Partnership Project; Technical Specification Group Radio Access network; Study on NR network-controlled repeaters (Release 18)", 3GPP TR 38.867 V18.0.0, Sep. 2022, 21 pages.

"3rd Generation Partnership Project; Technical Specification Group Radio Access Network; NR; User Equipment (UE) radio transmission and reception; Part 1: Range 1 Standalone (Release 18)", 3GPP TS 38.101-1 V18.2.0, Jun. 2023, 842 pages.

"3rd Generation Partnership Project; Technical Specification Group Radio Access Network; NR; User Equipment (UE) radio transmission and reception; Part 2: Range 2 Standalone (Release 18)", 3GPP TS 38.101-2 V18.2.0, Jun. 2023, 226 pages.

"3rd Generation Partnership Project; Technical Specification Group Radio Access Network; NR; User Equipment (UE) radio transmission and reception; Part 3: Range 1 and Range 2 Interworking operation with other radios (Release 18)", 3GPP TS 38.101-3 V18.2.0, Jun. 2023, 1201 pages.

"3rd Generation Partnership Project; Technical Specification Group Radio Access Network; NR; NR Repeater Radio Transmission and Reception (Release 18)", 3GPP TS 38.106 V18.1.0, Jun. 2023, 87 pages.

* cited by examiner

600

700

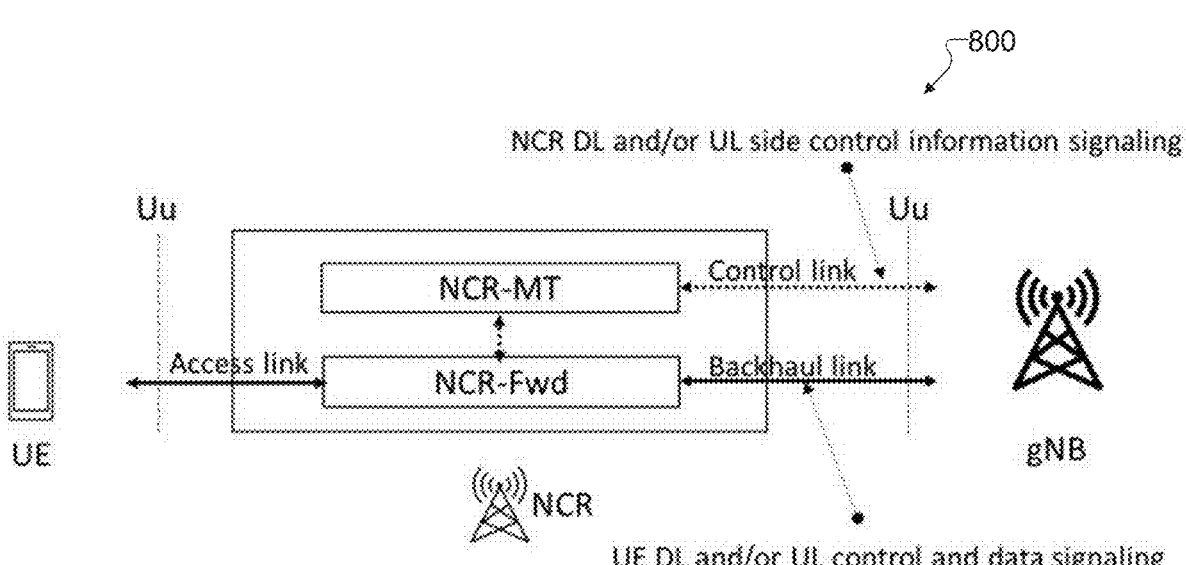
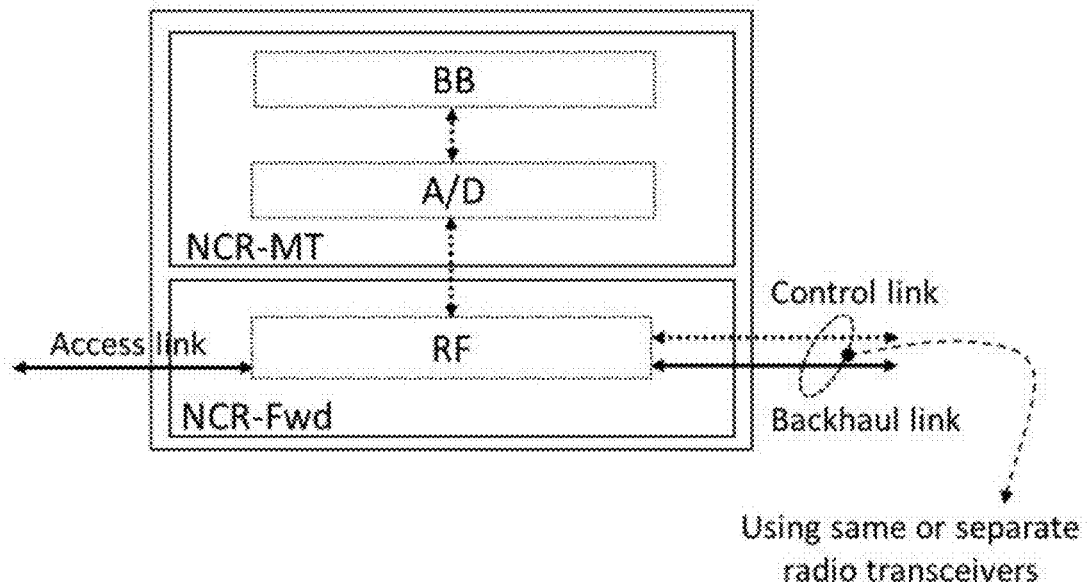
FIG. 8

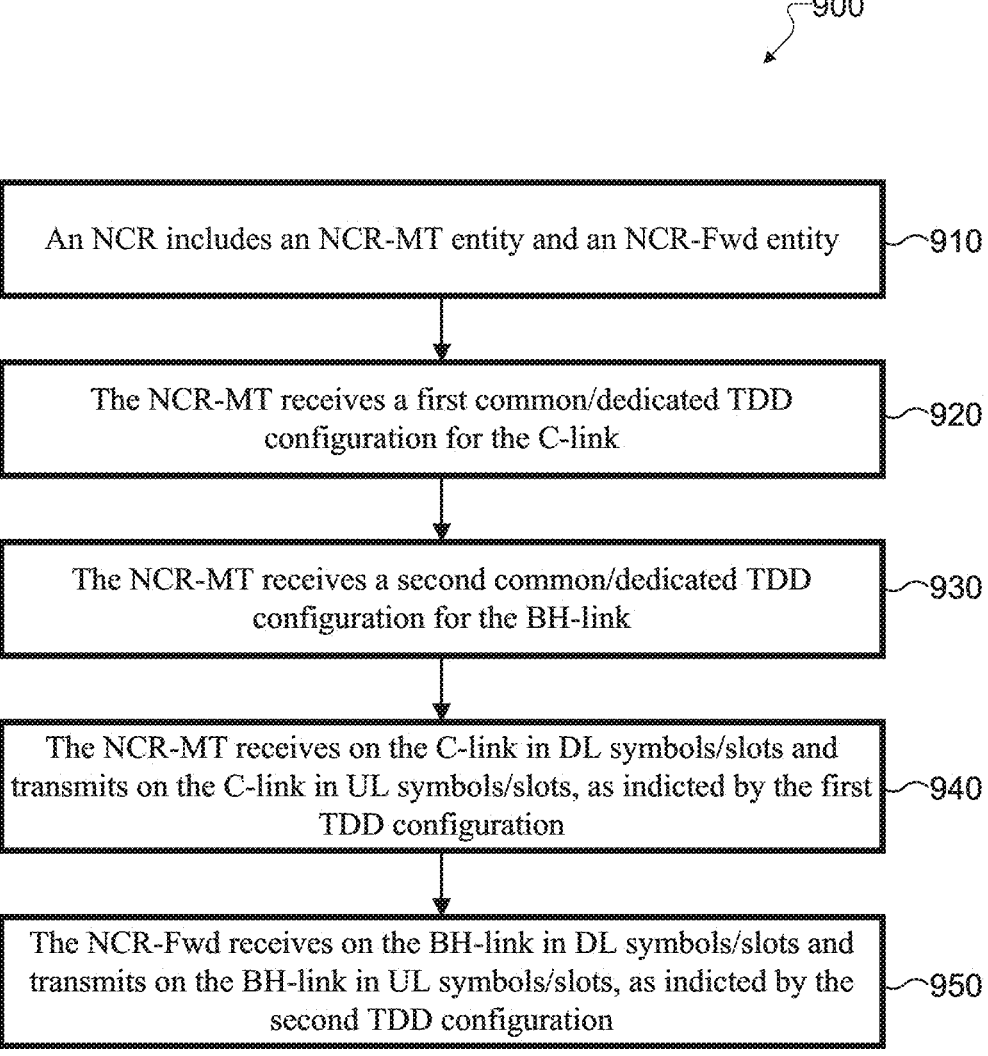

900

An NCR includes an NCR-MT entity and an NCR-Fwd entity —910

The NCR-MT receives a first common/dedicated TDD configuration for the C-link —920

The NCR-MT receives a second common/dedicated TDD configuration for the BH-link —930

The NCR-MT receives on the C-link in DL symbols/slots and transmits on the C-link in UL symbols/slots, as indicted by the first TDD configuration —940

The NCR-Fwd receives on the BH-link in DL symbols/slots and transmits on the BH-link in UL symbols/slots, as indicted by the second TDD configuration —950

FIG. 9

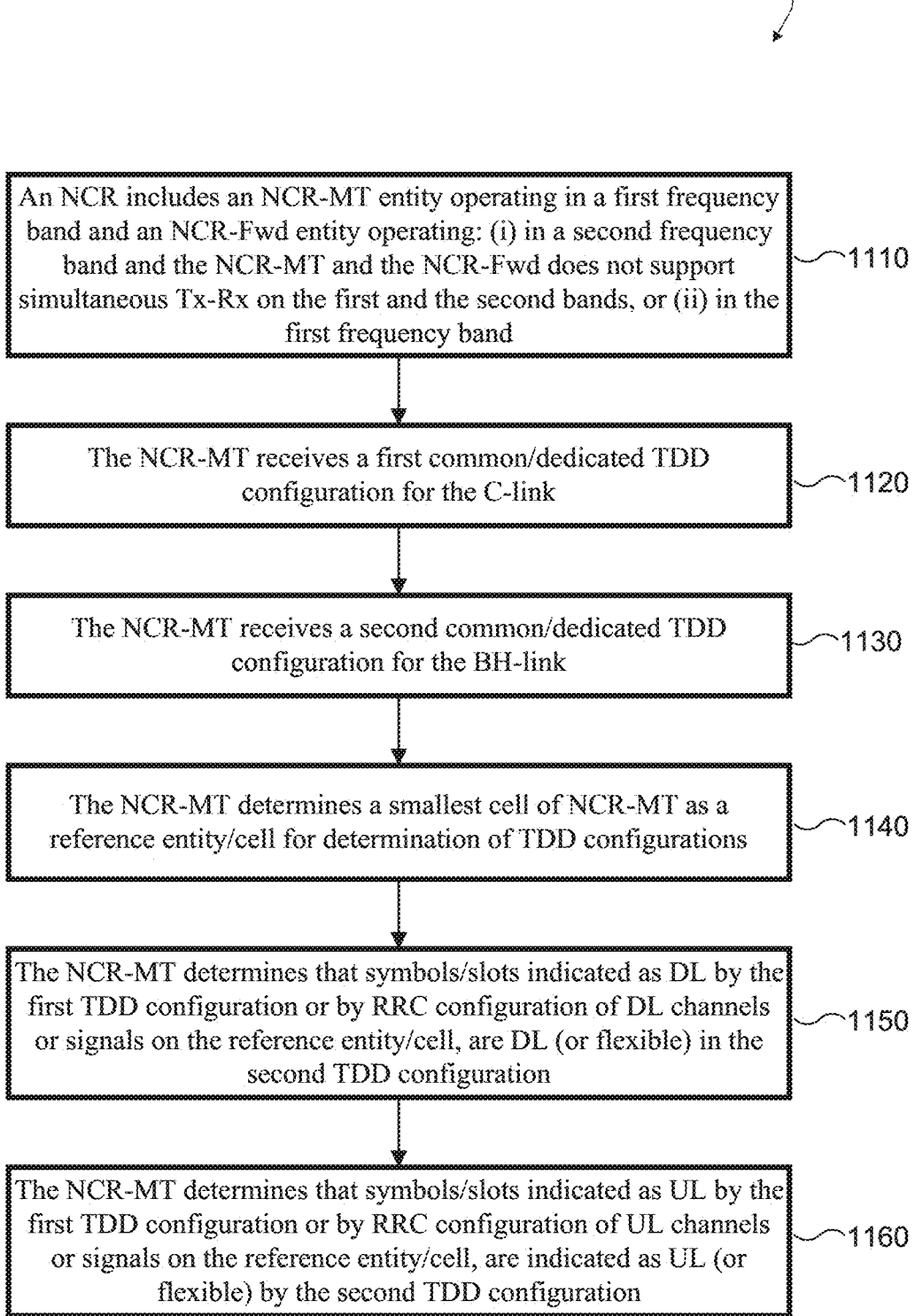

1100

An NCR includes an NCR-MT entity operating in a first frequency band and an NCR-Fwd entity operating: (i) in a second frequency band and the NCR-MT and the NCR-Fwd does not support simultaneous Tx-Rx on the first and the second bands, or (ii) in the first frequency band — 1110

The NCR-MT receives a first common/dedicated TDD configuration for the C-link — 1120

The NCR-MT receives a second common/dedicated TDD configuration for the BH-link — 1130

The NCR-MT determines a smallest cell of NCR-MT as a reference entity/cell for determination of TDD configurations — 1140

The NCR-MT determines that symbols/slots indicated as DL by the first TDD configuration or by RRC configuration of DL channels or signals on the reference entity/cell, are DL (or flexible) in the second TDD configuration — 1150

The NCR-MT determines that symbols/slots indicated as UL by the first TDD configuration or by RRC configuration of UL channels or signals on the reference entity/cell, are indicated as UL (or flexible) by the second TDD configuration — 1160

FIG. 11

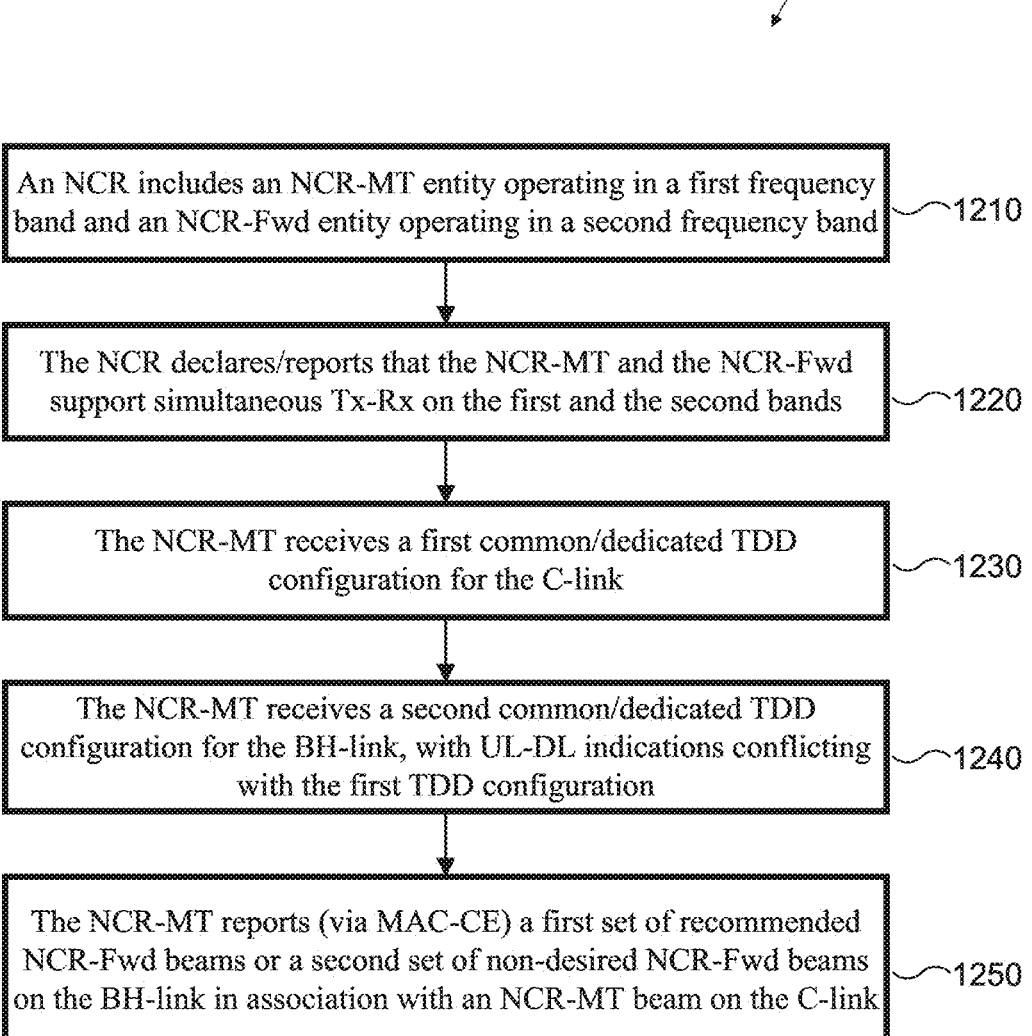

1200

An NCR includes an NCR-MT entity operating in a first frequency band and an NCR-Fwd entity operating in a second frequency band 1210

The NCR declares/reports that the NCR-MT and the NCR-Fwd support simultaneous Tx-Rx on the first and the second bands 1220

The NCR-MT receives a first common/dedicated TDD configuration for the C-link 1230

The NCR-MT receives a second common/dedicated TDD configuration for the BH-link, with UL-DL indications conflicting with the first TDD configuration 1240

The NCR-MT reports (via MAC-CE) a first set of recommended NCR-Fwd beams or a second set of non-desired NCR-Fwd beams on the BH-link in association with an NCR-MT beam on the C-link 1250

FIG. 12

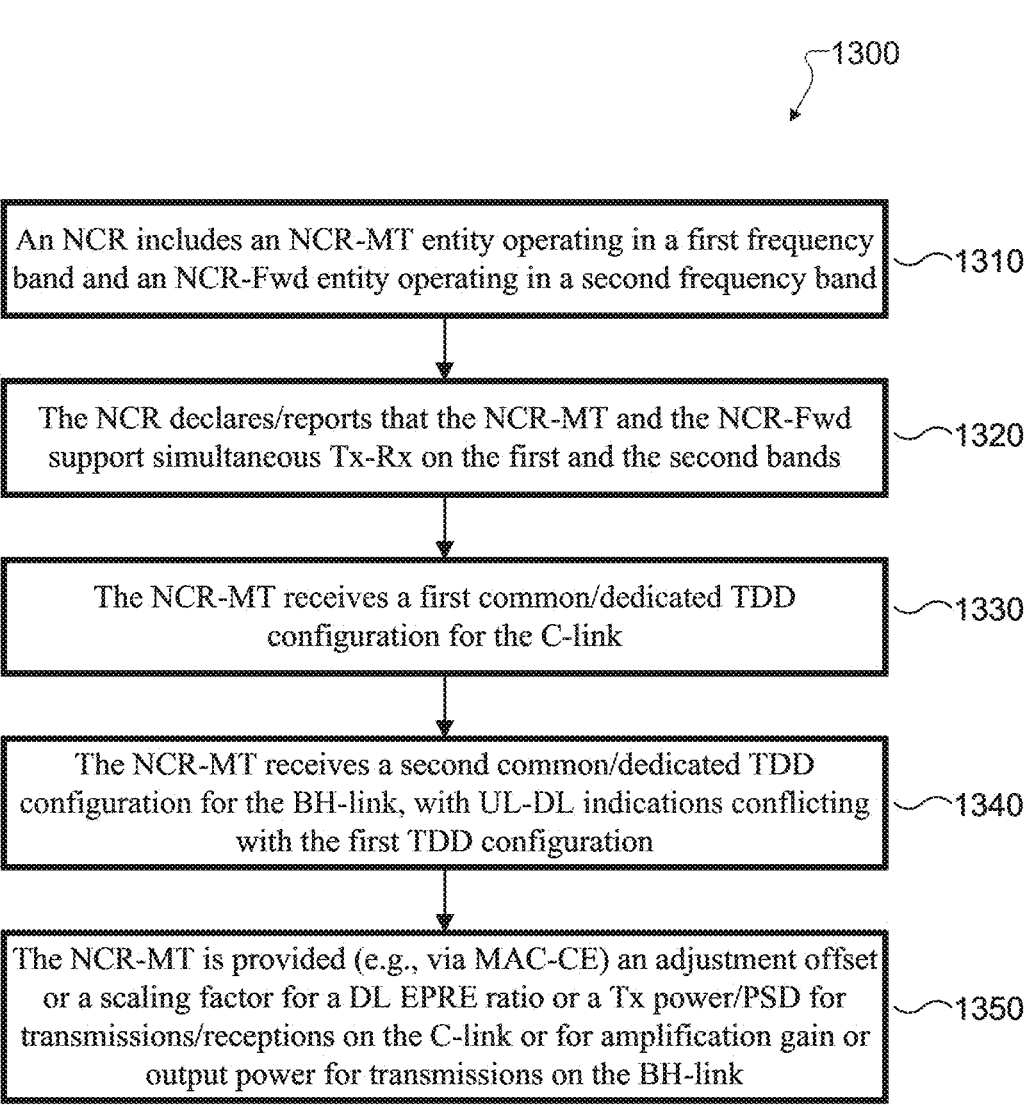

1300

An NCR includes an NCR-MT entity operating in a first frequency band and an NCR-Fwd entity operating in a second frequency band ~1310

The NCR declares/reports that the NCR-MT and the NCR-Fwd support simultaneous Tx-Rx on the first and the second bands ~1320

The NCR-MT receives a first common/dedicated TDD configuration for the C-link ~1330

The NCR-MT receives a second common/dedicated TDD configuration for the BH-link, with UL-DL indications conflicting with the first TDD configuration ~1340

The NCR-MT is provided (e.g., via MAC-CE) an adjustment offset or a scaling factor for a DL EPRE ratio or a Tx power/PSD for transmissions/receptions on the C-link or for amplification gain or output power for transmissions on the BH-link ~1350

FIG. 13

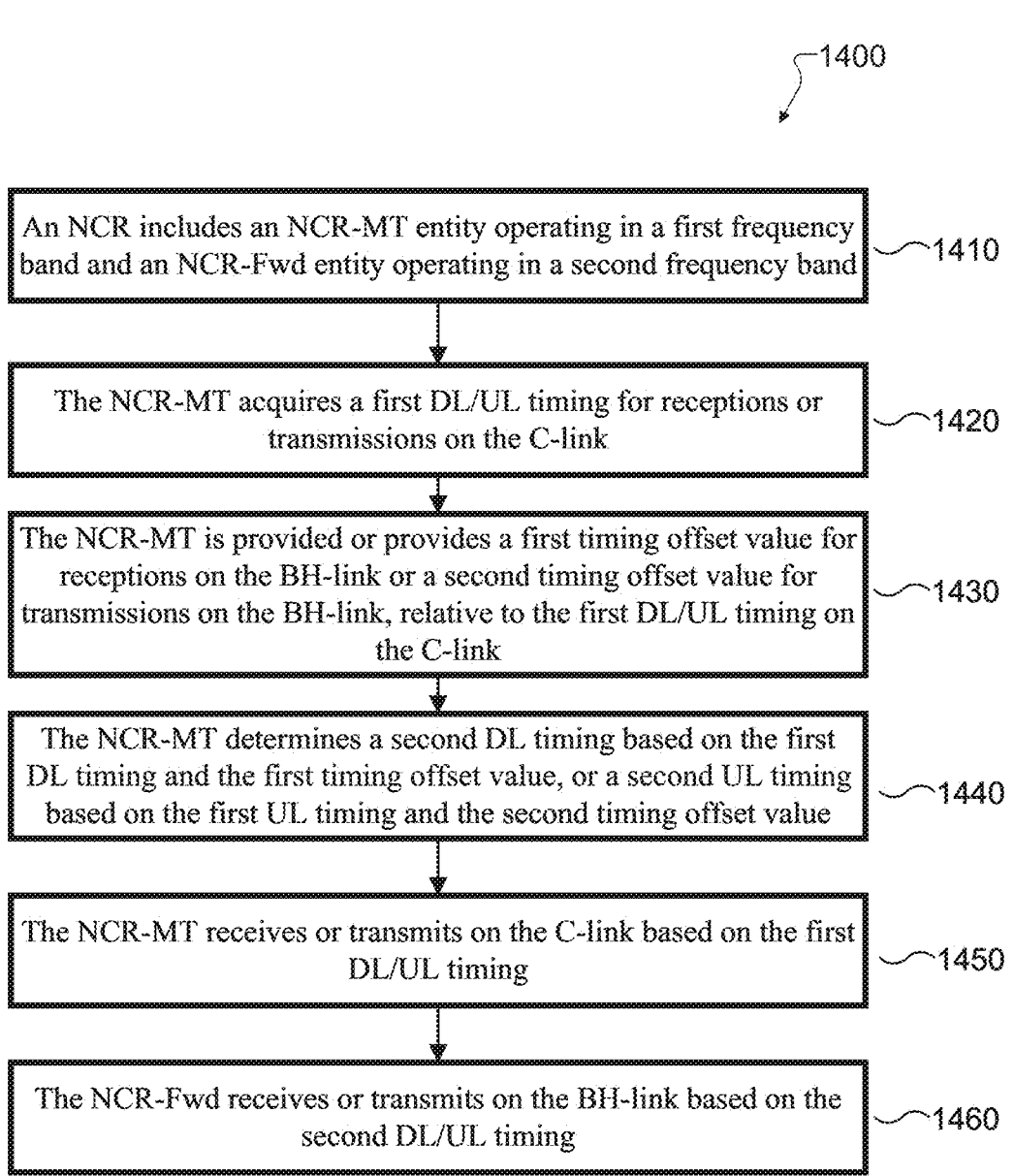

1400

An NCR includes an NCR-MT entity operating in a first frequency band and an NCR-Fwd entity operating in a second frequency band ⟋1410

The NCR-MT acquires a first DL/UL timing for receptions or transmissions on the C-link ⟋1420

The NCR-MT is provided or provides a first timing offset value for receptions on the BH-link or a second timing offset value for transmissions on the BH-link, relative to the first DL/UL timing on the C-link ⟋1430

The NCR-MT determines a second DL timing based on the first DL timing and the first timing offset value, or a second UL timing based on the first UL timing and the second timing offset value ⟋1440

The NCR-MT receives or transmits on the C-link based on the first DL/UL timing ⟋1450

The NCR-Fwd receives or transmits on the BH-link based on the second DL/UL timing ⟋1460

FIG. 14

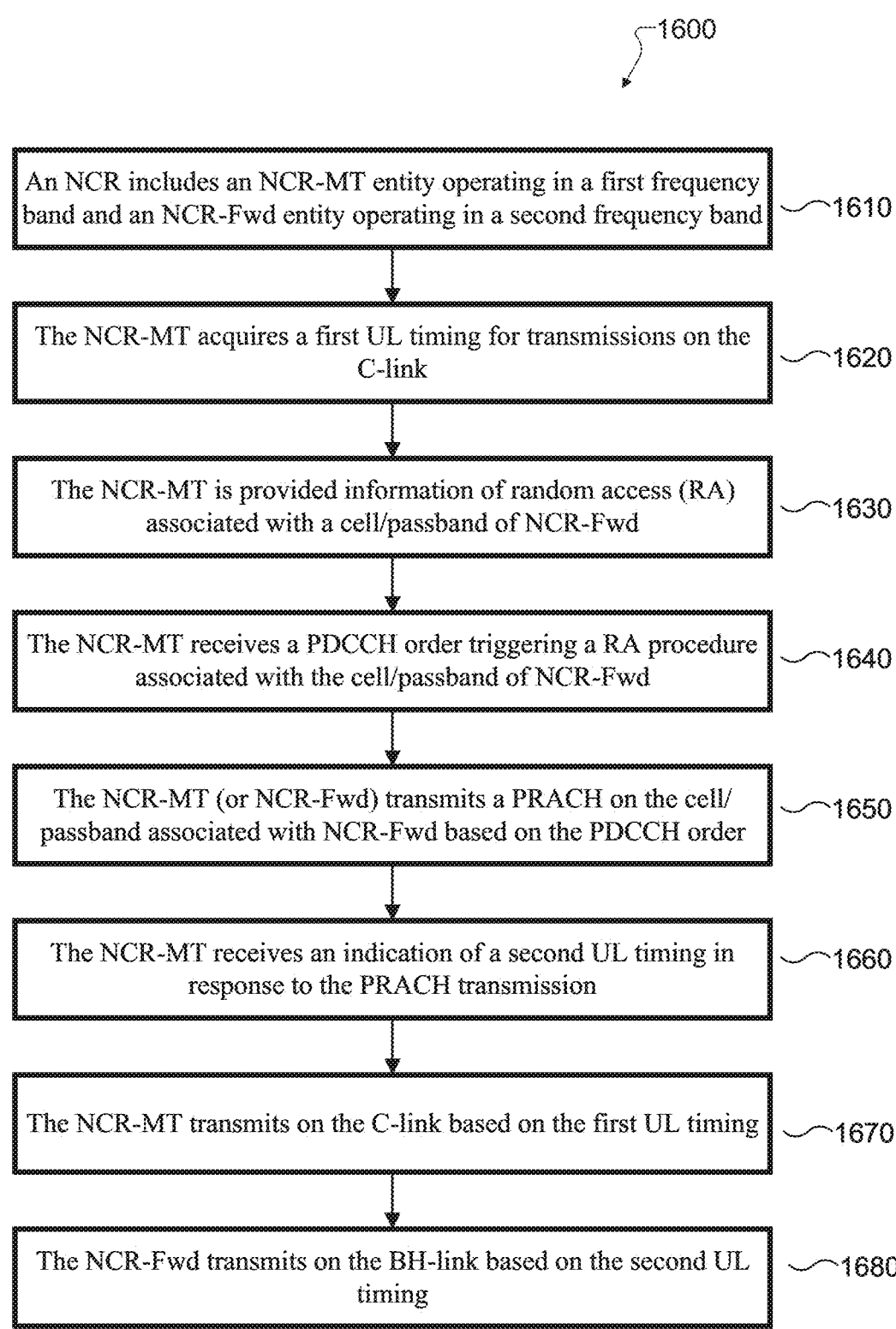

1600

An NCR includes an NCR-MT entity operating in a first frequency band and an NCR-Fwd entity operating in a second frequency band — 1610

The NCR-MT acquires a first UL timing for transmissions on the C-link — 1620

The NCR-MT is provided information of random access (RA) associated with a cell/passband of NCR-Fwd — 1630

The NCR-MT receives a PDCCH order triggering a RA procedure associated with the cell/passband of NCR-Fwd — 1640

The NCR-MT (or NCR-Fwd) transmits a PRACH on the cell/passband associated with NCR-Fwd based on the PDCCH order — 1650

The NCR-MT receives an indication of a second UL timing in response to the PRACH transmission — 1660

The NCR-MT transmits on the C-link based on the first UL timing — 1670

The NCR-Fwd transmits on the BH-link based on the second UL timing — 1680

FIG. 16

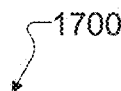

An NCR includes an NCR-MT entity operating in a first frequency band and an NCR-Fwd entity operating: (i) in a second frequency band and the NCR-MT and the NCR-Fwd does not support simultaneous Tx-Rx on the first and the second bands, or (ii) in the first frequency band    ⟋⁓1710

The NCR-MT is provided a set of TCI states or UL spatial relations for the C-link    ⟋⁓1720

The NCR-MT identifies a first TCI state or a first UL spatial relation, from the set of TCI states or UL spatial relations, as QCL properties for a first DL reception or as a spatial relation for a first UL transmission on the C-link    ⟋⁓1730

The NCR-MT identifies a second TCI state or a second UL spatial relation, from the set of TCI states or UL spatial relations for the C-link, as QCL properties for a second DL reception or as a spatial relation for a second UL transmission on the BH-link    ⟋⁓1740

The NCR-MT receives the first DL reception on the C-link based on the first TCI state, or transmits the first UL transmission on the C-link based on the first UL spatial relation    ⟋⁓1750

The NCR-Fwd receives the second DL reception on the BH-link based on the second TCI state, or transmits the second UL transmission on the BH-link based on the second UL spatial relation    ⟋⁓1760

FIG. 17

1900

An NCR includes an NCR-MT entity operating in a first frequency band and an NCR-Fwd entity operating in a second frequency band — 1910

The NCR-MT is provided a set of TCI states or UL spatial relations for the C-link — 1920

The NCR declares/reports or is provided a set of antenna beam indexes for the BH-link of NCR-Fwd — 1930

The NCR-MT identifies a first TCI state, from the set of TCI states, as QCL properties for a first DL reception on the C-link, or a first UL spatial relation, from the set of UL spatial relations, as an UL spatial relation for a first UL transmission on the C-link — 1940

The NCR-MT identifies a first beam index, from the set of antenna beam indexes, as a DL spatial filter for a second DL reception on the BH-link, or identifies a second beam index, from the set of antenna beam indexes, as an UL spatial filter for a second UL transmission on the BH-link — 1950

The NCR-MT receives the first DL reception on the C-link based on the first TCI state, or transmits the first UL transmission on the C-link based on the first UL spatial relation — 1960

The NCR-Fwd receives the second DL reception on the BH-link based on the first beam index, or transmits the second UL transmission on the BH-link based on the second beam index — 1970

FIG. 19

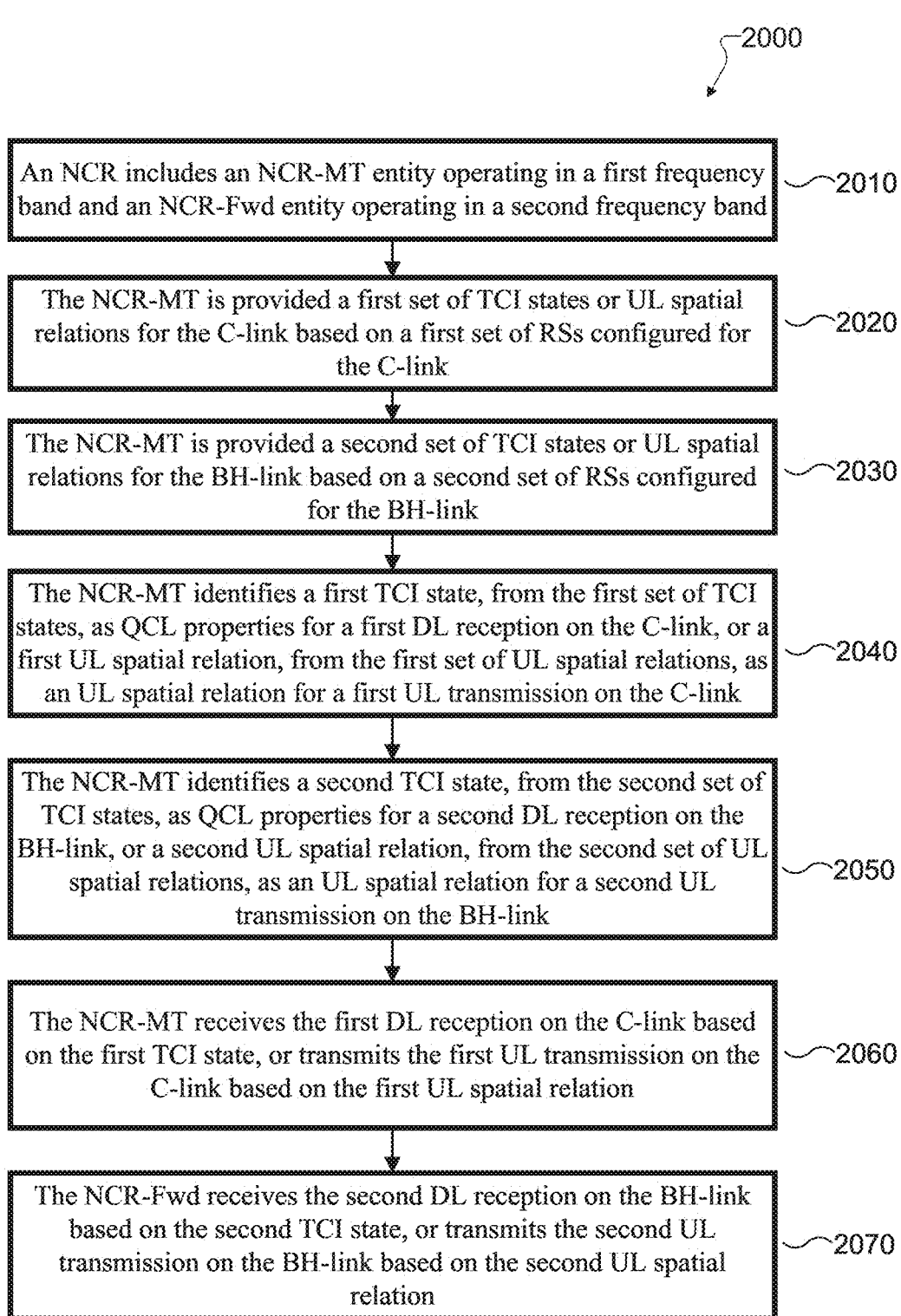

2000

An NCR includes an NCR-MT entity operating in a first frequency band and an NCR-Fwd entity operating in a second frequency band    2010

The NCR-MT is provided a first set of TCI states or UL spatial relations for the C-link based on a first set of RSs configured for the C-link    2020

The NCR-MT is provided a second set of TCI states or UL spatial relations for the BH-link based on a second set of RSs configured for the BH-link    2030

The NCR-MT identifies a first TCI state, from the first set of TCI states, as QCL properties for a first DL reception on the C-link, or a first UL spatial relation, from the first set of UL spatial relations, as an UL spatial relation for a first UL transmission on the C-link    2040

The NCR-MT identifies a second TCI state, from the second set of TCI states, as QCL properties for a second DL reception on the BH-link, or a second UL spatial relation, from the second set of UL spatial relations, as an UL spatial relation for a second UL transmission on the BH-link    2050

The NCR-MT receives the first DL reception on the C-link based on the first TCI state, or transmits the first UL transmission on the C-link based on the first UL spatial relation    2060

The NCR-Fwd receives the second DL reception on the BH-link based on the second TCI state, or transmits the second UL transmission on the BH-link based on the second UL spatial relation    2070

FIG. 20

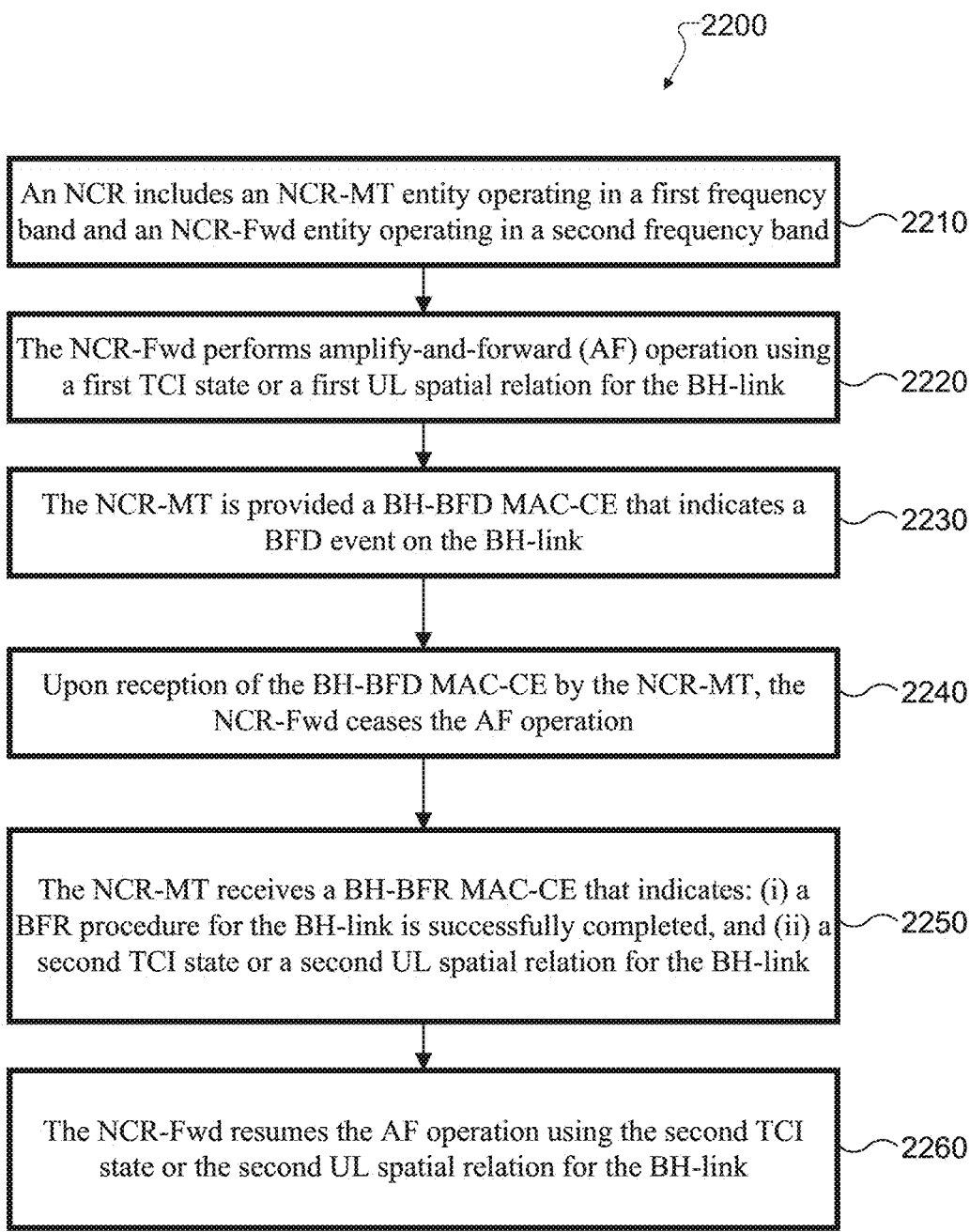

┌─ 2200

An NCR includes an NCR-MT entity operating in a first frequency band and an NCR-Fwd entity operating in a second frequency band ⟋ 2210

The NCR-Fwd performs amplify-and-forward (AF) operation using a first TCI state or a first UL spatial relation for the BH-link ⟋ 2220

The NCR-MT is provided a BH-BFD MAC-CE that indicates a BFD event on the BH-link ⟋ 2230

Upon reception of the BH-BFD MAC-CE by the NCR-MT, the NCR-Fwd ceases the AF operation ⟋ 2240

The NCR-MT receives a BH-BFR MAC-CE that indicates: (i) a BFR procedure for the BH-link is successfully completed, and (ii) a second TCI state or a second UL spatial relation for the BH-link ⟋ 2250

The NCR-Fwd resumes the AF operation using the second TCI state or the second UL spatial relation for the BH-link ⟋ 2260

FIG. 22

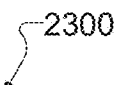
2300

An NCR includes an NCR-MT entity operating in a first frequency band and an NCR-Fwd entity operating in a second frequency band　～2310

The NCR-MT is provided a first set of RSs for the BH-link for BFD detection on the BH-link and a second set of RSs for the BH-link for candidate new beam identification for the BH-link　～2320

The NCR-Fwd performs amplify-and-forward (AF) operation using a first TCI state or a first UL spatial relation for the BH-link　～2330

The NCR-MT determines a BFD event on the BH-link based on measurements of the first set of RSs　～2340

The NCR-Fwd ceases the AF operation　～2350

The NCR-MT determines a second TCI state or a second UL spatial relation for the BH-link, associated with an RS from the second set of RSs, and successfully completes the BFR procedure for the BH-link　～2360

The NCR-Fwd resumes the AF operation using the second TCI state or the second UL spatial relation for the BH-link　～2370

FIG. 23

TIME DIVISION DUPLEX FOR NETWORK CONTROLLED REPEATERS

CROSS-REFERENCE TO RELATED AND CLAIM OF PRIORITY

The present application claims priority under 35 U.S.C. § 119(e) to U.S. Provisional Patent Application No. 63/541, 190 filed on Sep. 28, 2023, which is hereby incorporated by reference in its entirety.

TECHNICAL FIELD

The present disclosure relates generally to wireless communication systems and, more specifically, the present disclosure is related to apparatuses and methods for time-division duplex (TDD) for network controlled repeaters (NCRs).

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage are of paramount importance. To meet the demand for wireless data traffic having increased since deployment of 4G communication systems, and to enable various vertical applications, 5G communication systems have been developed and are currently being deployed.

SUMMARY

The present disclosure relates to TDD for NCRs.

In one embodiment, a method for an NCR is provided. The method includes identifying, by an NCR mobile termination (NCR-MT) entity, first information for first time-division duplex (TDD) uplink-downlink (UL-DL) patterns for a first cell associated with an NCR control link (C-link) and second information for second TDD UL-DL patterns for a second cell associated with an NCR backhaul link (BH-link). The method further includes receiving, by the NCR-MT entity on the NCR C-link, downlink signals or channels on the first cell in first downlink (D) or flexible (F) symbols or slots of the first TDD UL-DL patterns and receiving, by an NCR forwarding (NCR-Fwd) entity on the NCR BH-link, radio frequency (RF) signals on the second cell in second D or F symbols or slots of the second TDD UL-DL patterns. The first cell is associated with a first carrier frequency. The second cell is associated with a second carrier frequency. The first carrier frequency is different from the second carrier frequency. The first TDD UL-DL patterns are different from the second TDD UL-DL patterns.

In another embodiment, an NCR is provided. The NCR includes a processor of an NCR-MT entity configured to identify first information for first TDD UL-DL patterns for a first cell associated with an NCR C-link and second information for second TDD UL-DL patterns for a second cell associated with an NCR BH-link. The NCR further includes a transceiver of the NCR-MT entity operably coupled with the processor of the NCR-MT entity. The transceiver of the NCR-MT entity is configured to receive, on the NCR C-link, downlink signals or channels on the first cell in first D or F symbols or slots of the first TDD UL-DL patterns. The NCR further includes a transceiver of an NCR-Fwd entity operably coupled with the processor of the NCR-MT entity. The transceiver of the NCR-Fwd entity is configured to receive, on the NCR BH-link, RF signals on the second cell in second D or F symbols or slots of the second TDD UL-DL patterns. The first cell is associated with a first cater frequency. The second cell is associated with a second carrier frequency. The first carrier frequency is different from the second carrier frequency. The first TDD UL-DL patterns are different from the second TDD UL-DL patterns.

In yet another embodiment, a base station is provided. The base station includes a processor configured to identify first information for first TDD UL-DL patterns for a first cell associated with a C-link of a NCR and second information for second TDD UL-DL patterns for a second cell associated with a BH-link of the NCR. The base station further includes a transceiver operably coupled with the processor. The transceiver is configured to transmit, to an NCR-MT entity on the NCR C-link, downlink signals or channels on the first cell in first D or F symbols or slots of the first TDD UL-DL patterns. and transmit, to an NCR-Fwd entity on the NCR BH-link, RF signals on the second cell in second D or F symbols or slots of the second TDD UL-DL patterns. The first cell is associated with a first carrier frequency. The second cell is associated with a second carrier frequency. The first carrier frequency is different from the second carrier frequency. The first TDD UL-DL patterns are different from the second TDD UL-DL patterns.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 8 illustrates a diagram of an example functional architecture for a NCR according to embodiments of the present disclosure;

FIG. 9 illustrates a flowchart of an example NCR procedure for separate time division duplexing (TDD) configurations for network controlled repeater-mobile termination (NCR-MT) and NCR forward unit (NCR-Fwd) according to embodiments of the present disclosure;

FIG. 11 illustrates a flowchart of an example NCR procedure for determination of reference NCR entity/cell for non-conflicting TDD configuration/operation between NCR-MT and NCR-Fwd according to embodiments of the present disclosure;

FIG. 12 illustrates a flowchart of an example NCR procedure for reporting of recommended/non-desired backhaul (BH) beams according to embodiments of the present disclosure;

FIG. 13 illustrates a flowchart of an example NCR procedure for power control according to embodiments of the present disclosure;

FIG. 14 illustrates a flowchart of an example NCR procedure for synchronization signal block (SSB)-less/random access channel (RACH)-less indication of DL/UL timing according to embodiments of the present disclosure;

FIG. 16 illustrates a flowchart of an example NCR procedure for RACH-based determination of UL timing according to embodiments of the present disclosure;

FIG. 17 illustrates a flowchart of an example NCR procedure for cross-carrier beam indication for NCR-Fwd BH-beam determination according to embodiments of the present disclosure;

FIG. 19 illustrates a flowchart of an example NCR procedure for beam-index-based indication of BH-link beam according to embodiments of the present disclosure;

FIG. 20 illustrates a flowchart of an example NCR procedure for BH beam indication according to embodiments of the present disclosure;

FIG. 22 illustrates a flowchart of an example NCR procedure for gNB-based determination/indication of beam failure detection (BFD)/beam failure recovery (BFR) according to embodiments of the present disclosure; and FIG. 23 illustrates a flowchart of an example NCR procedure for NCR-based determination/indication of BFD/BFR according to embodiments of the present disclosure.

DETAILED DESCRIPTION

Figure 1:
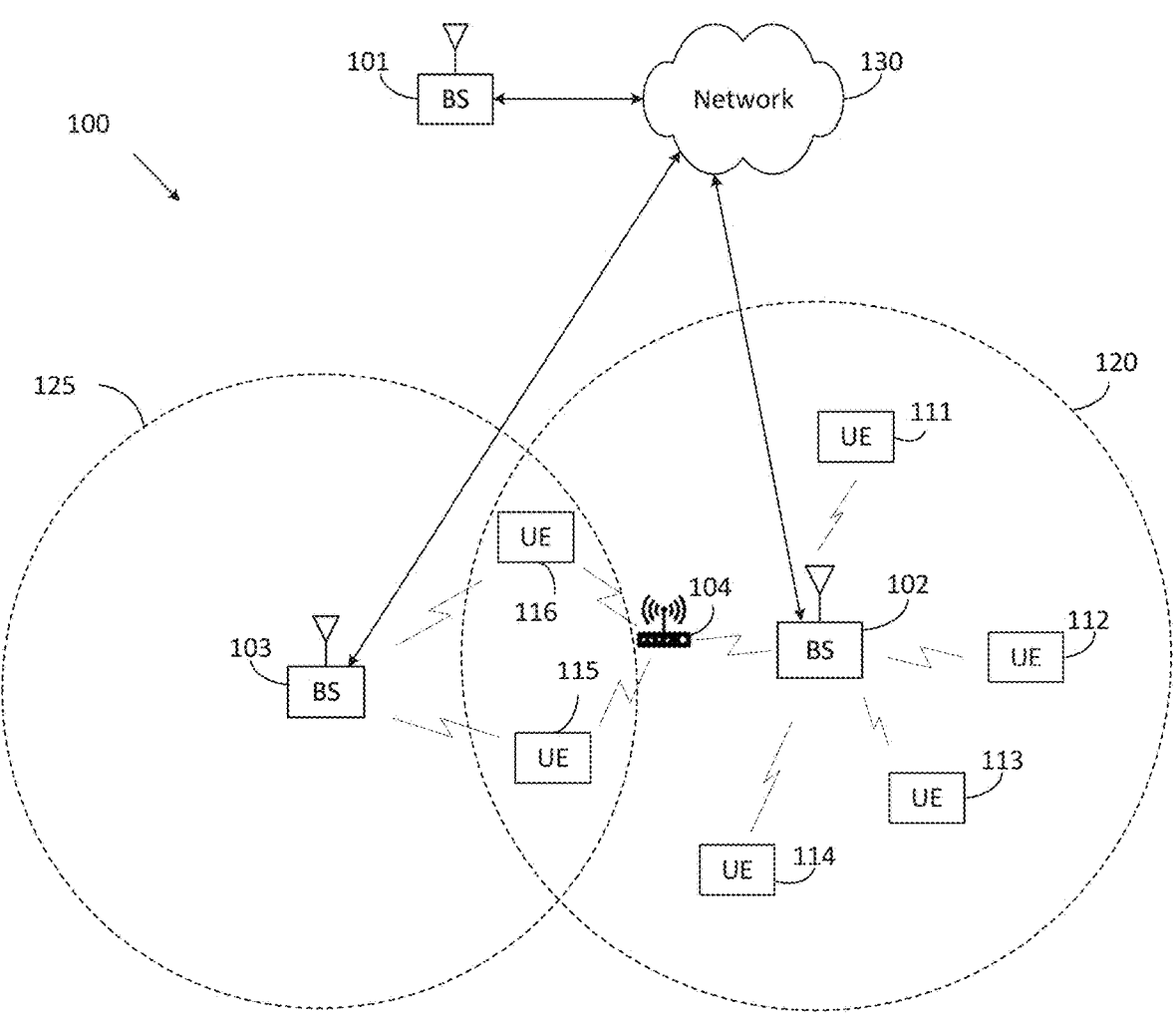
FIG. 1 illustrates an example wireless network according to embodiments of the present disclosure.

FIGS. 1-23, discussed below, and the various, non-limiting embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since deployment of 4G communication systems, and to enable various vertical applications, 5G/NR communication systems have been developed and are currently being deployed. The 5G/NR communication system is implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G, or even later releases which may use terahertz (THz) bands.

The following documents and standards descriptions are hereby incorporated by reference into the present disclosure as if fully set forth herein: [REF1]3GPP TS 38.211 v17.4.0, "NR; Physical channels and modulation"; [REF2]3GPP TS 38.212 v17.4.0, "NR; Multiplexing and channel coding"; [REF3]3GPP TS 38.213 v17.4.0, "NR; Physical layer procedures for control"; [REF4]3GPP TS 38.214 v17.4.0, "NR; Physical layer procedures for data"; [REF5]3GPP TS 38.215 v17.4.0, "NR; Physical layer measurements"; [REF6]3GPP TS 38.321 v17.3.0, "NR; Medium Access Control (MAC) protocol specification"; [REF7]3GPP TS 38.331 v17.2.0, "NR; Radio Resource Control (RRC) protocol specification"; [REF8]3GPP TS 38.300 v17.3.0, "NR; NR and NG-RAN Overall Description; Stage 2"; [REF9]3GPP TS 38.306 v17.5.0, "NR; User Equipment (UE) radio access capabilities;" [REF10]3GPP TR 38.867 Rel-18 v18.0.0, "Study on NR network-controlled repeaters (Release 18);" [REF11]3GPP TS 38.101-1, v18.2.0, "NR; User Equipment (UE) radio transmission and reception;" [REF12]3GPP TS 38.101-2, v18.2.0, "NR; User Equipment (UE) radio transmission and reception;" [REF13]3GPP TS 38.101-3, v18.2.0, "NR; User Equipment (UE) radio transmission and reception;" and [REF14]3GPP TS 38.106, v18.1.0, "NR repeater radio transmission and reception."

Figure 2:
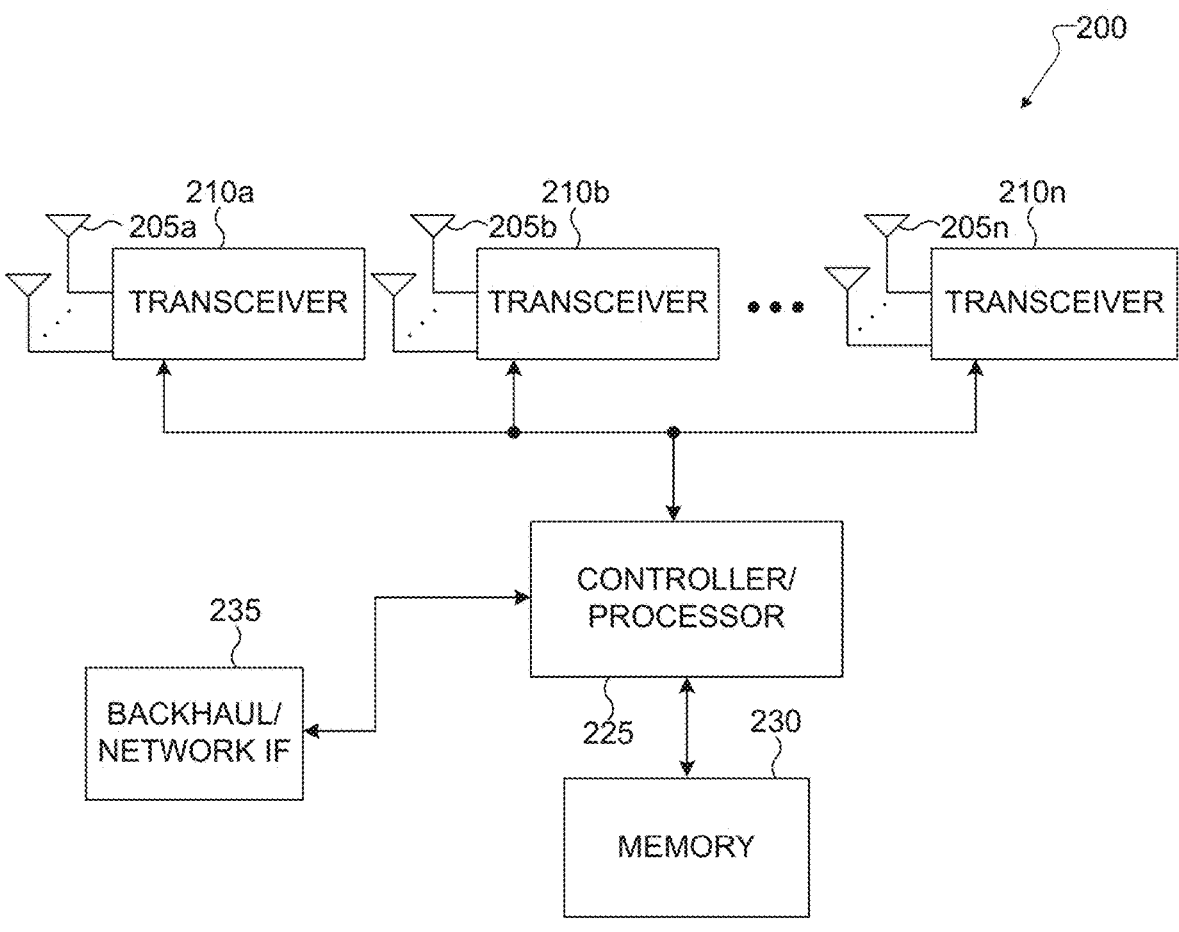
FIG. 2 illustrates an example gNodeB (gNB) according to embodiments of the present disclosure.
Figure 3:
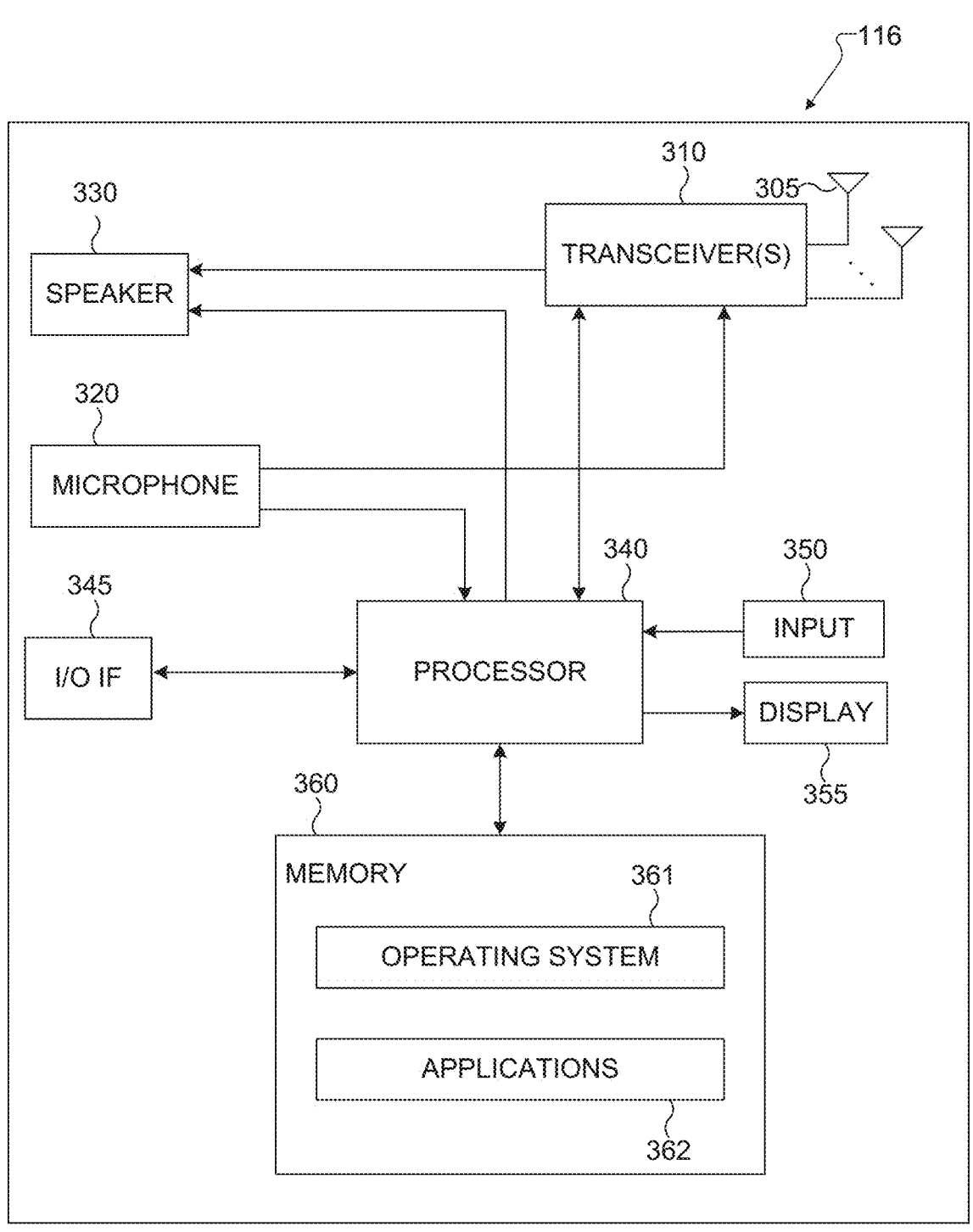
FIG. 3 illustrates an example user equipment (UE) according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to how different embodiments may be implemented. Different embodiments of the present disclosure may be implemented in any suitably arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques. A relay node 104 relays signals between gNB 103 and UE 115. A relay node can be an integrated access and backhaul node (IAB) or NCR.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR $3^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, a relay node 104 includes circuitry, programing, or a combination thereof, to support TDD for NCRs. In certain embodiments, one or more of the gNBs 101-103 includes circuitry, programing, or a combination thereof, to support TDD for NCRs.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example TRP 200 according to embodiments of the present disclosure. For example, the TRP 200 any be a base station, such as gNB 101-103, or may be an NCR or smart repeater, such as the relay node 104 in FIG. 1. The embodiment of the TRP 200 illustrated in FIG. 2 is for illustration only. However, TRPs come in a wide variety of configurations, and FIG. 2 does not limit the scope of this disclosure to any particular implementation of a TRP.

As shown in FIG. 2, the TRP 200 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs or gNBs in the network 100. In various embodiments, certain of the transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals. For example, in embodiments where the TRP is a repeater, one or more of the transceivers 210 may be used for an NCR-MT entity or NCR-Fwd entity as a DL connection for signaling over an access link with a UE and/or over a backhaul link with a gNB. In these examples, the associated one(s) of the transceivers 210 for the NCR-MT entity or NCR-Fwd entity may not covert the incoming RF signal to IF or a baseband signal but rather amplify the incoming RF signal and forward or relay the amplified signal, without any down conversion to IF or baseband. In another example, in embodiments where the TRP is a repeater, one or more of the transceivers 210 may be used for an NCR-MT entity as a DL or UL connection for control signaling over a control link (C-link) with a gNB.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the TRP 200. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the TRP 200 by the controller/processor 225.

The controller/processor 225 is also capable of executing programs and other processes resident in the memory 230, processes to support TDD for NCRs in accordance with various embodiments of the present disclosure. The controller/processor 225 can move data into or out of the memory 230 as required by an executing process.

The controller/processor 225 is also coupled to the backhaul or network interface 235. The backhaul or network interface 235 allows the TRP 200 to communicate with other devices or systems over a backhaul connection or over a network. The interface 235 could support communications over any suitable wired or wireless connection(s). For example, when the TRP 200 is implemented as part of a cellular communication system (such as one supporting 5G/NR, LTE, or LTE-A), the interface 235 could allow the TRP 200 to communicate with other gNBs over a wired or wireless backhaul connection, for example, using a transceiver, such as described above with regard to transceivers 210. For example, in embodiments where the TRP is a repeater, the interface 235 may be used for an NCR-MT or NCR-Fwd entity as a backhaul connection with a gNB over a backhaul link for control signaling and/or data to be transmitted to and/or received from a UE. When the TRP 200 is implemented as an access point, the interface 235 could allow the TRP 200 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

In various embodiments, the TRP 200 may be utilized as an NCR or smart repeater. For example, the TRP 200 may communicate with a base station 102 via a wireless backhaul over interface 235 via a NCT-MT entity for control information and may communicate via transceivers 210 with the UE 116 to communicate data information via an NCR-Fwd entity as described in greater detail below.

Although FIG. 2 illustrates one example of TRP 200, various changes may be made to FIG. 2. For example, the TRP 200 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna 305, an incoming RF signal transmitted by a gNB of the network 100. The transceiver(s) 310 down-converts the incoming RF signal to generate an intermediate frequency (IF) or base-band signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or micro-controller.

The processor 340 is also capable of executing other processes and programs resident in the memory 360. For example, the processor 340 may execute processes to support TDD for NCRs as described in embodiments of the present disclosure. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350 and the display 355, which includes for example, a touchscreen, keypad, etc., The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4A:
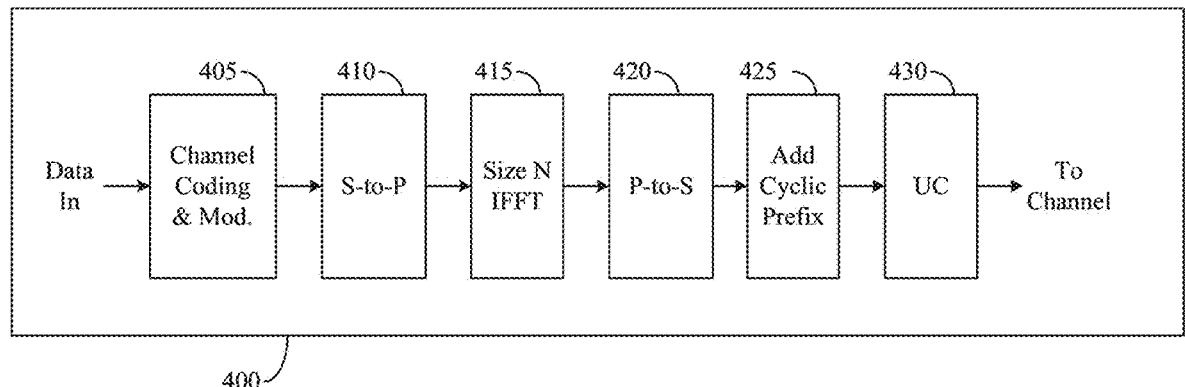
FIGS. 4A and 4B illustrate an example of a wireless transmit and receive paths according to embodiments of the present disclosure.
Figure 4B:
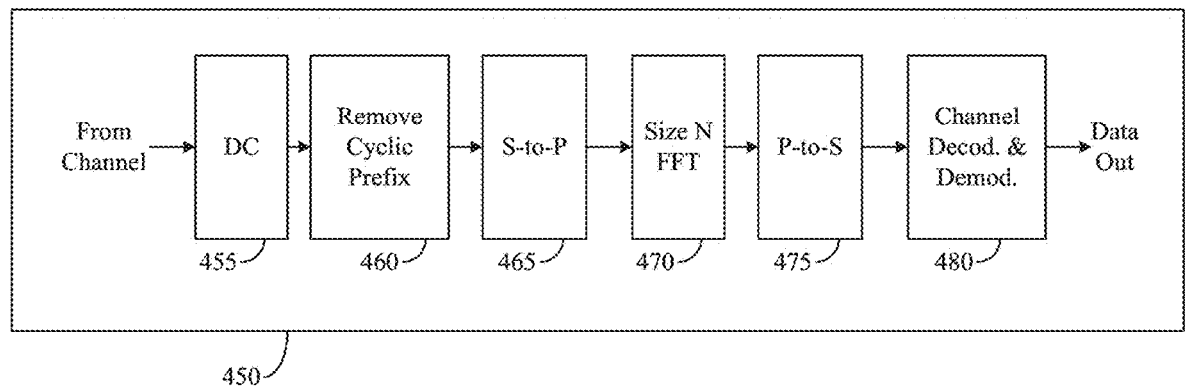

FIG. 4 and FIG. 4B illustrate example wireless transmit and receive paths according to this disclosure. In the following description, a transmit path 400 may be described as being implemented in a gNB or TRP (such as the gNB 102 or TRP 200), while a receive path 450 may be described as being implemented in a UE (such as a UE 116). However, it may be understood that the receive path 450 can be implemented in a gNB or TRP and that the transmit path 400 can be implemented in a UE. In some embodiments, the receive path 450 is configured to support TDD for NCRs in a wireless communication system.

As illustrated in FIG. 4A, the transmit path 400 includes a channel coding and modulation block 405, a serial-to-parallel (S-to-P) block 410, a size N Inverse Fast Fourier Transform (IFFT) block 415, a parallel-to-serial (P-to-S) block 420, an add cyclic prefix block 425, and an up-converter (UC) 430. The receive path 250 includes a down-converter (DC) 455, a remove cyclic prefix block 460, a S-to-P block 465, a size N Fast Fourier Transform (FFT) block 470, a parallel-to-serial (P-to-S) block 475, and a channel decoding and demodulation block 480.

In the transmit path 400, the channel coding and modulation block 405 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to a RF frequency for transmission via a wireless channel. The signal may also be filtered at a baseband before conversion to the RF frequency.

As illustrated in FIG. 4B, the down-converter 455 down-converts the received signal to a baseband frequency, and the remove cyclic prefix block 460 removes the cyclic prefix to generate a serial time-domain baseband signal. The serial-to-parallel block 465 converts the time-domain baseband signal to parallel time-domain signals. The size N FFT block 470 performs an FFT algorithm to generate N parallel frequency-domain signals. The (P-to-S) block 475 converts the parallel frequency-domain signals to a sequence of modulated data symbols. The channel decoding and demodulation block 480 demodulates and decodes the modulated symbols to recover the original input data stream.

Each of the gNBs 101-103 or the TRP 200 may implement a transmit path 400 as illustrated in FIG. 4A that is analogous to transmitting in the downlink to UEs 111-116 and may implement a receive path 450 as illustrated in FIG. 4B that is analogous to receiving in the uplink from UEs 111-116. Similarly, each of UEs 111-116 may implement the transmit path 400 for transmitting in the uplink to the gNBs 101-103 or the TRP 200 and may implement the receive path 500 for receiving in the downlink from the gNBs 101-103 or the TRP 200.

Each of the components in FIGS. 4A and 4B can be implemented using only hardware or using a combination of hardware and software/firmware. As a particular example, at least some of the components in FIGS. 4A and 4B may be implemented in software, while other components may be implemented by configurable hardware or a mixture of software and configurable hardware. For instance, the FFT block 470 and the IFFT block 415 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, can be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 4A and 4B illustrate examples of wireless transmit and receive paths 400 and 450, respectively, various changes may be made to FIGS. 4A and 4B. For example, various components in FIGS. 4A and 4B can be combined, further subdivided, or omitted and additional components can be added according to particular needs. Also, FIGS. 4A and 4B are meant to illustrate examples of the types of transmit and receive paths that can be used in a wireless network. Any other suitable architectures can be used to support wireless communications in a wireless network.

Figure 5:
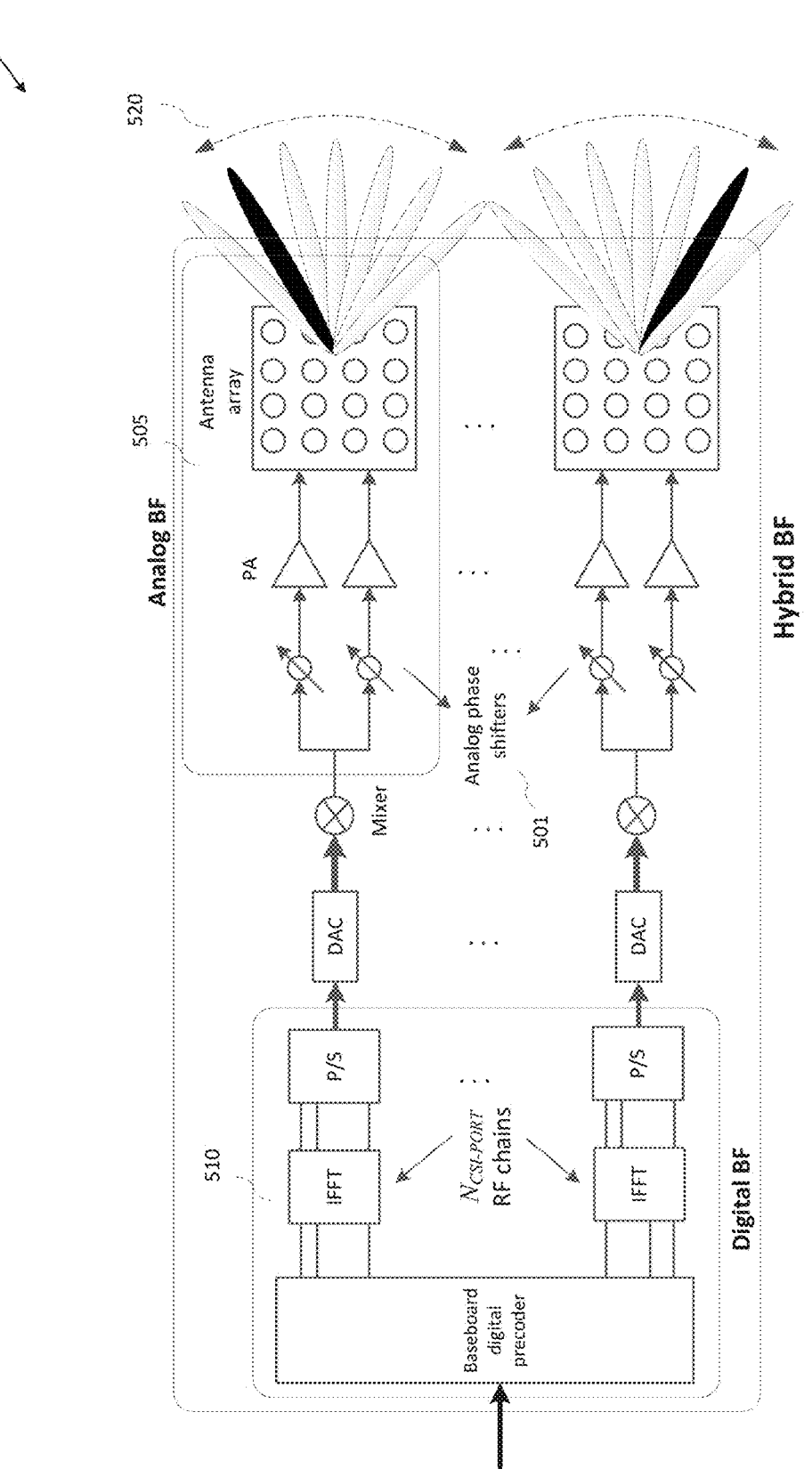
FIG. 5 illustrates an example of a transmitter structure for beamforming according to embodiments of the present disclosure.

FIG. 5 illustrates an example of a transmitter structure 500 for beamforming according to embodiments of the present disclosure. In certain embodiments, one or more of gNB 102 or UE 116 includes the transmitter structure 500. For example, one or more of antennas 205 and its associated systems or antenna 305 and its associated systems can be included in transmitter structure 500. This example is for illustration only and other embodiments can be used without departing from the scope of the present disclosure.

Accordingly, embodiments of the present disclosure recognize that Rel-14 LTE and Rel-15 NR support up to 32 channel state information reference signal (CSI-RS) antenna ports which enable an eNB or a gNB to be equipped with a large number of antenna elements (such as 64 or 128). A plurality of antenna elements can then be mapped onto one CSI-RS port. For mmWave bands, although a number of antenna elements can be larger for a given form factor, a number of CSI-RS ports, that can correspond to the number of digitally precoded ports, can be limited due to hardware constraints (such as the feasibility to install a large number of analog-to-digital converters (ADCs)/digital-to-analog converters (DACs) at mmWave frequencies) as illustrated in FIG. 5. Then, one CSI-RS port can be mapped onto a large number of antenna elements that can be controlled by a bank of analog phase shifters 501. One CSI-RS port can then correspond to one sub-array which produces a narrow analog beam through analog beamforming 505. This analog beam can be configured to sweep across a wider range of angles 520 by varying the phase shifter bank across symbols or slots/subframes. The number of sub-arrays (equal to the number of RF chains) is the same as the number of CSI-RS ports $N_{CSI-PORT}$. A digital beamforming unit 510 performs a linear combination across $N_{CSI-PORT}$ analog beams to further increase a precoding gain. While analog beams are wideband (hence not frequency-selective), digital precoding can be varied across frequency sub-bands or resource blocks. Receiver operation can be conceived analogously.

Since the transmitter structure 500 of FIG. 5 utilizes multiple analog beams for transmission and reception (wherein one or a small number of analog beams are selected out of a large number, for instance, after a training duration that is occasionally or periodically performed), the term "multi-beam operation" is used to refer to the overall system aspect. This includes, for the purpose of illustration, indicating the assigned DL or UL TX beam (also termed "beam indication"), measuring at least one reference signal for calculating and performing beam reporting (also termed "beam measurement" and "beam reporting", respectively), and receiving a DL or UL transmission via a selection of a corresponding RX beam. The system of FIG. 5 is also applicable to higher frequency bands such as >52.6 GHz (also termed frequency range 4 or FR4). In this case, the system can employ only analog beams. Due to the O2 absorption loss around 60 GHz frequency (~10 dB additional loss per 100 m distance), a larger number and narrower analog beams (hence a larger number of radiators in the array) are needed to compensate for the additional path loss.

The text and figures are provided solely as examples to aid the reader in understanding the present disclosure. They are not intended and are not to be construed as limiting the scope of the present disclosure in any manner. Although certain embodiments and examples have been provided, it will be apparent to those skilled in the art based on the disclosures herein that changes in the embodiments and examples shown may be made without departing from the scope of the present disclosure. The transmitter structure 500 for beamforming is for illustration only and other embodiments can be used without departing from the scope of the present disclosure.

A repeater, such as a NCR, also known as a smart repeater, can amplify-and-forward (AF) transmissions or receptions between a gNB (or an Integrated Access and Backhaul (IAB) node) and a UE (or another IAB node) based on side control information, such as beamforming information, received from the gNB. A NCR includes two functional entities: one is a NCR mobile termination (NCR-MT), and the other is a NCR forward unit (NCR-Fwd). The NCR-MT can communicate with a gNB via Control link (C-link) to enable the information exchanges (e.g., the NCR control information). The NCR-Fwd can perform the amplify-and-forward of UL/DL RF signal between gNB (e.g. the BS 102) and UE (e.g. the UE 116) via backhaul link and access link, wherein the backhaul link refers to the link between the gNB and NCR-Fwd, while the access link refers to the link between the NCR-Fwd and the UE.

A baseline operation for NCR includes a single cell/passband for NCR-MT and a single cell/passband for NCR-Fwd, with in-band evaluation, so that both NCR-MT and NCR-Fwd operate in the same cell/passband, or the cell for NCR-Fwd is in the same frequency band as the cell for NCR-MT, so that large-scale properties of channels, signals, transmissions, or receptions for NCR-Fwd are same as those for NCR-MT (which are acquired using typical UE mechanisms). For example, same (UL-DL) TDD configuration, same timing for transmission/receptions boundary alignment, and same quasi co-location (QCL) properties or spatial relations such as same set of transmission configuration indication (TCI) states or sounding reference signal resource indicators (SRIs), are applicable to both NCR-MT (C-link) and NCR-Fwd (BH-link).

A more general operation for NCR is out-of-band operation, wherein a cell/passband for NCR-Fwd can be different from a cell/passband for NCR-MT. For example, the NCR-Fwd and the NCR-MT (or corresponding cells thereof) can operate in different, such as largely separated, carrier frequencies within a same band or in a different frequency bands or frequency ranges than. One example is operation of NCR-MT in FR1 and NCR-Fwd in FR2, so that NCR-Fwd (on Access link and BH-link) can provide coverage extension in FR2, while the NCR-MT uses a more reliable C-link in FR1 (rather than an FR2 C-link as in the case of in-band NCR operation). Another example is operation of NCR-MT and NCR-Fwd in two different frequency bands of FR2, such as NCR-MT in a 28 GHz band and NCR-Fwd in a 37 GHz band, so that the C-link is still more reliable than the BH-link.

To accommodate out-of-band NCR operation, several issues need to be evaluated. Since NCR-MT and NCR-Fwd operate in different frequency bands/ranges, the large-scale properties of channels, signals, transmissions, or receptions for NCR-Fwd are not same as those for NCR-MT.

Therefore, embodiments of the present disclosure recognize there is a need to introduce additional signaling and/or additional mechanisms to enable the acquisition of NCR-Fwd-specific settings and parameters, such as a different TDD configuration, different timing, or different beam/QCL/spatial relation for BH-link than a respective one for NCR-MT on the C-link.

There is another need for methods to minimize any self-interference between NCR-MT and NCR-Fwd in case of conflicting directions of transmissions/receptions, such as DL for NCR-MT and UL for NCR-Fwd. The present disclosure provides methods and apparatus for out-of-band operation for an NCR.

In general, the embodiments apply to any deployments, verticals, or scenarios including FR1 or FR2, with enhanced mobile broadband (eMBB), ultra reliable and low latency communication (URLLC) and industrial internet of things (IIoT) and extended reality (XR), massive machine-type communications (mMTC) and internet of things (IoT), with sidelink/vehicle to anything (V2X) communications, with multi-TRP/beam/panel, in unlicensed/shared spectrum (NR-U), for non-terrestrial networks (NTN), for aerial systems such as unmanned aerial vehicles (UAVs) such as drones, for private or non-public networks (NPN), for operation with reduced capability (RedCap) UEs, multi-cast broadcast services (MBS), and so on. The smart or NCR may be ground-based or may be satellite/aerial platform based.

Various embodiments, methods, and examples described in the present disclosure can apply beyond NCR/smart repeaters nodes to other nodes with a repeater/relay-like functionality in a wireless network (e.g. the wireless network 100), such as reconfigurable intelligent surfaces (RIS), or to stationary or non-stationary repeater/relay-like nodes in the sky/sea or other not-on-the-ground situations, for example, satellites in non-terrestrial networks (NTN), or mobile repeaters on buses/trains/vessels/ships/aircrafts/drones, and so on.

Embodiments of the disclosure are summarized in the following and are fully elaborated further herein. Combinations of the embodiments are also applicable, but they are not described in detail for brevity.

FIG. 9 illustrates a flowchart of an example NCR procedure 900 for separate TDD configurations for NCR-MT and NCR-Fwd according to embodiments of the present disclosure. For example, procedure 900 for separate TDD configurations for NCR-MT and NCR-Fwd can be followed by the NCR 610 of FIG. 6, or followed by the relay node/NCR 104 of FIG. 1. This example is for illustration only and other embodiments can be used without departing from the scope of the present disclosure.

The procedure begins in 910, an NCR includes an NCR-MT entity and an NCR-Fwd entity that operate, for example, in different frequency bands. In 920, the NCR-MT receives a first common/dedicated TDD configuration for the C-link. In 930, the NCR-MT receives a second common/dedicated TDD configuration for the BH-link. In 940, the NCR-MT receives on the C-link in DL (or flexible) symbols/slots and transmits on the C-link in UL (or flexible) symbols or slots, as indicated by the first TDD configuration. In 950, the NCR-Fwd receives on the BH-link and transmits on the Access link in DL (or flexible) symbols/slots, and receives on the Access link and transmits on the BH-link in UL (or flexible) symbols or slots, as indicated by the second TDD configuration.

In one embodiment, an NCR can operate with NCR-MT in a first carrier frequency and with NCR-Fwd in a second carrier frequency. The first and second carrier frequencies can be in a same or in different frequency bands or in a same or in different frequency ranges. For example, NCR-MT operates in FR1 and NCR-Fwd operates in FR2. Such mode of operation for NCR may be referred to as "out-of-band" operation (for example, unlike an "in-band" operation where NCR-MT and NCR-Fwd are operating with same carrier frequency or within same frequency band/range). Out-of-band operation for NCR can include scenarios similar to inter-band CA, intra-band non-contiguous CA, and intra-band contiguous CA for typical UEs. When NCR-MT and NCR-Fwd operate in different carrier frequencies or different frequency bands/ranges, some parameters, settings, or information applicable to NCR-MT and NCR-Fwd can be different, such as different TDD configurations, or different sets of beams/TCI states/SRIs for C-link or BH-link, or different timing alignment/offset values. The NCR can be provided information for such different parameters or settings via operation and management (OAM) or via gNB signaling such as RRC configuration, or via medium access control (MAC)-control element (CE), and so on, separately for NCR-MT and for NCR-Fwd, or the NCR such as NCR-MT can determine parameters or settings for NCR-Fwd based on those for NCR-MT or based on RS/beam measurements. The distinction of in-band vs. out-of-band NCR operation can be also in a functional or operational perspective instead of the operating carrier frequency/band/range, and can be based on whether/how the operation of NCR-Fwd is impacted by that of NCR-MT, such that the corresponding inputs, or outputs, or TDD configuration, or sets of beams/TCI states/SRIs, timing adjustments, and so on (e.g., whether or not NCR is provided separate parameters for NCR-Fwd operation or whether or not the NCR supports corresponding capabilities).

In one embodiment, NCR-MT and NCR-Fwd can operate with different TDD configurations. The NCR (via NCR-MT) can be provided common or dedicated TDD configurations for NCR-Fwd separate from those for NCR-MT. The NCR-MT can acquire TDD configurations for NCR-Fwd (separate from those for NCR-Fwd) from RRC signaling or from a SIB1 corresponding to the cells/passbands in which the NCR-Fwd is operating (where the corresponding SIB1 can be acquired by the NCR-MT or can be directly provided to NCR-MT via RRC signaling as assistance information). The TDD configurations provided to the NCR-MT and NCR- Fwd can be separate and consistent/nonconflicting (such as for intra-band case), or can be conflicting such as DL direction for NCR-MT and UL direction for NCR-Fwd or vice versa (for example, for inter-band case). In case of consistent TDD configuration, the NCR determines a reference cell/entity and other cells/entity follow the TDD configuration/indications corresponding to the reference cell/entity. In case of conflicting TDD UL-DL configurations, each of NCR-MT and NCR-Fwd can follow the corresponding TDD configuration, and the NCR-MT can provide assistance-information to the gNB in terms of recommended beams or non-desired/restricted beams or Tx/Rx power adjustments for NCR-MT or NCR-Fwd, or the gNB can provide indications to the NCR-MT regarding restricted beams or Tx/Rx power adjustments for NCR-MT or for NCR-Fwd. Such assistance information or indication can reduce the self-interference level between NCR-MT and NCR-Fwd in case of conflicting TDD configurations or indications.

In one embodiment, an NCR-MT can determine a reference NCR cell/entity such that TDD configurations or RRC information or downlink control information (DCI) formats that indicate/imply UL-DL TDD configurations corresponding to other NCR cells/entity follow (i.e., are consistent with) those of the reference NCR cell/entity. Such method can be beneficial, for example, for an NCR node with NCR-MT and NCR-Fwd operating in different carrier frequencies in a same frequency band/range (similar to intra-band contiguous CA or intra-band non-contiguous CA) or an NCR without a capability for simultaneous or overlapping transmission and reception on the C-link of NCR-MT and BH-link of NCR-Fwd or vice versa, such as an NCR with single RF chain or antenna panel shared by NCR-MT and NCR-Fwd. The NCR-MT can be provided predetermined rules to determine the reference cell/entity for TDD configuration.

In one embodiment, an NCR-MT can report a set of downlink or uplink recommended beams, or a set of non-desired beams to the gNB. Such report can be by indicating recommended beams or non-desired TCI states, SSB indexes, CSI-RS indexes, or SRIs corresponding to C-link of NCR-MT or BH-link of NCR-Fwd. Such report can be assistance information to the gNB for selection of beams for C-link or BH-link, for example, to accommodate spatial division multiplexing (SDM) or to reduce self-interference between NCR-MT and NCR-Fwd in case of conflicting TDD configurations/indications between the two NCR entities. The reported recommended or non-desired beams can be in association with certain time or frequency resources, such as time-domain configurations for the Access link or such as cells/passband of NCR-Fwd. Such report can also/only include beam quality metrics such as reference signal received power (RSRP), received signal strength indicator (RSSI) or signal-to-interference-plus-noise ratio (SINR) values corresponding to the beams or beam pairs of C-link or BH-link. To determine such recommended or non-desired beams, the NCR can be provided measurement gaps or measurement settings (including for beam repetition/sweeping) to receive and measure corresponding reference signals or channels.

In one embodiment, when the NCR-MT and NCR-Fwd are configured/indicated different or conflicting TDD configurations (or other RRC configurations or DCI formats indicating/implying an UL-DL link direction information) that would result in overlapping UL transmission by NCR-MT and DL reception by NCR-Fwd (respectively, overlapping DL reception by NCR-MT and UL transmission by NCR-Fwd) in one or more symbols or slots, the NCR such as NCR-MT or NCR-Fwd can apply power control, such as power boosting or power scaling to a corresponding UL transmission in the one or more symbols or slots. Such power control can be in association with recommended beams or non-desired beams reported by the NCR. Additionally, or alternatively, the NCR can report to the gNB recommended power control parameters such as desired ranges of power spectral density (PSD) adjustment applicable for NCR-MT or NCR-Fwd transmissions or receptions. Such methods can apply, for example, to NCR nodes capable of simultaneous transmission on NCR-Fwd BH-link and reception on NCR-MT C-link, or vice versa, to reduce a level of applicable self-interference.

In one embodiment, for out-of-band NCR operation, the DL receiving timing of the NCR-Fwd can be non-aligned with the DL receiving timing of the NCR-MT, or the UL transmitting timing of the NCR-Fwd can be non-aligned with the UL transmitting timing of the NCR-MT. Different approaches can be used to acquire the DL/UL timing for NCR-Fwd on the BH-link based on NCR capability or higher layer signaling. In a first approach (referred to as SSB-less/RACH-less approach), a DL/UL timing of the NCR-Fwd on the BH-link can be indicated by the gNB, such as by indication of DL/UL timing offset/adjustment values relative to a DL/UL timing of the NCR-MT, such as by RRC or MAC-CE signaling. The determination of such DL/UL timing offset/adjustment values can be up to gNB implementation or can be based on NCR assistance information such as transmission by NCR-MT of sounding reference signals (SRSs) corresponding to an NCR-Fwd cell/passband. In a second approach (referred to as SSB-based/RACH-based approach), the NCR-Fwd acquires the DL/UL timing using, for example, based on reception/acquisition by NCR-MT of SSB/SIB1 assistance information corresponding to NCR-Fwd or by random access procedure by NCR-MT based on resources/configuration corresponding to NCR-Fwd. A physical random access channel (PRACH) transmission by NCR-MT corresponding to NCR-Fwd can be triggered, for example, by a physical downlink control channel (PDCCH) order using an explicit indication, or by indicating an SSB index or a cell index corresponding to NCR-Fwd. An absolute or short/adjustment timing advance value can be provided via MAC random access response (RAR) or via a separate timing MAC-CE command.

In one embodiment, for example for out-of-band NCR operation, a beam or a set of beams (such as spatial relations or QCL assumptions corresponding to TCI states, SRIs, or antenna beam patterns) applicable to the BH-link of NCR-Fwd can be different from a beam or set of beams applicable to the C-link of NCR-MT. Various approaches can be applicable to determine such beams. In a first approach (referred to as cross-carrier beam indication), a BH-link beam indication for NCR-Fwd can be same as or based on a beam indication corresponding to C-link on the NCR-MT and refinement of the gNB UL Rx or DL Tx beam can additionally apply. In a second approach (referred as nested/two-stage cross-carrier beam indication), a BH-link beam indication for NCR-Fwd can be based on cross-carrier beam indication together with an indication of a corresponding beam pattern, such as a logical beam index or a (reference signal) repetition/resource index. For example, the BH-link beam can be regarded as a finer beam that can be generated by the NCR-Fwd within a wide beam that is used by the NCR-MT for transmission or reception of a source reference signal. In a third approach (referred to as beam index-based BH beam indication), a transmission or reception by NCR- Fwd on the BH-link is based on a spatial transmission or reception filter according to a beam from a set of (logical or physical) beam indexes corresponding to antenna patterns that can be generated by the NCR-Fwd on the BH-link. In a fourth approach (referred to as NCR-Fwd-specific TCI/SRI for BH-link beam determination), a BH-link beam indication for NCR-Fwd can be in the form of TCI states or SRIs, configured/indicated for NCR-MT (or for NCR-Fwd), that are based on reference signals such as SSBs or CSI-RS or SRSs associated with a cell/passband of NCR-Fwd. A gNB-based variation of the fourth approach evaluates transmission, by NCR-MT (or NCR-Fwd), of SRSs associated with the cell/passband of NCR-Fwd, while an NCR-assisted variation of the fourth approach evaluates reception and measurement reporting, by NCR-MT (or NCR-Fwd), of SSBs or CSI-RSs associated with the cell/passband of NCR-Fwd.

In one embodiment, when an NCR is provided a set of beams for NCR-Fwd separate from that for NCR-MT, such as for out-of-band NCR operation, the NCR-Fwd can continue to operate on the Access link and BH-link when a beam failure detection (BFD) event for the C-link occurs, at least when a BH-link beam is not same as or is not QCL (Type-D) with BFD detection reference signals (RSs) for the C-link. On the other hand, the gNB or the NCR-MT (or NCR-Fwd) can determine a BFD event on the BH-link, and the NCR-Fwd can cease the amplify-and-forward (AF) operation (or go to OFF state) until the NCR completes a beam failure recovery (BFR) procedure.

In a gNB-based variation, the gNB can detect a BFD event on the BH-link based on measurements of periodic SRSs associated with a cell/passband of NCR-Fwd. Upon such detection, the gNB can indicate to the NCR-MT via a BH-BFD MAC-CE to stop the AF operation for the NCR-Fwd, and trigger transmission, by NCR-MT (or NCR-Fwd), of candidate periodic or semi-persistent SRSs for determination of a new beam for the BH-link. The gNB can indicate to the NCR-MT via a BH-BFR MAC-CE when a BFR procedure is (successfully) completed, and of a new BH-link beam to be used by the NCR-Fwd.

In an NCR-based variation, the NCR-MT (or NCR-Fwd) can detect a BFD event on the BH-link based on measurements of SSBs or periodic CSI-RSs associated with a cell/passband of NCR-Fwd. Upon such detection, the NCR-Fwd ceases the AF operation on the BH-link. The NCR-MT indicates the BFD event and a new BH beam to the gNB via a PRACH or physical uplink control channel (PUCCH)/physical uplink shared channel (PUSCH) transmission on the C-link. The gNB can indicate to the NCR-MT on the C-link that the BFR procedure for the BH-link is (successfully) completed.

Upon (successful) completion of the BFR procedure for the BH-link, until reception of new dedicated beam indication for BH-link or Access link, the NCR can resume the AF operation using the old/new BH beam, or using last configurations available for Access link beam indication.

Such methods can also apply in the event of radio link failure (RLF) and corresponding RRC/radio link re-establishment procedure, if applicable, for BH-link of NCR-Fwd.

The impact due to out-of-band operation on system specifications such as TS 38.213 [REF3]v18.0.0 is evaluated.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

A communication system can include a downlink (DL) that refers to transmissions from a base station (such as the BS 102) or one or more transmission points to UEs (such as the UE 116) and an uplink (UL) that refers to transmissions from UEs (such as the UE 116) to a base station (such as the BS 102) or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 1 millisecond or 0.5 millisecond, include 14 symbols and an RB can include 12 SCs with inter-SC spacing of 15 kHz or 30 kHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB (such as the BS 102) transmits one or more of multiple types of RS including channel state information RS (CSI-RS) and demodulation RS (DM-RS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process consists of NZP CSI-RS and CSI-IM resources.

A UE (such as the UE 116) can determine CSI-RS transmission parameters through DL control signaling or higher layer signaling, such as radio resource control (RRC) signaling, from a gNB (such as the BS 102). Transmission instances of a CSI-RS can be indicated by DL control signaling or be configured by higher layer signaling. A DM-RS is transmitted only in the BW of a respective PDCCH or PDSCH and a UE can use the DM-RS to demodulate data or control information.

In certain embodiments, UL signals also include data signals conveying information content, control signals conveying UL control information (UCI), DM-RS associated with data or UCI demodulation, sounding RS (SRS) enabling a gNB to perform UL channel measurement, and a RA preamble enabling a UE to perform RA (see also NR specification). A UE transmits data information or UCI through a respective PUSCH or a physical UL control channel (PUCCH). A PUSCH or a PUCCH can be transmitted over a variable number of slot symbols including one slot symbol. The gNB can configure the UE to transmit signals on a cell within an active UL bandwidth part (BWP) of the cell UL BW.

UCI includes hybrid automatic repeat request (HARQ) acknowledgement (ACK) information, indicating correct or incorrect detection of data transport blocks (TBs) in a PDSCH, scheduling request (SR) indicating whether a UE has data in a buffer, and CSI reports enabling a gNB to select appropriate parameters for PDSCH or PDCCH transmissions to a UE. HARQ-ACK information can be configured to be with a smaller granularity than per TB and can be per data code block (CB) or per group of data CBs where a data TB includes a number of data CBs.

A CSI report from a UE can include a channel quality indicator (CQI) informing a gNB of a largest modulation and coding scheme (MCS) for the UE to detect a data TB with a predetermined block error rate (BLER), such as a 10% BLER (see NR specification), of a precoding matrix indicator (PMI) informing a gNB how to combine signals from multiple transmitter antennas in accordance with a MIMO transmission principle, and of a rank indicator (RI) indicating a transmission rank for a PDSCH.

UL RS includes DM-RS and SRS. DM-RS is transmitted only in a BW of a respective PUSCH or PUCCH transmission. A gNB (e.g. the BS 102) can use a DM-RS to demodulate information in a respective PUSCH or PUCCH. SRS is transmitted by a UE to provide a gNB with an UL CSI and, for a TDD system, an SRS transmission can also provide a PMI for DL transmission. Additionally, in order to establish synchronization or an initial higher layer connection with a gNB, a UE can transmit a physical random-access channel (PRACH as shown in NR specifications).

An antenna port is defined such that the channel over which a symbol on the antenna port is conveyed can be inferred from the channel over which another symbol on the same antenna port is conveyed.

For DM-RS associated with a PDSCH, the channel over which a PDSCH symbol on one antenna port is conveyed can be inferred from the channel over which a DM-RS symbol on the same antenna port is conveyed only if the two symbols are within the same resource as the scheduled PDSCH, in the same slot, and in the same precoding resource block group (PRG).

For DM-RS associated with a PDCCH, the channel over which a PDCCH symbol on one antenna port is conveyed can be inferred from the channel over which a DM-RS symbol on the same antenna port is conveyed only if the two symbols are within resources for which the UE may expect the same precoding being used.

For DM-RS associated with a physical broadcast channel (PBCH), the channel over which a PBCH symbol on one antenna port is conveyed can be inferred from the channel over which a DM-RS symbol on the same antenna port is conveyed only if the two symbols are within a synchronization signal/physical broadcast channel (SS/PBCH) block transmitted within the same slot, and with the same block index.

Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

The UE (such as the UE 116) may expect that synchronization signal (SS)/PBCH block (also denoted as SSBs) transmitted with the same block index on the same center frequency location are quasi co-located with respect to Doppler spread, Doppler shift, average gain, average delay, delay spread, and, when applicable, spatial Rx parameters. The UE may not expect quasi co-location for any other synchronization signal SS/PBCH block transmissions.

In absence of CSI-RS configuration, and unless otherwise configured, the UE may expect PDSCH DM-RS and SSB to be quasi co-located with respect to Doppler shift, Doppler spread, average delay, delay spread, and, when applicable, spatial Rx parameters. The UE may expect that the PDSCH DM-RS within the same code division multiplexing (CDM) group is quasi co-located with respect to Doppler shift, Doppler spread, average delay, delay spread, and spatial Rx. The UE may also expect that DM-RS ports associated with a PDSCH are QCL with QCL type A, type D (when applicable) and average gain. The UE may further expect that no DM-RS collides with the SS/PBCH block.

A UE can be configured with a list of up to M TCI-State configurations within the higher layer parameter PDSCH-Config to decode PDSCH according to a detected PDCCH with DCI intended for the UE and the given serving cell, where M depends on the UE capability maxNumberConfig-uredTCIstatesPerCC. Each TCI-State contains parameters for configuring a quasi-co-location (QCL) relationship between one or two downlink reference signals and the DM-RS ports of the PDSCH, the DM-RS port of PDCCH or the CSI-RS port(s) of a CSI-RS resource.

The quasi co-location relationship is configured by the higher layer parameter qcl-Type1 for the first DL RS, and qcl-Type2 for the second DL RS (if configured). For the case of two DL RSs, the QCL types shall not be the same, regardless of whether the references are to the same DL RS or different DL RSs. The quasi co-location types corresponding to each DL RS are given by the higher layer parameter qcl-Type in QCL-Info and may take one of the following values:

'QCL-TypeA': {Doppler shift, Doppler spread, average delay, delay spread}

'QCL-TypeB': {Doppler shift, Doppler spread}

'QCL-TypeC': {Doppler shift, average delay}

'QCL-TypeD': {Spatial Rx parameter}

The UE receives a MAC-CE activation command to map up to N, e.g., N=8 TCI states to the codepoints of the DCI field 'Transmission Configuration Indication'. When the HARQ-ACK information corresponding to the PDSCH carrying the (MAC-CE) activation command is transmitted in slot n, the indicated mapping between TCI states and codepoints of the DCI field 'Transmission Configuration Indication' should be applied after a MAC-CE application time, e.g., starting from the first slot that is after slot $$n + 3N_{slot}^{subframe,\mu}$$

where $$N_{slot}^{subframe,\mu}$$

is a number of slot per subframe for subcarrier spacing (SCS) configuration μ.

The UE receives a MAC-CE activation command to map up to [N] (e.g., N=8) TCI states to the codepoints of the DCI field "Transmission Configuration Indication." When the HARQ-ACK corresponding to the PDSCH carrying the activation command is transmitted in slot n, the indicated mapping between TCI states and codepoints of the DCI field "Transmission Configuration Indication" may be applied after a MAC-CE application time, e.g., starting from the first slot that is after slot $$(n + 3N_{slot}^{subframe,\mu}).$$

In the following and throughout the disclosure, various embodiments of the disclosure may be also implemented in any type of UE including, for example, UEs with the same, similar, or more capabilities compared to typical 5G NR UEs. Although various embodiments of the disclosure discuss 3GPP 5G NR communication systems, the embodiments may apply in general to UEs operating with other RATs and/or standards, such as next releases/generations of 3GPP, IEEE WiFi, and so on.

In various embodiments and examples, unless otherwise explicitly noted, providing a parameter value by higher layers includes providing the parameter value by one or more of OAM signaling, a system information block (SIB), such as a SIB1, or by a common RRC signaling, or by UE-specific RRC signaling.

In various embodiments and examples, for brevity of description, the higher layer provided TDD UL-DL frame configuration refers to tdd-UL-DL-ConfigurationCommon as example for RRC common configuration and/or tdd-UL-DL-ConfigurationDedicated as example for UE-specific configuration. The UE determines a common TDD UL-DL frame configuration of a serving cell by receiving a SIB such as a SIB1 when accessing the cell from RRC_IDLE or by RRC signaling when the UE is configured with SCells or additional secondary cell groups (SCGs) by an IE Serving-CellConfigCommon in RRC_CONNECTED. The UE determines a dedicated TDD UL-DL frame configuration using the IE ServingCellConfig when the UE is configured with a serving cell, e.g., add or modify, where the serving cell may be the SpCell or an SCell of a master cell group (MCG) or SCG. A TDD UL-DL frame configuration designates a slot or symbol as one of types 'D', 'U' or 'F' using at least one time-domain pattern with configurable periodicity.

In various embodiments and examples, for brevity of description, SFI refers to a slot format indicator as example that is indicated using higher layer provided IEs such as slotFormatCombination or slotFormatCombinationsPerCell and which is indicated to the UE by group common DCI format such as DCI F2_0 where slotFormats are defined in [REF3].

If a UE:
Is configured with multiple serving cells and is provided with directionalCollisionHandling-r16='enabled' for a set of serving cell(s) among the multiple serving cells;
Indicates support of half-DuplexTDD-CA-SameSCS-r16 capability; and/or
Is not configured to monitor PDCCH for detection of DCI format 2_0 on any of the multiple serving cells;
for a set of symbols of a slot that are indicated to the UE for reception of SS/PBCH blocks in a first cell of the multiple serving cells by ssb-PositionsInBurst in SystemInformation-BlockType1 or by ssb-PositionsInBurst in ServingCellConfigCommon or, if the UE is not provided dl-OrJointTCI-StateList, by ssb-PositionsInBurst in SSB-MTCAdditionalPCI associated to physical cell ID with active TCI states for PDCCH or PDSCH, or for a set of symbols of a slot corresponding to SS/PBCH blocks configured for L1 beam measurement/reporting, the UE does not transmit PUSCH, PUCCH, or PRACH in the slot if a transmission would overlap with any symbol from the set of symbols, and the UE does not transmit SRS in the set of symbols of the slot in Any of the multiple serving cells if the UE is not capable of simultaneous transmission and reception as indicated by simultaneousRxTxInterBandCA among the multiple serving cells; and
Any one of the cells corresponding to the same band as the first cell, irrespective of any capability indicated by simultaneousRxTxInterBandCA.

For a set of symbols of a slot corresponding to a valid PRACH occasion and $N_{gap}$ symbols before the valid PRACH occasion, as described in clause 8.1, the UE does not receive PDCCH, PDSCH, or CSI-RS in the slot if a reception would overlap with any symbol from the set of symbols. The UE does not expect the set of symbols of the slot to be indicated as downlink by tdd-UL-DL-ConfigurationCommon or tdd-UL-DL-ConfigurationDedicated.

For a set of symbols of a slot indicated to a UE by pdcch-ConfigSIB1 in MIB for a CORESET for Type0-PDCCH common search space (CSS) set, the UE does not expect the set of symbols to be indicated as uplink by tdd-UL-DL-ConfigurationCommon, or tdd-UL-DL-ConfigurationDedicated.

If a UE is scheduled by a DCI format to receive PDSCH over multiple slots, and if tdd-UL-DL-ConfigurationCommon, or tdd-UL-DL-ConfigurationDedicated, indicate that, for a slot from the multiple slots, at least one symbol from a set of symbols where the UE is scheduled PDSCH reception in the slot is an uplink symbol, the UE does not receive the PDSCH in the slot.

If a UE is scheduled by a DCI format to transmit PUSCH over multiple slots, and if tdd-UL-DL-ConfigurationCommon, or tdd-UL-DL-ConfigurationDedicated, indicates that, for a slot from the multiple slots, at least one symbol from a set of symbols where the UE is scheduled PUSCH transmission in the slot is a downlink symbol, the UE does not transmit the PUSCH in the slot.

If a UE:
Is configured with multiple serving cells and is provided with directionalCollisionHandling-r16='enabled' for a set of serving cell(s) among the configured multiple serving cells; and
Indicates support of half-DuplexTDD-CA-SameSCS-r16 capability; and
Is not configured to monitor PDCCH for detection of DCI format 2_0 on any of the multiple serving cells,
the UE determines a reference cell for a symbol as an active cell with the smallest cell index among:
The configured multiple serving cells if the UE is not capable of simultaneous transmission and reception as indicated by simultaneousRxTxInterBandCA among the multiple serving cells; and
The cells of each band respectively if the UE is capable of simultaneous transmission and reception by simultaneousRxTxInterBandCA for the configured multiple serving cells,
where the symbol is configured as
Downlink, or uplink, as indicated by tdd-UL-DL-ConfigurationCommon or tdd-UL-DL-ConfigurationDedicated;
Uplink, if the symbol is flexible and the UE is configured to transmit SRS, PUCCH, PUSCH, or PRACH on the symbol; and/or
Downlink, if the symbol is flexible and the UE is configured to receive PDCCH, PDSCH or CSI-RS on the symbol.

Additionally, if another cell among the cells configured with directionalCollisionHandling-r16 operates in the same frequency band as the reference cell, the UE does not expect:

A symbol to be indicated as downlink or uplink on the reference cell and as uplink or downlink on another cell, respectively, by tdd-UL-DL-ConfigurationCommon or by tdd-UL-DL-ConfigurationDedicated;

tdd-UL-DL-ConfigurationCommon or tdd-UL-DL-ConfigurationDedicated to indicate a symbol as downlink on the reference cell and to detect a DCI format scheduling a transmission on the symbol on another cell; and/or To be configured by higher layers to receive PDCCH, PDSCH, or CSI-RS on a flexible symbol on the reference cell and to detect a DCI format scheduling a transmission on the symbol on another cell, if the reference cell and another cell among the cells configured with directionalCollisionHandling-r16 operate in different frequency bands.

The UE:

Expects symbol as flexible, is not required to receive higher layer configured PDCCH, PDSCH, or CSI-RS and not expected to transmit higher layer configured SRS, PUCCH, PUSCH, or PRACH, when tdd-UL-DL-ConfigurationCommon or tdd-UL-DL-ConfigurationDedicated indicates symbol as downlink or uplink on another cell and as uplink or downlink for the reference cell, respectively;

Transmits a signal/channel scheduled by a DCI format on a symbol of another cell when the symbol is indicated as downlink by tdd-UL-DL-ConfigurationCommon or tdd-UL-DL-ConfigurationDedicated for the reference cell; and/or Is not required to receive a higher layer configured PDCCH, PDSCH, or CSI-RS on flexible symbols on the reference cell in a set of symbols, if the UE detects a DCI format scheduling a transmission on one or more symbols in the set of symbols on another cell, Additionally, regardless of whether the reference cell and another cell operate in same or different frequency bands, the UE:

Does not expect tdd-UL-DL-ConfigurationCommon or tdd-UL-DL-ConfigurationDedicated for the reference cell to indicate a symbol as uplink and to detect a DCI format scheduling a reception on the symbol on another cell;

Does not expect to be configured by higher layers to transmit SRS, PUCCH, PUSCH, or PRACH on a flexible symbol on the reference cell and to detect a DCI format scheduling a reception on the symbol on another cell;

Does not transmit a PUCCH, PUSCH or PRACH that is configured by higher layers on a set of symbols on another cell if at least one symbol from the set of symbols is indicated as downlink by tdd-UL-DL-ConfigurationCommon or tdd-UL-DL-ConfigurationDedicated or is a symbol corresponding to a PDCCH, PDSCH, or CSI-RS reception that is configured by higher layers on the reference cell;

Does not transmit a SRS that is configured by higher layers on a set of symbols on another cell if the set of symbols is indicated as downlink by tdd-UL-DL-ConfigurationCommon or tdd-UL-DL-ConfigurationDedicated or corresponds to a PDCCH, PDSCH or CSI-RS reception that is configured by higher layers on the reference cell;

Does not receive a PDCCH, PDSCH or CSI-RS that is configured by higher layers on a set of symbols on another cell if at least one symbol from the set of symbols is indicated as uplink by tdd-UL-DL-ConfigurationCommon or tdd-UL-DL-ConfigurationDedicated or is a symbol corresponding to a SRS, PUCCH, PUSCH, or PRACH transmission that is configured by higher layers on the reference cell;

Expects a symbol indicated as downlink or uplink by tdd-UL-DL-ConfigurationCommon or tdd-UL-DL-ConfigurationDedicated on another cell to be flexible, if the UE is respectively configured by higher layers to transmit SRS, PUCCH, PUSCH, or PRACH or to receive PDCCH, PDSCH, or CSI-RS on the reference cell; and/or Does not expect to detect a first DCI format scheduling a transmission or reception on a symbol on a first cell and a second DCI format scheduling a reception or transmission on the symbol on a second cell, respectively.

After the UE applies the procedures described herein for directional collision handling within the set of cells that have been configured with directionalCollisionHandling-r16, the UE does not expect any directional collision among the serving cells that the UE is not capable of simultaneous transmission and reception.

A UE can be provided a value $N_{TA,offset}$ of a timing advance offset for a serving cell by n-TimingAdvanceOffset for the serving cell. If the UE is not provided n-TimingAdvanceOffset for a serving cell, the UE determines a default value $N_{TA,offset}$ of the timing advance offset for the serving cell as described in [TS 38.133].

If a UE is configured with two UL carriers for a serving cell, a same timing advance offset value $N_{TA,offset}$ applies to both carriers.

Upon reception of a timing advance command for a TAG, the UE adjusts uplink timing for PUSCH/SRS/PUCCH transmission on the serving cells in the TAG based on a value $N_{TA,offset}$ that the UE expects to be same for the serving cells in the TAG and based on the received timing advance command where the uplink timing for PUSCH/SRS/PUCCH transmissions is the same for the serving cells in the TAG.

For a band with synchronous contiguous intra-band evolved non-standalone dual connectivity (EN-DC) in a band combination with non-applicable maximum transmit timing difference requirements as described in Note 1 of Table 7.5.3-1 of [TS 38.133], if the UE indicates ul-TimingAlignmentEUTRA-NR as 'required' and uplink transmission timing based on timing adjustment indication for a TAG from MCG and a TAG from SCG are determined to be different by the UE, the UE adjusts the transmission timing for PUSCH/SRS/PUCCH transmission on serving cells part of the band with the synchronous contiguous intra-band EN-DC based on timing adjustment indication for a TAG from a serving cell in MCG in the band. The UE is not expected to transmit a PUSCH/SRS/PUCCH in one CG when the PUSCH/SRS/PUCCH is overlapping in time, even partially, with random access preamble transmitted in another CG.

For a SCS of $2^{\mu}\cdot15$ kHz, the timing advance command for a TAG indicates the change of the uplink timing relative to the current uplink timing for the TAG in multiples of $16\cdot64\cdot T_c/2^{\mu}$. The start timing of the random-access preamble is described in [TS 38.211][REF1].

A timing advance command [TS 38.321][REF6] in case of random access response or in an absolute timing advance command MAC CE, $T_A$, for a TAG indicates $N_{TA}$ values by index values of $T_A=0, 1, 2, \ldots, 3846$, where an amount of the time alignment for the TAG with SCS of $2^{\mu}\cdot15$ kHz is $N_{TA}=T_A\cdot16\cdot64/2^{\mu}$. $N_{TA}$ is defined in [TS 38.211][REF1] and is relative to the SCS of the first uplink transmission from the UE (e.g. the UE 116) after the reception of the random-access response or absolute timing advance command MAC CE.

In other cases, a timing advance command [TS 38.321] [REF6], $T_A$, for a TAG indicates adjustment of a current $N_{TA}$ value, $N_{TA\_old}$, to the new $N_{TA}$ value, $N_{TA\_new}$, by index values of $T_A$=0, 1, 2, . . . , 63, where for a SCS of $2^\mu \cdot 15$ kHz, $N_{TA\_new}=N_{TA\_old}+(T_A-31)\cdot 16\cdot 64/2^\mu$.

If a UE has multiple active UL BWPs, as described in clause 12, in a same TAG, including UL BWPs in two UL carriers of a serving cell, the timing advance command value is relative to the largest SCS of the multiple active UL BWPs. The applicable $N_{TA\_new}$ value for an UL BWP with lower SCS may be rounded to align with the timing advance granularity for the UL BWP with the lower SCS while satisfying the timing advance accuracy requirements in [TS 38.133].

Adjustment of an $N_{TA}$ value by a positive or a negative amount indicates advancing or delaying the uplink transmission timing for the TAG by a corresponding amount, respectively.

For a timing advance command received on uplink slot n and for a transmission other than a PUSCH scheduled by a RAR UL grant or a fallbackRAR UL grant as described in clause 8.2A or 8.3, or a PUCCH with HARQ-ACK information in response to a successRAR as described in clause 8.2A, the corresponding adjustment of the uplink transmission timing applies from the beginning of uplink slot n+k+ $1+2^\mu \cdot K_{offset}$ where $$k = \left\lceil N_{slot}^{subframe,\mu} \cdot (N_{T,1} + N_{T,2} + N_{TA,max} + 0.5)/T_{sf} \right\rceil, N_{T,1}$$

is a time duration in msec of $N_1$ symbols corresponding to a PDSCH processing time for UE processing capability 1 when additional PDSCH DM-RS is configured, $N_{T,2}$ is a time duration in msec of $N_2$ symbols corresponding to a PUSCH preparation time for UE processing capability 1 [TS 38.214][REF4], $N_{TA,max}$ is the maximum timing advance value in msec that can be provided by a TA command field of 12 bits, $$N_{slot}^{subframe,\mu}$$

is the number of slots per subframe, $T_{sf}$ is the subframe duration of 1 msec, and $K_{offset}=K_{cell,offset}-K_{UE,offset}$, where $K_{cell,offset}$ is provided by cellSpecificKoffset and $K_{UE,offset}$ is provided by a Differential Koffset MAC CE command [TS 38.321][REF6]; otherwise, if not respectively provided, $K_{cell,offset}$=0 or $K_{UE,offset}$=0. $N_1$ and $N_2$ are determined with respect to the minimum SCS among the SCSs of configured UL BWPs for uplink carriers in the TAG and configured DL BWPs for the corresponding downlink carriers. For $\mu$=0, the UE expects $N_{1,0}$=14 [TS 38.214][REF4]. Slot n and $$N_{slot}^{subframe,\mu}$$

are determined with respect to the minimum SCS among the SCSs of configured UL BWPs for uplink carriers in the TAG. $N_{TA,max}$ is determined with respect to the minimum SCS among the SCSs of configured UL BWPs for uplink carriers in the TAG and for configured initial UL BWPs provided by initialUplinkBWP. The uplink slot n is the last slot among uplink slot(s) overlapping with the slot(s) of PDSCH reception assuming $T_{TA}$=0, where the PDSCH provides the timing advance command and $T_{TA}$ is defined in [TS 38.211][REF1].

If a UE changes an active UL BWP between a time of a timing advance command reception and a time of applying a corresponding adjustment for the uplink transmission timing, the UE determines the timing advance command value based on the SCS of the new active UL BWP. If the UE changes an active UL BWP after applying an adjustment for the uplink transmission timing, the UE expects a same absolute timing advance command value before and after the active UL BWP change.

If the received downlink timing changes and is not compensated or is only partly compensated by the uplink timing adjustment without timing advance command as described in [10, TS 38.133], the UE changes $N_{TA}$ accordingly.

If two adjacent slots overlap due to a TA command, the latter slot is reduced in duration relative to the former slot. The UE does not change $N_{TA}$ during an actual transmission time window for a PUSCH or a PUCCH transmission [TS 38.214][REF4].

Throughout the present disclosure, the term "configuration" or "higher layer configuration" and variations thereof (such as "configured" and so on) are used to refer to one or more of: a system information signaling such as by a MIB or a SIB (such as SIB1), a common or cell-specific higher layer/RRC signaling, or a dedicated or UE-specific or BWP-specific higher layer/RRC signaling.

Throughout the present disclosure, the term signal quality is used to refer to e.g. RSRP or reference signal received quality (RSRQ) or RSSI or signal-to-noise ratio (SNR) or SINR, with or without filtering such as L1 or L3 filtering, of a channel or a signal such as a reference signal (RS) including SSB, CSI-RS, or SRS.

The Synchronization Signal and PBCH block (SSB) includes primary and secondary synchronization signals (PSS, SSS), each occupying 1 symbol and 127 subcarriers, and PBCH spanning across 3 OFDM symbols and 240 subcarriers, but on one symbol leaving an unused part in the middle for SSS. The time locations of SSBs within a half-frame are determined by sub-carrier spacing and the periodicity of the half-frames where SSBs are transmitted is configured by the network. During a half-frame, different SSBs may be transmitted in different spatial directions (i.e. using different beams, spanning the coverage area of a cell).

Within the frequency span of a carrier, multiple SSBs can be transmitted. The PCIs of SSBs transmitted in different frequency locations do not have to be unique, i.e. different SSBs in the frequency domain can have different PCIs. However, when an SSB is associated with an remaining minimum system information (RMSI), the SSB is referred to as a Cell-Defining SSB (CD-SSB). A PCell is associated to a CD-SSB located on the synchronization raster.

Polar coding is used for PBCH. The UE may expect a band-specific sub-carrier spacing for the SSB unless a network (e.g., the network 130) has configured the UE to expect a different sub-carrier spacing. PBCH symbols carry its own frequency-multiplexed demodulation reference signal (DMRS). QPSK modulation is used for PBCH.

Four types of link adaptation are supported as follows:
Adaptive transmission bandwidth
Adaptive transmission duration
Transmission power control
Adaptive modulation and channel coding rate For channel state estimation purposes, the UE may be configured to transmit SRS that the gNB (e.g. the BS 102) may use to estimate the uplink channel state and use the estimate in link adaptation.

The gNB determines the desired uplink transmit power and provides uplink transmit power control commands to the UE. The UE uses the provided uplink transmit power control commands to adjust its transmit power.

Coverage is a fundamental aspect of cellular network deployments. Cellular operators rely on different types of network nodes to offer blanket coverage in their deployments. Deployment of regular full-stack cells, e.g., cells served by a gNB type base stations usually based results in expensive implementation, high cost for equipment and backhaul connectivity. Their deployment is subjected to a variety of constraints such as expensive site leases. While this is the predominant deployment type encountered in practice, it is not preferred cost-wise. As a result, other types of network nodes have been evaluated to increase cellular operators' economic flexibility for their network deployments.

For example, Integrated Access and Backhaul (IAB) was introduced in 5G NR Rel-16 and enhanced in Rel-17 as a new type of network node not requiring a wired backhaul. IAB nodes can be regarded as full-stack cells similar to gNBs. The IAB node is a new type of relay node building over the front-haul architecture and constituting a node with a dual role including an IAB Distributed Unit (DU) component making it appear as a regular cell to the UEs which it serves, and an IAB Mobile Terminal (MT) component inheriting many properties of a regular UE whereby the IAB node connects to its donor parent node(s) or a gNB. The IAB node is based on a Layer 2 architecture with end-to-end packet data convergence protocol (PDCP) layer from the donor IAB node to the UE for Control Plane (CP) and User Plane (UP). IAB nodes can also be classified as re-generative relays. Every packet traversing the link between the donor node and the integrated access backhaul-mobile termination (IAB-MT) component of the IAB node, i.e., the backhaul-link, must be properly decoded and re-encoded by the IAB node for further transmission to the UE on the access link. The first version of IAB in Rel-16 NR expects half duplex operation in time division multiplexing (TDM) between access and backhaul links for transmission and reception by the JAB node and includes features for forward compatibility towards evolving IAB using full duplex operation. Rel-17 NR further enhances IAB operation with better support of full duplex implementations of JAB nodes.

If the integrated access and backhaul distributed units (IAB-DU) and the IAB-MT of an IAB-node are subject to a half-duplex constraint, correct transmission/reception by one cannot be guaranteed during transmission/reception by the other and vice versa, e.g., when collocated and operating in the same frequency. If an IAB-node supports enhanced frequency or spatial multiplexing capabilities, additional multiplexing modes can be supported, i.e., simultaneous operation of IAB-MT Rx/IAB-DU Rx, IAB-MT Tx/IAB-DU Tx, IAB-MT Rx/IAB-DU Tx, IAB-MT Tx/IAB-DU Rx. An IAB-node can report its duplexing constraints between the IAB-MT and the collocated IAB-DU via F1 Application Protocol (F1AP). An IAB-node can indicate via F1AP whether or not FDM is required for an enhanced multiplexing operation.

The scheduler on an IAB-DU or IAB-donor-DU complies with the gNB-DU resource configuration received via F1AP, which defines the usage of scheduling resources to account for the duplexing constraint mentioned herein.

The resource configuration assigns an attribute of hard, soft, or unavailable to each symbol of each DU cell. Transmission/reception can occur for symbols configured as hard, whereas scheduling cannot occur, except for some special cases, for symbols configures as unavailable. For symbols configured as soft, scheduling can occur conditionally on an explicit indication of availability by the parent node via DCI format 2_5, or on an implicit determination of availability by the IAB-node. The implicit determination of availability is determined by the IAB-node depending on whether or not the operation of the IAB-DU would have an impact on the collocated IAB-MT.

The resource configuration can be shared among neighbouring IAB-nodes and IAB-donors to facilitate interference management, dual connectivity, and enhanced multiplexing.

To facilitate transitioning from IAB-MT to IAB-DU operation and vice versa, guard symbols can be used to overcome misaligned symbol boundaries between the IAB-MT operation and the IAB-DU operation (e.g., IAB-MT Rx boundaries are not aligned with the IAB-DU Tx boundaries). Specifically, an IAB-node can indicate to a parent node a number of desired guard symbols, while the parent node can indicate to the IAB-node the number of actually provided guard symbols for specific transitions.

An IAB-node supporting enhanced multiplexing capabilities, i.e., IAB-MT Rx/IAB-DU Rx, IAB-MT Tx/IAB-DU Tx, IAB-MT Rx/IAB-DU Tx, IAB-MT Tx/IAB-DU Rx, can provide, via MAC-CE to a parent node information to facilitate scheduling for enhanced multiplexing operation by the IAB-node, specifically:

recommended IAB-MT's Tx/Rx beams;

desired IAB-MT Tx PSD range;

desired parent node's IAB-DU Tx power adjustment; and/or required IAB-MT's uplink transmission timing mode.

Correspondingly, the parent node can provide information via MAC-CE to the IAB-node to facilitate enhanced multiplexing at the JAB-node and/or at the parent node:

restricted IAB-DU Tx beams;

actual parent node's IAB-DU Tx power adjustment; and/or

IAB-MT's uplink transmission timing mode.

Another type of network node is an RF repeater which amplifies-and-forwards any signal that it receives. RF repeaters have seen a wide range of deployments in 2G global system for mobile communications (GSM)/(E) general packet radio service (GPRS), 3G wideband code division multiple access (WCDMA)/HSPA and 4G LTE/LTE-A to supplement the coverage provided by regular full-stack cells. RF repeaters constitute the simplest and most cost-effective way to improve network coverage. The main advantages of RF repeaters are their low-cost, their ease of deployment and the fact that they do not much increase latency. Within RF repeaters, there are different categories depending on the power characteristics and the amount of spectrum that they are configured to amplify, e.g., single band, multi-band, and so on. RF repeaters are regarded non-regenerative type of relay nodes. RF repeaters are typically full-duplex nodes and do not differentiate between UL transmissions or DL receptions. LTE specifies RF repeater requirements in [TS 36.106]. Their use is limited to LTE frequency division duplexing (FDD) bands.

In Rel-17 NR, RF and electromagnetic compatibility (EMC) requirements in FR1 and FR2 for RF repeaters using NR were introduced. As NR often uses higher frequencies, e.g., 3-4 GHz in FR1 and above 24 GHz for FR2, propagation conditions are degraded when compared to lower frequencies in use by LTE. This exacerbates the coverage challenges for NR. More densification of cells becomes necessary. Massive MIMO operation in FR1, analog beamforming in FR2 and multi-beam operation with associated beam management in FR1 and FR2 are integral part of the NR design to cope with the challenging propagation conditions of these higher frequencies. Note that these NR frequency bands are typically TDD. In consequence, simultaneous or bi-directional amplify-and-forward as employed by common RF repeaters may not be necessary (unlike in the FDD LTE case) and can therefore be avoided. This reduces the noise pollution problem of regular RF repeaters which amplify both (undesired) noise and desired signal(s). Beamformed transmissions and receptions to/from individual NR users are a fundamental feature and inherent to NR operation. However, the use of a simple RF repeater with omnidirectional beamforming or with non-controlled beamforming implies that the beamforming gains for NR operation to provide coverage may not be fully available when relaying the NR transmissions and receptions.

Therefore, a new type of network node, bridging the gap between RF repeaters and IAB nodes is a proposition for system deployments to leverage the main advantages of both. That new type of network node, i.e., a smart repeater or network-controlled (NETCON) repeater (NCR) can use side control information (SCI) or NCR control information (NCI) to enable more functionality for an amplify-and-forward operation in a system, for example, with TDD access (unpaired spectrum) and multi-beam operation. SCI enables an NCR to perform the amplify-and-forward operation in a more efficient manner. Benefits include mitigation of unnecessary noise amplification, transmissions and receptions with improved spatial directivity, and simple network integration. In the control plane (C-plane), an NCR may be provided or configured by the gNB with information on semi-static and/or dynamic downlink/uplink configuration, adaptive transmitter/receiver spatial beamforming, Tx ON/OFF status, power control, and so on. In the user plane (U-plane), the NCR remains non-regenerative, e.g., the NCR employs amplify-and-forward to relay signals to/from UEs from/to the gNB. SCI transmission can be based on low capacity for the control backhaul between the donor cell(s), e.g., gNB and the NCR. As a result, the low-complexity and low-cost properties of RF repeaters are mostly preserved while a degree of network (e.g., the network 130) configurability and control is enabled similar to IAB or enhanced IAB (eIAB) nodes.

An NCR includes a NCR-mobile termination (NCR-MT) entity and a NCR-forward (NCR-Fwd) entity.

The NCR-MT is defined as a functional entity to communicate with a gNB via a Control link (C-link) to enable exchange of control information (e.g. side control information at least for the control of NCR-Fwd). The C-link is based on NR Uu interface.

The NCR-Fwd is defined as a functional entity to perform the amplify-and-forwarding of UL/DL RF signal between gNB and UE (or between gNB and an IAB node, or between an IAB node and a UE, or between two IAB nodes) via backhaul link and access link. The behavior of the NCR-Fwd will be controlled according to the received side control information from gNB.

Figure 6:
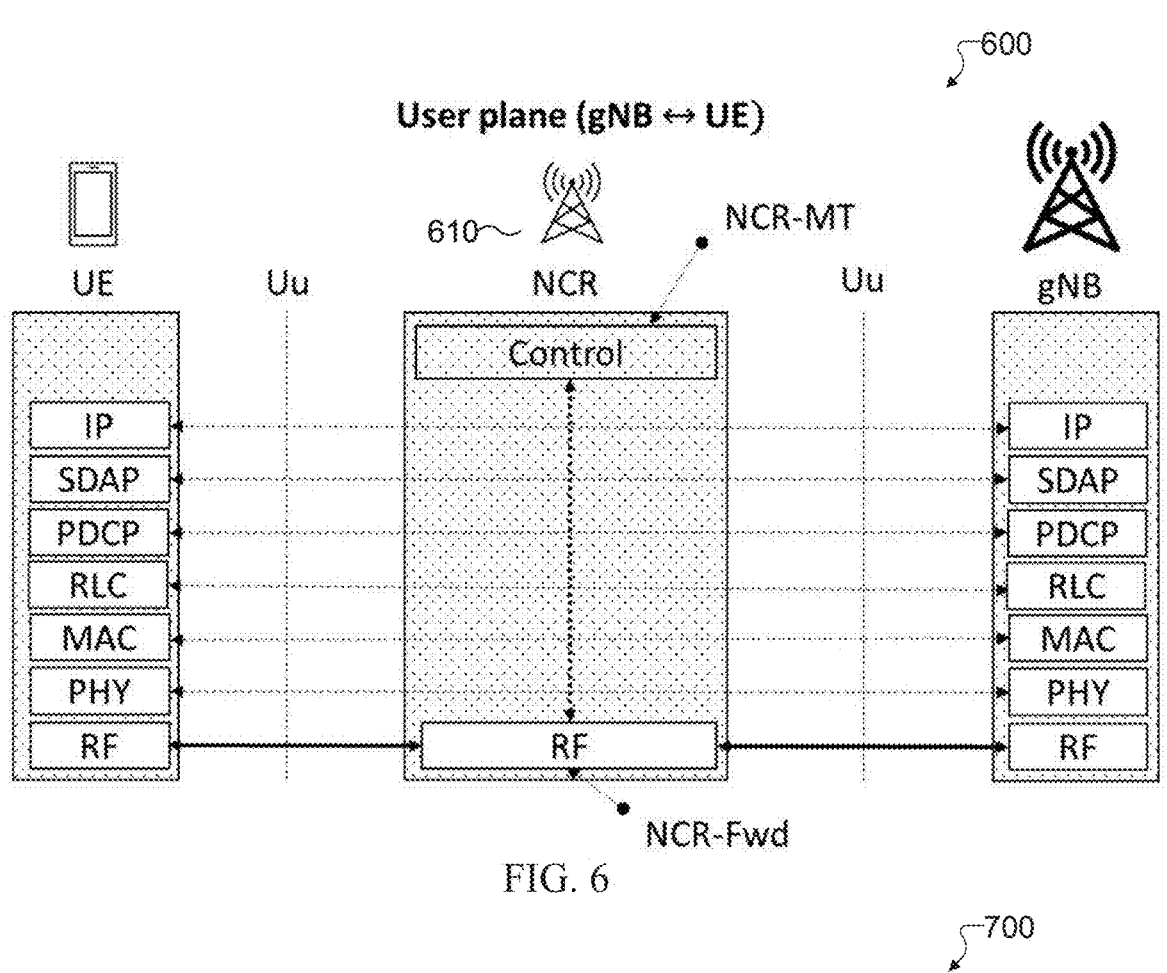
FIG. 6 illustrates a diagram of an example user plane (UP) protocol architecture for a network-controlled-repeater (NCR) according to embodiments of the present disclosure.

FIG. 6 illustrates a diagram 600 of an example UP protocol architecture for a NCR according to embodiments of the present disclosure. For example, diagram 600 of an example UP protocol architecture for a NCR can be utilized between any BS, such as BS 103, and any of the UEs 111-116, such as UE 111, in wireless network 100 of FIG. 1.

This example is for illustration only and other embodiments can be used without departing from the scope of the present disclosure.

Figure 7:
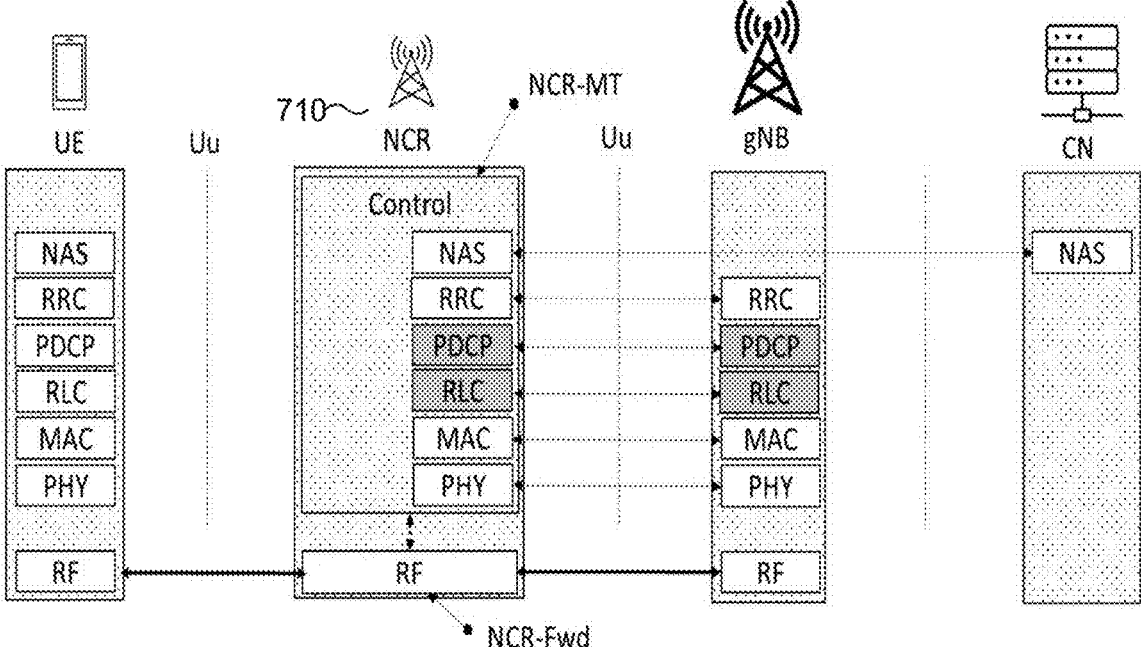
FIG. 7 illustrates a diagram of an example control plane (CP) protocol architecture for a NCR according to embodiments of the present disclosure.

FIG. 7 illustrates a diagram 700 of an example CP protocol architecture for an NCR according to embodiments of the present disclosure. For example, diagram 700 of an example CP protocol architecture for a NCR can be utilized between any BS, such as BS 102, and any of the UEs 111-116, such as UE 116, in wireless network 100 of FIG. 1. This example is for illustration only and other embodiments can be used without departing from the scope of the present disclosure.

FIG. 8 illustrates a diagram 800 of an example functional architecture for an NCR according to embodiments of the present disclosure. For example, diagram 800 of an example functional architecture for a NCR can be utilized between the BS 102 and the UE 116 in wireless network 100 of FIG. 1. The NCR includes circuitry, programing, or a combination thereof, to support a prioritization of UL transmissions. This example is for illustration only and other embodiments can be used without departing from the scope of the present disclosure.

FIG. 6, FIG. 7, and FIG. 8 show examples for the functional and protocol architectures of a Smart Repeater/ NCR. In the user plane (FIG. 6), the NCR receives the incoming RF signal from the gNB (or the UE) at its ingress antenna port, then amplifies-and-forwards the RF signal to its egress antenna port to the UE (or gNB). Note that similar to a common RF repeater, the amplified-and-forwarded signal traverses the RF path, e.g., is the signal is processed in analog domain. In the control plane (FIG. 7), e.g., when transmitting DL side control information (DL SCI) from gNB to the NCR, or when transmitting UL side control information (UL SCI) from the NCR to the gNB, the signal processing by the NCR may differ. For transmission of DL SCI, the gNB can use one or a combination of signaling options. DL SCI can be transmitted in L1, e.g., by DCI or in any DL control channel, in L2 MAC, e.g., by MAC CE(s) or as part of any DL data channel, in L2 RRC, e.g., by RRC signaling messages and/or IEs. Without loss of generality and illustration purposes, it may be expected that the NCR converts part of the incoming (DL) RF signal from the gNB to digital domain to determine presence and further process the received signaling contents of DL SCI. For transmission of UL SCI to the gNB, it may be expected that the NCR receives the incoming RF signal from the UE at its ingress antenna port, then amplifies-and-forwards the RF signal while adding the UL SCI following its conversion from digital signaling processing to analog domain for transmission at the egress antenna port (FIG. 8). For transmission of UL SCI, the NCR can use one or a combination of signaling options. UL SCI can be transmitted in L1, e.g., by an UL control or data channel, in L2 MAC, e.g., by MAC CE(s) or as part of any UL data channel, in L2 RRC, e.g., by RRC signaling messages and/or IEs. Note that the NCR may also be configured or provisioned or receive or transmit signaling messages using non-access stratum (NAS) protocol messages, such as control message (CM), session management (SM), and so on, and/or by operation and maintenance (O&M) signaling. Furthermore, transmission and reception of DL and UL SCI may occur using in-band signaling, e.g., using the same frequency band/channel as the amplified-and-forwarded UE signal(s), or may occur using out-of-band signaling, e.g., SCI is transmitted and received using a different band, channel or frequency range than the amplified-and-forwarded UE signal(s).

In some realizations, at least one of the NCR-MT's carrier(s) operates in the frequency band forwarded by the NCR-Fwd. In some realizations, NCR-MT and NCR-Fwd operate in a same frequency band. In general, an NCR-Fwd may operate with multiple passbands/carriers in same or different frequency band, and a corresponding NCR-MT may operate in one or more passbands/carriers, that can include passbands/carriers for NCR-Fwd operation, in one or more frequency bands. In one example, the NCR-MT may additionally or alternatively operate in carrier(s) outside the frequency bands in which NCR-Fwd operates. Herein, a passband can refer to a frequency range in which a repeater/NCR_Fwd operates in. Such frequency range can correspond to one or several consecutive nominal channels. When an operating frequency range for an NCR-Fwd is not continuous, each subset of channels may be regarded as an individual passband. An NCR-Fwd can have one or several passbands.

In some realizations, same large-scale properties of the channel, i.e., channel properties in Type-A and Type-D (if applicable) QCL, can be experienced by C-link and backhaul link, at least when the NCR-MT and NCR-Fwd are operating in a same frequency band.

For the transmission/reception of C-link and backhaul link by NCR:

Signalling on the DL of C-link and on the DL of backhaul link can be performed simultaneously or in a TDM manner.

Signalling on the UL of C-link and on the UL of backhaul link can be performed simultaneously or in a TDM manner.

The multiplexing can be under the control of the gNB with regards for NCR capability. Simultaneous transmission of the UL of C-link and UL of backhaul link can be also subject to NCR capability.

The term 'beam' is used to refer to a spatial filter for transmission or reception of a signal or a channel, for example by the NCR-Fwd. For example, a beam can be a main lobe of the radiation pattern of an antenna array, or a sub-array or an antenna panel, or of multiple antenna arrays, sub-arrays or panels combined, that are used for such transmission or reception.

Side control information (SCI) for NCR can include at least one or more of: beam information, timing information, TDD configuration information, ON-OFF information, and power control information.

Various methods can apply to beam information for NCR. For the backhaul link and C-link, both fixed beam and adaptive beam can be evaluated at NCR, where the fixed beam refers to the case that the beam for both C-link and backhaul-link of the NCR cannot be changed. Beam correspondence can be expected to apply for the DL/UL of the backhaul link at NCR-Fwd, as well as for the DL/UL of the C-link at NCR-MT.

Same TCI states as for the C-link can be expected for beams used by the NCR-Fwd for backhaul link if the NCR-MT's carriers are operating within the frequency band forwarded by the NCR-Fwd. In case that adaptive beams are used for the C-link and the backhaul link, the indication and determination of beams of the backhaul link can be provided, for example, by one of the following options:

Option 1: The beam of backhaul link is indicated by L1 control signalling, or MAC CE signalling, or RRC signalling via the indication of one or more beams from the set of beams of the C-link. This does not imply that the beam of backhaul link is indicated by the signalling.

Option 2: The beam of backhaul link is determined by a pre-defined rule, e.g., in slots/symbols with simultaneous DL receptions/UL transmissions in both C-link and backhaul link, the beam of backhaul link is same as the beam of C-link. Otherwise, the beam of backhaul link follows one of the beams of the C link or is separately provided/determined.

At least for the access link, beam information can be beneficial as side control information for a NCR to control the behaviour of the NCR for the access link.

The access link beam indication for NCR-Fwd can be indicated by a beam index that is provided by SCI, MAC CE, or RRC signalling.

The time domain resource corresponding to an access link beam is determined based on indicated time domain resources per beam indication. A single indication can indicate one or multiple beams. Different parameters may be indicated for beam indication based on SCI, or on MAC CE, or on RRC signalling.

Beam correspondence is expected for the DL/UL of the access link at NCR-Fwd, i.e., a DL beam and a UL beam on the access side which correspond to each other have same beam index. The forwarding direction of an indicated beam in access link can be determined based on its corresponding time domain resource and the TDD configuration.

Various methods may apply to timing information for NCR. The following can be regarded as a baseline:

The DL receive timing of the NCR-Fwd is aligned with the DL receive timing of the NCR-MT;

The UL transmit timing of the NCR-Fwd is aligned with the UL transmit timing of the NCR-MT;

The DL transmit timing of the NCR-Fwd is delayed after the DL receive timing of the NCR-MT (or the NCR-Fwd) by an internal delay; and/or The UL receive timing of the NCR-Fwd is advanced before the UL transmit timing of the NCR-MT (or the NCR-Fwd) by an internal delay.

In one example, transmission/reception boundaries at the NCR are aligned based on NCR implementation without signalling from the gNB.

Various options can be evaluated for TDD configuration information of an NCR. For example, at least semi-static TDD configuration may apply for C-link, backhaul link and access link.

On the flexible symbols based on the semi-static configuration (e.g., TDD-UL-DL-ConfigCommon, TDD-UL-DL-ConfigDedicated), the following options for a behaviour of the NCR-Fwd can be evaluated:

Option 1: The NCR-Fwd is expected to be OFF, or not forwarding, over these symbols;

Option 2: The NCR-Fwd can follow the TDD operation determined by NCR-MT, i.e., based on the received SFI indication or scheduling from the gNB without additional SCI; and/or Option 3: The NCR-Fwd can follow a SCI indicating DL/UL forwarding over these symbols to NCR-Fwd.

For example, a same TDD configuration may apply for backhaul link and access link. Additionally, a same TDD configuration may apply for C-link, backhaul link and access link at least if NCR-MT and NCR-Fwd operate in a same frequency band.

For example, for signalling of information for TDD UL/DL configuration, if the NCR-MT can acquire the TDD UL/DL configuration as a UE (e.g. the UE 116) or from OAM, new signalling may not be necessary.

Various methods can apply to ON-OFF information for a beam of the NCR. ON-OFF information can be beneficial for a NCR to control the behaviour of NCR-Fwd for interference management or power savings.

The NCR-Fwd is expected to be "OFF" unless otherwise indicated by the gNB. This can apply regardless of the RRC state of NCR-MT. The ON-OFF behaviour of NCR-Fwd can be indicated (e.g., when NCR-MT is in RRC-connected or discontinuous reception (DRX) state) when the NCR-MT is in RRC-idle/inactive.

At least the following options (or combination thereof) can be evaluated to indicate the ON-OFF information for a beam of the NCR from gNB (e.g. the BS 102) to NCR for controlling the behaviour of NCR-Fwd:

Option 1: Direct indication of ON-OFF state via SCI, MAC CE, or RRC signalling or indication of ON-OFF pattern in time Option 2: Indication of ON-OFF state via other side-control information (e.g., beam, DL/UL configuration, or power control information)

Various methods can be evaluated for power control information for determining a transmission power of NCR-Fwd. The controlling of the amplifying gain of NCR-Fwd can be viewed to enable power control of NCR-Fwd.

For the configuration of signalling, the NCR-MT can obtain the configuration for receiving the L1/L2 signalling of the side control information for example at least using one of the following methods:

Option 1: The configuration is from RRC.

Option 2: The configuration is from OAM or hard-coded.

Option 3: The configuration is partially configured by RRC and partially configured by OAM or hard-coded.

The configurations from RRC and/or OAM (or hard-coded) can contain:

The configurations of PHY channels providing L1/L2 signalling including:

The configurations for receiving PDCCH and PDSCH

The configurations for transmitting PUCCH, if applicable

The configurations for transmitting PUSCH, if applicable

The configurations of L1/L2 signalling including:

The configurations for DCI

The configurations for UCI, if applicable

The configurations for MAC CE, if applicable

For the parameters in the configurations for L1/L2 signalling, the existing parameters for PDCCH, PDSCH, PUCCH, PUSCH, DCI, UCI and MAC CE in Rel-17 are the baseline for further discussion.

In various embodiments, procedures using the term "UE" can be equally applicable to the NCR-MT.

A procedure for the NCR-MT to perform cell search, system information acquisition, random access procedure, UCI reporting, or PDCCH monitoring can be same as a corresponding one for a UE. A procedure for the NCR-MT to perform PDSCH reception, CSI-RS measurements and CSI determination, PUSCH transmission, or SRS transmission can be same as a corresponding one for a UE as described in [TS 38.214][REF4].

The NCR-Fwd transmits or receives only after the NCR-MT receives on the control link an indication for one or more beams [TS 38.106][REF14] for the NCR-Fwd to use for transmissions or receptions over corresponding one or more time resources on the access link.

When the NCR-MT performs a link recovery procedure as described in Clause 6 of [TS 38.213][REF3], the NCR-Fwd does not transmit or receive until the link recovery procedure is complete [TS 38.321][REF6].

The NCR can be provided, through the NCR-MT, tdd-UL-DL-ConfigurationCommon and, additionally, tdd-UL-DL-ConfigurationDedicated. The NCR-Fwd receives on the backhaul link or transmits on the access link only in symbols indicated as downlink by tdd-UL-DL-ConfigurationCommon or tdd-UL-DL-ConfigurationDedicated. The NCR-Fwd receives on the access link or transmits on the backhaul link only in symbols indicated as uplink by tdd-UL-DL-ConfigurationCommon or tdd-UL-DL-ConfigurationDedicated.

When the NCR simultaneously receives via both the control link and the backhaul link in a set of symbols, a TCI state for receptions on the backhaul link is same as a TCI state for receptions on the control link in the set of symbols. When the NCR simultaneously transmits via both the control link and the backhaul link in a set of symbols, a spatial filter for transmissions on the backhaul link is same as a spatial filter for transmissions on the control link in the set of symbols.

When the NCR does not simultaneously receive on the control link and the backhaul link:

If the NCR does not support determination of a TCI state for receptions on the backhaul link based on an indication of a TCI state by the serving cell, or if the NCR does not receive an indication of a TCI state, for receptions on the backhaul link [TS 38.321][REF6]:

If the NCR does not receive an indication of a unified TCI state for receptions by the NCR-MT, receptions on the backhaul link use same QCL parameters as the ones for PDCCH receptions in a CORESET with the lowest controlResourceSetId.

Else, receptions on the backhaul link use the QCL parameters provided by an indicated unified TCI state for receptions by the NCR-MT.

Else receptions on the backhaul link use QCL parameters provided by a TCI state in a MAC CE [TS 38.321][REF6].

When the NCR does not simultaneously transmit on the control link and the backhaul link If the NCR does not support determination of a spatial filter for transmissions on the backhaul link based on an indication of a unified TCI state or SRI by the serving cell, or if the NCR-MT does not receive an indication of a unified TCI state or SRI for determining a spatial filter, for transmissions on the backhaul link:

If the NCR does not receive an indication of a unified TCI state for transmissions by the NCR-MT, transmissions on the backhaul link use a same spatial filter as the one associated with the PUCCH resource with the smallest pucch-ResourceId in PUCCH-ResourceSet.

Else, transmissions on the backhaul link use a spatial filter corresponding to an indicated unified TCI state for transmissions by the NCR-MT.

Else transmissions on the backhaul link use a spatial filter corresponding to a unified TCI state or SRI provided by a MAC CE [TS 38.321][REF6].

The NCR-Fwd uses a same beam for transmissions and receptions on the access link during respective time resources associated with the beam.

The NCR can be provided by ncr-PeriodicFwdResource-SetToAddModList a list of sets of resources for transmissions or receptions on the access link. A set of resources, from the list of sets of resources, is provided by NCR-PeriodicFwdResourceSet and occurs with a periodicity provided by ncr-periodicity. A resource from the set of resources is provided by NCR-PeriodicFwdResource and includes a pair of a time resource provided by ncr-PeriodicTimeResource and a beam [TS 38.106][REF14] with an index provided by ncr-beamIndex. The time resource starts at a slot that is offset by slotOffsetPeriodic slots from the start of the period for the set of resources and at a symbol that is offset by symbolOffset from the start of the slot, and has a duration provided by durationInSymbols for a SCS provided by ncr-referenceSCS.

The NCR can be provided by ncr-SemiPersistentFwdResourceSetToAddModList a list of sets of resources for transmissions or receptions on the access link and a MAC CE command can indicate a set of resources for the NCR to use or to stop using based on a corresponding identity provided by ncr-SemiPersistentFwdResourceSetId [TS 38.321][REF6]. The NCR uses or stops using the set of resources starting from the first slot that is after slot $$k + 3N_{slot}^{subframe,\mu}$$

where k is the slot where the NCR-MT would transmit a PUCCH with HARQ-ACK information associated with the PDSCH providing the MAC CE command and μ is the SCS configuration for the PUCCH transmission. The set of resources is provided by NCR-SemiPersistentFwdResourceSet and occurs with a periodicity provided by ncr-periodicity. A resource from the set of resources is provided by NCR-SemiPersistentFwdResource and includes a pair of a time resource provided by ncr-SemiPersistentTimeResource and a beam with an index provided by ncr-beamIndex, where beamIndex can be updated by the MAC CE command. The time resource starts at a slot that is offset by slotOffsetSemiPersistent slots from the start of the period for the set of resources and at a symbol that is offset by symbolOffset from the start of the slot, and has a duration provided by durationInSymbols for a SCS provided by ncr-referenceSCS.

The NCR-MT can be configured to monitor PDCCH according to UE-specific search space (USS) sets for detection of a DCI format 2_8 with cyclic redundancy check (CRC) scrambled by an NCR-radio network temporary identifier (RNTI). A time resource and a corresponding beam index for transmissions or receptions on the access link are indicated by corresponding fields in DCI format 2_8 [TS 38.212][REF2]. When the NCR detects more than one DCI formats 2_8 that indicate beam indexes for time resources overlapping in a set of symbols, the NCR uses for the set of symbols a beam index that is indicated by a DCI format 2_8 that the NCR-MT detects in a most recent PDCCH monitoring occasion. The time resource starts at a slot that is offset by slotOffsetAperiodic slots from a reference slot and at a symbol that is offset by symbolOffset from the start of the slot, and has a duration provided by durationInSymbols for a SCS provided by ncr-referenceSCS. The reference slot is a slot that is after a slot of a PDCCH reception that provides the DCI format 2_8 by a number of slots indicated by an NCR capability such as frequency grid (FG) 43-3.

If:
A first time resource provided by NCR-SemiPersistentFwdResourceSet is indicated by a MAC CE command and is associated with a first beam index;
A second time resource is provided by NCR-PeriodicFwdResourceSet and is associated with a second beam index; and/or
The first time resource overlaps with the second time resource in a set of symbols, the NCR applies the first beam index for transmissions or receptions on the access link in the set of symbols.

If:
A first time resource is provided by NCR-PeriodicFwdResourceSet or NCR-SemiPersistentFwdResourceSet and is associated with a first beam index;
A second time resource is indicated by DCI format 2_8 and is associated with a second beam index provided by the DCI format 2_8; and/or
The first time resource overlaps with the second time resource in a set of symbols, the NCR applies, for transmissions or receptions on the access link in the set of symbols:
The first beam index if NCR-PeriodicFwdResourceSet or NCR-SemiPersistentFwdResourceSet includes priorityFlag; and/or
The second beam index if NCR-PeriodicFwdResourceSet or NCR-SemiPersistentFwdResourceSet does not include priorityFlag.

The NCR does not expect overlapping time resources provided by either NCR-PeriodicFwdResourceSet or NCR-SemiPersistentFwdResourceSet to be associated with different beam indexes.

DCI format 2_8 is used for notifying the aperiodic beam indication and associated time resources.

The following information is transmitted by means of the DCI format 2_8 with CRC scrambled by NCR-RNTI:
Beam index 1, Beam index 2, . . . , Beam index N where the bitwidth of each beam index field is determined by the higher layer parameter ncr-AperiodicBeamFieldWidth.
Time resource indication 1, Time resource indication 2, . . . , Time resource indication N where the bitwidth of each time resource indication field is determined by max $\{[\log_2(I)], 1\}$, where I is the number of time domain resources configured by ncr-AperiodicFwdConfig. The bit field indexes of a time resource indication field are mapped to the time domain resources configured by ncr-AperiodicFwdConfig according to an ascending order of a resource identity configured by ncr-AperiodicFwdTimeResourceId, with the bit field index 0 mapped to the time resource with the smallest resource identity.

The N beam indexes are sequentially associated with the N time resource indications with one-to-one mapping. N is configured by the higher layer parameter numberOfFields. The size of DCI format 2_8 is up to 128 bits.

The NCR Downlink Backhaul Beam Indication MAC CE is identified by MAC sub header with extended logical channel ID (eLCID) as specified in Table 6.2.1-1b of TS 38.321 [REF6]v17.6.0. It has a fixed size and includes a single octet defined as follows:
Downlink TCI state ID: This field is used to indicate the downlink beam to be used for backhaul link transmission. It contains TCI-StateId (comprising 7 bits), as specified in [TS 38.331][REF7], of a TCI State in the active DL BWP. The length of the field is 7 bits.
R: Reserved bit, set to 0.
The NCR Uplink Backhaul Beam Indication MAC CE is identified by MAC sub header with eLCID as specified in Table 6.2.1-1b of TS 38.321 [REF6]v17.6.0. It has a fixed size and includes a single octet defined as follows:
Uplink TCI state ID or SRI: This field is used to indicate the uplink beam to be used for backhaul link transmission. If the dl-OrJointTCI-StateList is configured as specified in [TS 38.331][REF7] and unifiedTCI-StateType is configured with a value joint, this field contains TCI-StateId (comprising 7 bits) of a Joint TCI State configured in the active DL BWP, which is used as the uplink beam indication for backhaul link transmission. If the ul-TCI-StateList is configured as specified in [TS 38.331][REF7], this field contains TCI-UL-State-Id (contained in the 6 rightmost bits) of an UL TCI State configured in the active UL BWP which is used as the uplink beam indication for backhaul link transmission, with the 1 remaining bit set to zero. Otherwise, this field contains an SRI (contained in the 4 rightmost bits) referring to an SRS-ResourceID configured in the active UL BWP which is used as the uplink beam indication for backhaul link transmission, with the 3 remaining bits set to zero.

R: Reserved bit, set to 0.

The NCR Access Link Beam Indication MAC CE is identified by MAC sub header with eLCID as specified in Table 6.2.1-1b of TS 38.321 [REF6]v17.6.0. It has a variable size and includes the following fields:

Resource set ID: This field is used to indicate one of forwarding semi-persistent resource lists signalled in NCR-SemiPersistentFwdResourceSet (as specified in [TS 38.331][REF7]). The field contains a list ID (comprising 5 bits);

A/D: If the value of this field is set to 1, the forwarding resource list indicated in Resource list ID field is being activated. If the value of this field is set to 0, the forwarding resource list indicated in Resource list ID field is being deactivated;

C: If the value of this field is set to 1, the Beam index $ID_1$ field is present. If the value of this field is set to 0, the Beam index $ID_1$ field is absent. This field can be set to 1 only if MAC CE is used for activation, i.e., when the A/D field is set to 1. If MAC CE is used for deactivation, this field is set to 0;

Beam index $ID_1$: This field indicates the updated beam index for forwarding resources within the list indicated by the Resource list ID field. Beam index $ID_0$ indicates the beam index for the first forwarding resource within the list; Beam index $ID_1$ indicates the beam index for the second forwarding resource within the list and so on. The length of the field is 6 bits; and/or R: Reserved bit, set to 0.

Various embodiments, methods, and examples described in the present disclosure can apply beyond NCR/smart repeaters nodes to other nodes with a repeater/relay-like functionality in a wireless network (e.g. the wireless network 100), such as reconfigurable intelligent surfaces (RIS), or to stationary or non-stationary repeater/relay-like nodes that are not on the ground, for example, satellites in non-terrestrial networks (NTN), mobile repeaters on buses/trains/vessels/ships/aircrafts/drones/UAVs, and so on.

When an NCR node is deployed in a wireless communication system, the NCR first establishes its identity and capabilities for operation in the system. For example, the NCR is identified and/or authenticated by the radio access network (RAN), including one or more gNB(s), or the Core Network (CN). For example, the NCR indicates capabilities of the corresponding NCR-MT or NCR-Fwd to the gNB. For example, the NCR can use RRC signaling to inform capabilities for NCR-MT, and use OAM signaling or configuration to inform capabilities for NCR-Fwd. For example, NCR-Fwd capabilities can be based on those provided in the NCR manufacturer's declarations.

In one example, when an architecture of an NCR-MT supports limited protocols compared to a UE, such as support only for physical (PHY) or medium access control (MAC) layers, the NCR-MT can perform initial random access, for example for the purpose of establishing beam, timing, or identification, without establishing an RRC connection (over the air). In one example, the NCR does not support any RRC protocol procedures/signaling. In another example, the NCR supports a simplified RRC configuration, such as one with a limited set of IEs, that are provided to the NCR-MT using PHY or MAC signaling or using SIB messages. For example, the simplified RRC configuration can be based on cell-specific reference signals such as SSBs, without any NCR-specific reference signals such as CSI-RS or SRS. In yet another example, the NCR-MT is provided pre-configuration for higher layers, such as for RRC layer/protocol, or via operation and management (OAM) signaling for example at the time of deployment, instead of establishing the RRC connection over the air.

In one example, an architecture for the NCR-MT includes a full protocol stack, including RRC configuration/signaling. In such case, once NCR-MT establishes an RRC connection/configuration, the NCR-MT can exchange RRC messages with the gNB for the purpose of identification.

In one embodiment, an NCR can operate with NCR-MT in a first carrier frequency and with NCR-Fwd in a second carrier frequency. The first and second carrier frequencies can be in a same or in different frequency bands or in a same or in different frequency ranges. For example, NCR-MT operates in FR1 and NCR-Fwd operates in FR2. Such mode of operation for NCR may be referred to as "out-of-band" operation (for example, unlike an "in-band" operation where NCR-MT and NCR-Fwd are operating with same carrier frequency or within same frequency band/range). Out-of-band operation for NCR can include scenarios similar to inter-band CA, intra-band non-contiguous CA, and intra-band contiguous CA for typical UEs. When NCR-MT and NCR-Fwd operate in different carrier frequencies or different frequency bands/ranges, some parameters, settings, or information applicable to NCR-MT and NCR-Fwd can be different, such as different TDD configurations, or different sets of beams/TCI states/SRIs for C-link or BH-link, or different timing alignment/offset values. The NCR can be provided information for such different parameters or settings via OAM or via gNB signaling such as RRC configuration, or via MAC-CE, and so on, separately for NCR-MT and for NCR-Fwd, or the NCR such as NCR-MT can determine parameters or settings for NCR-Fwd based on those for NCR-MT or based on RS/beam measurements. The distinction of in-band vs. out-of-band NCR operation can be also in a functional or operational perspective instead of the operating carrier frequency/band/range, and can be based on whether/how the operation of NCR-Fwd is impacted by that of NCR-MT, such that the corresponding inputs, or outputs, or TDD configuration, or sets of beams/TCI states/SRIs, timing adjustments, and so on (e.g., whether or not NCR is provided separate parameters for NCR-Fwd operation or whether or not the NCR supports corresponding capabilities).

Various embodiments and examples apply to an NCR-MT and an NCR-Fwd, each with a single cell/passband/carrier frequency/frequency band/frequency range, that operate in out-of-band mode of operation is previously or subsequently described. Various embodiments and examples can directly apply or can be extended also to settings where one or both of NCR-MT and NCR-Fwd operate with more than one cells/passbands/carrier frequencies/frequency bands/frequency ranges.

In one example, NCR-MT operates in a first carrier frequency and NCR-Fwd operates in a second carrier frequency, wherein the first and second carrier frequencies are different and within a same frequency band. In another example, NCR-MT operates in a first frequency band/range and NCR-Fwd operates in a second frequency band, different from the first frequency band/range. For example, NCR-MT operates in a first cell/passband, and NCR-Fwd operates in a second cell/passband, different from the first cell/passband.

In one example, the NCR-MT operates in a single cell or passband or carrier frequency/band/range, and NCR-Fwd also operate in a single, different, cell or passband or carrier frequency/band/range.

For example, NCR-MT operates in a first set of cells or passbands or carrier frequencies or frequency bands or frequency ranges, and NCR-Fwd operates in a second set of cells or passbands or carrier frequencies or frequency bands or frequency ranges, wherein the second set of cells or passbands or carrier frequencies or frequency bands or frequency ranges includes at least a cell or passband or carrier frequency or frequency band or frequency range that is not included in the first set of cells or passbands or carrier frequencies or frequency bands or frequency ranges.

For example, NCR-MT/C-link can operate in FR1, and NCR-Fwd/Access link/BH link operate in FR2. For example, NCR-MT/C-link can operate in a first FR2 band such as 28 GHz, and NCR-Fwd/Access link/BH link can operate in a second FR2 band such as 39 GHz. Such operation is similar to inter-band carrier aggregation (CA) operation for a typical UE.

For example, NCR-MT/C-link can operate in a first part of an FR2 band such as a first 200-400 MHz passband/cell on a 28 GHz band, and NCR-Fwd/Access link/BH-link can operate in a second part of an FR2 band such as a second 200-400 MHz passband/cell on the 28 GHz band. For example, the NCR-MT and NCR-Fwd can operate with two separate RF chains/antennas corresponding to the two part of the FR2/28 GHz band. Such operation can be similar to intra-band non-contiguous CA or intra-band contiguous CA operation for a typical UE.

In one example, out-of-band operation may refer to operation with a minimum gap between the carrier frequency of NCR-MT and NCR-Fwd. For example, when NCR-MT and NCR-Fwd operate in different passbands/frequency bands/ranges, the NCR operation can be regarded as out-of-band operation. For example, when NCR-MT and NCR-Fwd operate in different cells/carrier frequencies of a same passband or a same frequency band/range, the NCR operation can be regarded as in-band operation. In one example, out-of-band operation may refer to the carrier frequencies of the cells/passbands for NCR-MT and NCR-Fwd to have a minimum gap, such as a predetermined or (pre)configured frequency offset, in number of RBs in a certain reference SCS, or an absolute frequency offset, such as X kHz, or X MHz or X GHz, and so on. For example, a cell/carrier/BWP bandwidth for the NCR-MT can partially or fully overlap, in frequency domain, with a cell/passband for the NCR-Fwd. For example, a cell/carrier/BWP bandwidth for the NCR-MT can be a subset or a superset, including a strict or proper subset or super set, in frequency domain, of a cell/passband for the NCR-Fwd.

In one example, conditions described herein on the operation frequency are necessary but not sufficient for an out-of-band NCR. For example, out-of-band operation for NCR may be defined additionally in terms of one or more operational or functional conditions. For example, out-of-band NCR may refer to operation of NCR-MT and NCR-Fwd with different TDD configurations. For example, when an NCR is provided different TDD configurations for NCR-MT and NCR-Fwd (in addition to different operating frequencies as described herein), the NCR operation can be regarded as out-of-band operation. For example, when an NCR is provided different sets of beams/TCI states/SRIs for C-link and BH-link, (in addition to different operating frequencies as described herein), the NCR operation can be regarded as out-of-band operation. For example, when an NCR is provided or applies different timing advance values, or different corresponding timing offsets, for transmissions or receptions on C-link and BH-link (in addition to different operating frequencies as described herein), the NCR operation can be regarded as out-of-band operation. For example, when an NCR has different quasi co-location (QCL) properties/assumptions, such as QCL Type-A/B/C or QCL Type-D, for the C-link and the BH-link (in addition to different operating frequencies as described herein), the NCR operation can be regarded as out-of-band operation.

In another example, conditions described herein on the operating frequency are not necessary, and the NCR in-band or out-of-band operation may be defined (only) in terms of one or more operational or functional conditions or based on gNB indication. For example, when an NCR is provided different TDD configurations for NCR-MT and NCR-Fwd, the NCR operation can be regarded as out-of-band operation. For example, when an NCR is provided different sets of beams/TCI states/SRIs for C-link and BH-link, the NCR operation can be regarded as out-of-band operation. For example, when an NCR is provided or applies different timing advance values, or different corresponding timing offsets, for transmissions or receptions on C-link and BH-link, the NCR operation can be regarded as out-of-band operation. For example, when an NCR has different quasi co-location (QCL) properties/assumptions, such as QCL Type-A/B/C or QCL Type-D, for the C-link and the BH-link, the NCR operation can be regarded as out-of-band operation.

In one example, the NCR reports a capability for supporting out-of-band operation. For example, the capability can be reported per band or per band combination (BC). For example, the capability report can be per band or per BC supported by NCR-Fwd and/or NCR-MT. For example, the capability report can be per pair of bands or pair of BCs wherein a first entry of the pair refers to a band or BC for the NCR-MT and a second entry of the pair refers to a band or BC for NCR-Fwd. For example, the capability can be reported per NCR-MT, such as one value (support or no support), that can be applicable to bands or BCs supported by the NCR-Fwd and/or NCR-MT. For example, the NCR capability report can be using a bitmap, with each bit of the bitmap corresponding to a band or a BC or a pair of bands or a pair of BCs and so on.

In one example, an out-of-band mode may impact some of the NCR-Fwd operations. For example, both NCR-MT and NCR-Fwd may operate with a same TDD configuration, while they are provided different (sets) of TCI states or SRIs for C-link and BH-link beam determination. For example, both NCR-MT and NCR-Fwd may operate with a same set of TCI states or SRIs for C-link and BH-link, while they are provided different timing offset values for NCR-MT and NCR-Fwd. For example, an NCR capability for any of the operations herein (or similar operations) can be regarded as supporting out-of-band operation. Alternatively, a single unified NCR capability for out-of-band operation may not be defined, rather a separate NCR capability may be reported for each aspect outlined herein (e.g., TDD, timing, beam). For example, a single unified higher layer parameter, such as a single RRC parameter, may not be defined to indicate out-of-band operation, rather a separate RRC parameter may be configured for each aspect outlined herein (e.g., TDD, timing, beam).

For example, when an NCR declares/reports a capability (via OAM or RRC signaling) for out-of-band operation on a first band for NCR-MT and a second band for NCR-Fwd, the NCR-MT can access a cell on the first band using typical mechanisms for cell search and RRC establishment, and can be provided a configuration for NCR-Fwd operation (in a cell in) in the second band (via OAM or RRC signaling).

For example, when an NCR declares/reports a capability (via OAM or RRC signaling) for out-of-band operation on a first band for NCR-MT and (a band from) a list of bands for NCR-Fwd, the NCR-MT can access a cell on the first band using typical mechanisms for cell search and RRC establishment, and can be provided a configuration for NCR-Fwd operation (in a cell in) in a second band from the list of bands (via OAM or RRC signaling). For example, RRC signaling indicates which one or more cells/bands is to be used for operation of NCR-Fwd. For example, L1/L2 signaling such as a DCI format or a MAC-CE can be used to indicate which one or more cells/passbands/bands to be used for operation of the NCR-Fwd.

In one embodiment, NCR-MT and NCR-Fwd can operate with different TDD configurations. The NCR (via NCR-MT) can be provided common or dedicated TDD configurations for NCR-Fwd separate from those for NCR-MT. The NCR-MT can acquire TDD configurations for NCR-Fwd (separate from those for NCR-Fwd) from RRC signaling or from a SIB1 corresponding to the cells/passbands in which the NCR-Fwd is operating (where the corresponding SIB1 can be acquired by the NCR-MT or can be directly provided to NCR-MT via RRC signaling as assistance information). The TDD configurations provided to the NCR-MT and NCR-Fwd can be separate and consistent/nonconflicting (such as for intra-band case), or can be conflicting such as DL direction for NCR-MT and UL direction for NCR-Fwd or vice versa (for example, for inter-band case). In case of consistent TDD configuration, the NCR determines a reference cell/entity and other cells/entity follow the TDD configuration/indications corresponding to the reference cell/entity. In case of conflicting TDD UL-DL configurations, each of NCR-MT and NCR-Fwd can follow the corresponding TDD configuration, and the NCR-MT can provide assistance-information to the gNB (e.g. the BS 102) in terms of recommended beams or non-desired/restricted beams or Tx/Rx power adjustments for NCR-MT or NCR-Fwd, or the gNB can provide indications to the NCR-MT regarding restricted beams or Tx/Rx power adjustments for NCR-MT or for NCR-Fwd. Such assistance information or indication can reduce the self-interference level between NCR-MT and NCR-Fwd in case of conflicting TDD configurations or indications.

In one example, NCR-MT operates with a first TDD configuration and NCR-Fwd operates with a second TDD configuration, different from the first TDD configuration. In one example, the first and second TDD configurations are defined with respect to a same SCS configuration, such as when NCR-MT are in different carrier frequencies of a same band (similar to intra-band contiguous CA or intra-band non-contiguous CA). In another example, the first and second TDD configurations are defined with respect to different corresponding SCS configurations, such as when NCR-MT and NCR-Fwd are in different frequency bands/ranges (similar to inter-band CA). For example, transmissions/receptions on the C-link are based on a first SCS and transmissions/receptions on the BH-link are based on a second SCS. The second TDD configuration can include one or both of a common TDD configuration for a cell/passband in which the NCR-Fwd operates as well as a dedicated TDD configuration for the NCR-Fwd. For example, the NCR (such as NCR-MT) can be provided separate common TDD configurations for NCR-MT and NCR-Fwd. For example, the NCR (such as NCR-MT) can be provided same common TDD configuration and separate dedicated TDD configurations for NCR-MT and NCR-Fwd.

For example, the NCR is provided the first or the second TDD configurations via OAM or via RRC signaling. For example, the NCR-MT acquires the first or the second TDD configurations via system information, such as master information block (MIB) or system information block 1 (SIB1) or a SIBx (x>1), such as one dedicated to NCR nodes, or based on common or dedicated RRC signaling.

For example, the NCR-MT can receive a higher layer signaling such as one or more of NCR-Fwd-Config or ServingCellConfig-NCR-Fwd or ServingCellConfigCommon(-NCR-Fwd) with various information elements (IEs) corresponding to out-of-band operation such as for TDD configuration, beamforming information, timing information, and so on. For example, the NCR-MT can receive separate RRC parameters for each aspect of out-of-band operation, such as a first RRC parameter for the TDD configuration, and a second RRC parameter for beamforming information, and a third RRC parameter for timing information, and so on, each of which can be independent from other RRC parameters. For example, depending on the setting such as inter-band or intra-band, each of the parameters may not be applicable. For example, the NCR-MT can be provided SIB1 information elements or common/dedicated/cell-specific configuration IEs corresponding to a cell/passband associated with the NCR-Fwd.

```
ServingCellConfig-CNR-Fwd ::=                SEQUENCE {
    tdd-UL-DL-ConfigurationDedicated-NCR-Fwd TDD-UL-DL-ConfigDedicated
OPTIONAL, -- Cond TDD ...
}
ServingCellConfigCommon ::=        SEQUENCE {
    physCellID                     PhysCellId                     OPTIONAL, -- Cond
HOAndServCellAdd, % this refers to the cell ID for the cell / passband of NCR-Fwd
    tdd-UL-DL-ConfigurationCommon              TDD-UL-DL-ConfigCommon
OPTIONAL, -- Cond TDD

...,
}
```

For example, the NCR can determine the second TDD configuration based on the first TDD configuration, or based on side control information (SCI) provided for NCR-Fwd operation such as configurations/indications provided for periodic or semi-persistent or dynamic Access link beam indication. For example, SCI for one or more of periodic or semi-persistent or dynamic Access link beam indication can include information for UL or DL direction of corresponding (sets of) time resources.

Figure 10:
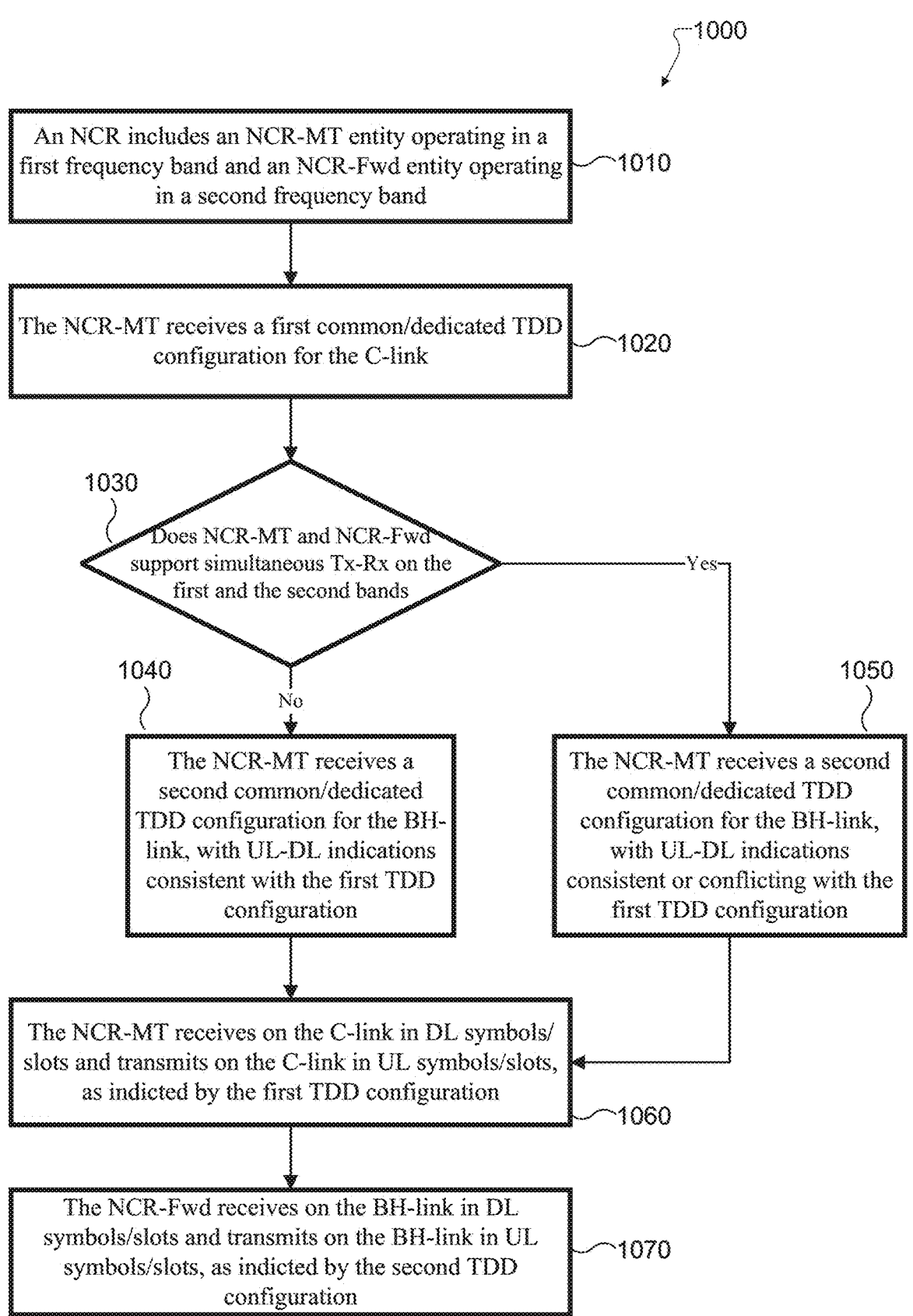
FIG. 10 illustrates a flowchart of an example NCR procedure for consistent vs. conflicting TDD configurations according to embodiments of the present disclosure.

FIG. 10 illustrates a flowchart of an example NCR procedure 1000 for consistent vs. conflicting TDD configurations according to embodiments of the present disclosure. For example, procedure 1000 for consistent vs. conflicting TDD configurations can be followed by the NCR 710 of FIG. 7. This example is for illustration only and other embodiments can be used without departing from the scope of the present disclosure.

The procedure begins in 1010, a NCR includes an NCR-MT entity operating in a first frequency band and an NCR-Fwd entity operating in a second frequency band. In 1020, the NCR-MT receives a first common/dedicated TDD configuration for the C-link. In 1030, the NCR determines whether the NCR-MT and NCR-Fwd support simultaneous Tx-Rx on the first and the second bands. If the NCR determines that the NCR-MT and NCR-Fwd do not support simultaneous transmission and reception (Tx-Rx) on the first and the second bands, in 1040 the NCR-MT receives a second common/dedicated TDD configuration for the BH-link, with UL-DL indications consistent with the first TDD configuration. If the NCR determines that the NCR-MT and NCR-Fwd support simultaneous Tx-Rx on the first and the second bands, in 1050 the NCR-MT receives a second common/dedicated TDD configuration for the BH-link, with UL-DL indications consistent or conflicting with the first TDD configuration. In 1060, the NCR-MT receives on the C-link in DL (or flexible) symbols/slots and transmits on the C-link in UL (or flexible) symbols or slots, as indicated by the first TDD configuration. In 1070, the NCR-Fwd receives on the BH-link and transmits on the Access link in DL (or flexible) symbols/slots, and receives on the Access link and transmits on the BH-link in UL (or flexible) symbols or slots, as indicated by the second TDD configuration.

In one example, the second TDD configuration has no conflicting directions with the first TDD configuration. For example, the second TDD configuration includes a downlink (respectively, uplink) configuration for a direction of a slot or symbol that is configured as a downlink (respectively, uplink) slot or symbol in the first TDD configuration. For example, the second TDD configuration includes a downlink (respectively, uplink) configuration for a direction of a second slot or symbol that overlaps with a first slot or symbol that is configured as a downlink (respectively, uplink) slot or symbol in the first TDD configuration. For example, the NCR does not expect a second slot or symbol to be downlink (respectively, uplink) for the second TDD configuration when the second symbol or slot is uplink (respectively, downlink) for the first TDD configuration or when the second symbol or slot overlaps with a first symbol or slot that is uplink (respectively, downlink) for the first TDD configuration.

For example, a second symbol or slot can be configured as downlink (respectively, uplink) by the second TDD configuration when the second symbol or slot is configured as flexible by the first TDD configuration, or when the second symbol or slot overlaps with a first symbol or slot that is configured as flexible by the first TDD configuration. For example, the first TDD configuration is 'sparse' with few symbols having fixed D or U direction and with many symbols having F direction, and the second TDD configuration maintains the D/U symbols or slots and replaces some of the F symbols or slots with D or U.

Such consistent TDD configuration between NCR-MT and NCR-Fwd can apply, for example, when NCR-MT and NCR-Fwd operate in different carrier frequencies/cells/passbands of a same frequency band (similar to intra-band non-contiguous CA or intra-band contiguous CA).

In another example, the second TDD configuration can be different from, such as having symbols with conflicting directions than, the first TDD configuration. For example, a second slot or symbol can be configured as downlink (respectively, uplink) by the second TDD configuration when the second symbol or slot is configured as uplink (respectively, downlink) by the first TDD configuration or when the second symbol or slot overlaps with a first symbol or slot that is configured as uplink (respectively, downlink) by the first TDD configuration.

Such different/conflicting TDD configurations can apply, for example, when NCR-MT and NCR-Fwd operate in different frequency bands/ranges (similar to inter-band CA), such as when NCR-MT operates in FR1 and NCR-Fwd operates in FR2, or when NCR-MT and NCR-Fwd operate in different (sufficiently spaced for inter-band UL-DL interference) frequency bands in FR2, such as NCR-MT in 28 GHz and NCR-Fwd in 39 GHz.

Such different/conflicting TDD configurations can also apply, for example, when NCR-MT and NCR-Fwd operate in different carrier frequencies/cells/passbands within a same band (similar to intra-band non-contiguous CA or intra-band contiguous CA), and when the NCR is capable of simultaneous transmission and reception on the corresponding carrier frequencies/cells/passbands (such as full-duplex capability).

When the NCR operates in different carrier frequencies/cells/passbands within a same band (similar to intra-band non-contiguous CA or intra-band contiguous CA), or when an NCR is not capable of simultaneous transmission and reception on corresponding carrier frequencies/cells/passbands (such as half-duplex capability), the NCR may not expect different/conflicting TDD configurations. For example, the NCR-MT can determine a reference NCR cell/entity as subsequently described, such that other NCR cells/entities follow TDD configurations/indications corresponding to the reference cell/entity.

In one example, supporting different/conflicting TDD configurations for NCR-MT and NCR-Fwd, such as simultaneous or overlapping transmission/receptions on NCR-MT and NCR-Fwd with different/conflicting link directions, can be based on NCR capability. For example, the NCR can use different RF chains or antennas/antenna arrays/sub-arrays/panels for NCR-MT and NCR-Fwd to be able to support different or conflicting TDD configurations. For example, NCR-MT uses a first RF chain or antenna panel and NCR-Fwd uses a second RF chain or antenna panel. For example, NCR-MT and NCR-Fwd share a same RF chain or antenna panel. For example, the NCR reports such capability per NCR-MT or per band or per BC, such as among bands or BCs that are supported by NCR-Fwd or NCR-MT.

For example, an NCR capability for supporting or not supporting different/conflicting TDD can be based on existing UE features, as described in TS 38.306 [REF9], v17.5.0, such as simultaneousRxTxInterBandCA, or simultaneousRxTxInterBandCAPerBandPair, or half-DuplexTDD-CA-SameSCS. In another example, separate NCR capabilities can be defined to indicate a support for handling the different/conflicting TDD UL-DL configurations.

FIG. 11 illustrates a flowchart of an example NCR procedure 1100 for determination of reference NCR entity/cell for non-conflicting TDD configuration/operation between NCR-MT and NCR-Fwd according to embodiments of the present disclosure. For example, procedure 1100 for determination of reference NCR entity/cell for non-conflicting TDD configuration/operation between NCR-MT and NCR-Fwd can be performed by either NCR 610 or NCR 710. This example is for illustration only and other embodiments can be used without departing from the scope of the present disclosure.

The procedure begins in 1110, a NCR includes an NCR-MT entity operating in a first frequency band and an NCR-Fwd entity operating: (i) in a second frequency band and the NCR-MT and the NCR-Fwd does not support simultaneous Tx-Rx on the first and the second bands, or (ii) in the first frequency band. In 1120, the NCR-MT receives a first common/dedicated TDD configuration for the C-link. In 1130, the NCR-MT receives a second common/dedicated TDD configuration for the BH-link. In 1140, the NCR-MT determines a smallest cell of NCR-MT as a reference entity/cell for determination of TDD configurations. In 1150, the NCR-MT determines that symbols/slots indicated as DL by the first TDD configuration or by RRC configuration of DL channels or signals on the reference entity/cell (or by DCI format 2_0 or by a DCI format scheduling DL reception on the reference entity/cell), are DL (or flexible) in the second TDD configuration. For example, the NCR-MT determines that symbols/slots indicated as DL by the first TDD configuration or by RRC configuration of DL channels or signals on the reference entity/cell (or by DCI format 2_0 or by a DCI format scheduling DL reception on the reference entity/cell), are DL in the second TDD configuration, otherwise the NCR-Fwd is OFF in the symbol on the second cell. In 1160, the NCR-MT determines that symbols/slots indicated as UL by the first TDD configuration or by RRC configuration of UL channels or signals on the reference entity/cell (or by DCI format 2_0 or by a DCI format scheduling UL transmission on the reference entity/cell), are indicated as UL (or flexible) by the second TDD configuration. For example, the NCR-MT determines that symbols/slots indicated as UL by the first TDD configuration or by RRC configuration of UL channels or signals on the reference entity/cell (or by DCI format 2_0 or by a DCI format scheduling UL transmission on the reference entity/cell), are indicated as UL by the second TDD configuration, otherwise the NCR-Fwd is OFF in the symbol on the second cell.

In one embodiment, an NCR-MT can determine a reference NCR cell/entity such that TDD configurations or RRC information or DCI formats that indicate/determine TDD configurations corresponding to other NCR cells/entity follow (i.e., are consistent with) those of the reference NCR cell/entity. Such method can be beneficial, for example, for an NCR node with NCR-MT and NCR-Fwd operating in different carrier frequencies in a same frequency band/range (similar to intra-band contiguous CA or intra-ban non-contiguous CA) or an NCR without a capability for simultaneous or overlapping transmission and reception on the C-link of NCR-MT and BH-link of NCR-Fwd or vice versa, such as an NCR with single RF chain or antenna panel shared by NCR-MT and NCR-Fwd. The NCR-MT can be provided predetermined rules to determine the reference cell/entity for TDD configuration.

For example, a reference NCR entity for a symbol can be set to NCR-MT or set to NCR-Fwd or can be one of NCR-MT or NCR-Fwd that is configured with a lower (respectively, higher) SCS configuration. For example, the SCS configuration can be that for the corresponding C-link or BH-link/Access link, or that for the corresponding active BWP, or that for the corresponding TDD common or dedicated TDD configuration, or can be an explicit SCS provided for the NCR-MT/C-link, or NCR-Fwd/BH link.

In one example, when the NCR operates with multiple cells for NCR-MT or multiple cells/passbands for NCR-Fwd in a symbol, the NCR determines a reference cell from the reference NCR entity. The reference NCR entity can be determined as previously described. The reference cell can be a cell with smallest/largest cell index (and/or with smallest/largest SCS configuration) among configured/activated/active cells for the corresponding reference NCR entity in the symbol. In one example, the NCR-MT determines a same reference entity/cell for some/all applicable NCR bands or band combinations. In another example, the NCR-MT determines a separate reference entity/cell for each applicable NCR band or band combination.

In one example, the NCR can be provided separate sets of cell indexes for NCR-MT and NCR-Fwd. For example, the NCR-MT determines a reference cell to be a cell with smallest/largest cell index (and/or with smallest/largest SCS configuration) among configured/activated/active cells regardless of the corresponding NCR entity. For example, the NCR-MT does not determine a reference NCR entity.

In one example, the NCR applies directional collision handling methods as described in Clause 11.1 of [TS 38.213, v18.0.0][REF3].

In one example, methods described herein can apply to TDD configurations provided by OAM or by higher layer information such as MIB or SIB1 or SIBx, x>1, or by common or dedicated RRC configuration, or provided implicitly by RRC configurations of signals or channel that are transmitted or received by NCR-MT such as SSB or CSI-RS or SRS or PDCCH, PDSCH, PUSCH, PUCCH, or PRACH, or indicated by DCI such as by dynamic SFI via DCI format 2_0 or implied by scheduling DCI formats.

For example, when a common/dedicated TDD configuration (or a DCI format 2_0 providing an UL-DL slot format over a number of slots, or an RRC signaling, or a DCI format that configures/indicates SSB or CSI-RS or PDCCH or PDSCH) for a reference NCR entity/cell indicates/implies a symbol or slot as downlink, the NCR does not expect the symbol or slot to be indicated/implied as uplink by:

- a common/dedicated TDD configuration, or
- a DCI format 2_0 providing UL-DL slot format, or
- an RRC configuration for SRS or PUSCH or PUCCH or PRACH transmission, or
- a DCI format scheduling/triggering UL transmission (such as PUSCH, PUCCH, PRACH, or SRS) on the other NCR entity/cells.

For example, when a common/dedicated TDD configuration (or a DCI format 2_0 providing UL-DL slot format, or an RRC signaling or a DCI format that configures/indicates SRS or PUSCH or PUCCH or PRACH) for a reference NCR entity/cell indicates/implies a symbol or slot as uplink, the NCR does not expect the symbol or slot to be indicated/implied as downlink by:

- a common/dedicated TDD configuration, or
- a DCI format 2_0 providing UL-DL slot format, or
- an RRC configuration for SSB or CSI-RS or PDCCH or PDSCH, or
- a DCI format scheduling/triggering DL transmission (such as PDSCH, PDCCH, CSI-RS) on the other NCR entity/cells.

For example, when the reference entity is the NCR-Fwd or the reference cell is a cell with smallest cell index of NCR-MT, the NCR expects that a TDD configuration for the BH-link/NCR-Fwd indicates a second symbol/slot as DL when the symbol/slot overlaps with a first symbol/slot on the reference cell/entity that is indicated as DL by:

a common/dedicated TDD configuration, or a DCI format 2_0 providing UL-DL slot format, or an RRC configuration for SSB or CSI-RS or PDCCH or PDSCH, or a DCI format scheduling/triggering DL transmission (such as PDSCH, PDCCH, CSI-RS)

on the reference NCR entity/cell (i.e., the cell with smallest cell index of NCR-MT); otherwise, the NCR-Fwd is expected to be OFF or not forwarding in the second symbol/slot.

For example, when the reference entity is the NCR-Fwd or the reference cell is a cell with smallest cell index of NCR-MT, the NCR expects that a TDD configuration for the BH-link/NCR-Fwd indicates a second symbol/slot as UL when the symbol/slot overlaps with a first symbol/slot on the reference cell/entity that is indicated as UL by:

a common/dedicated TDD configuration, or a DCI format 20 providing UL-DL slot format, or an RRC configuration for SRS or PUSCH or PUCCH or PRACH transmission, or a DCI format scheduling/triggering UL transmission (such as PUSCH, PUCCH, PRACH, or SRS) on the reference NCR entity/cell (i.e., the cell with smallest cell index of NCR-MT); otherwise, the NCR-Fwd is expected to be OFF or not forwarding in the second symbol/slot.

For example, when a first symbol or slot of NCR-MT overlaps with a second symbol or slot of NCR-Fwd and the NCR is configured or indicated a first UL transmission (respectively, a first DL reception) in the first symbol or slot by NCR-MT and a second DL reception (respectively, a second UL transmission) in the second symbol or slot by NCR-Fwd in the second symbol or slot:

In a first option, NCR-MT is prioritized, so NCR-Fwd drops the second DL reception/UL transmission, and NCR-MT performs the first UL transmission/DL reception;

In a second option, NCR-Fwd is prioritized, so NCR-MT drops the first UL transmission/DL reception, and NCR-Fwd performs the second DL reception/UL transmission;

In a third option, UL transmission is prioritized (regardless of the transmitting entity), so NCR-Fwd drops the second DL reception and NCR-MT performs the first UL transmission, or NCR-MT drops the first DL reception and NCR-Fwd performs the second UL transmission;

In a fourth option, DL reception is prioritized (regardless of the receiving entity), so NCR-MT drops the first UL transmission and NCR-Fwd performs the second DL reception, or NCR-Fwd drops the second UL transmission and NCR-MT performs the first DL reception;

In a fifth option, transmission or reception with lower SCS (respectively, with higher SCS) configuration/indication is prioritized, so that the transmission or reception with lower SCS (respectively, higher SCS) is performed by the corresponding entity, and the reception or transmission with higher SCS (respectively, lower SCS) is dropped by the corresponding entity;

In a sixth option, transmission or reception with earlier starting time/symbol/slot (respectively, with later starting time/symbol/slot) is prioritized, so that the transmission or reception with earlier start (respectively, later start) is performed by the corresponding entity, and the reception or transmission with later start (respectively, earlier SCS) is dropped by the corresponding entity;

In a seventh option, transmission or reception with earlier ending time/symbol/slot (respectively, with later ending time/symbol/slot) is prioritized, so that the transmission or reception with earlier ending (respectively, later ending) is performed by the corresponding entity, and the reception or transmission with later ending (respectively, earlier ending) is dropped by the corresponding entity; and/or In an eighth option, priority levels are assigned to the transmissions or receptions, so a transmission or reception with higher priority is performed and a reception or transmission with lower priority is dropped.

For example, a transmission or reception by NCR-Fwd can be prioritized based on priority level for power allocation, such as that described in Clause 7.5 of [TS 38.213, v18.0.0][REF3]. For example, an SSB reception or a PRACH transmission (on PCell or for mobility), or [a PDCCH reception] or a PUCCH or PUSCH transmission with UCI, is regarded as high priority for NCR-MT, and other transmissions/receptions such as [PDCCH or] PDSCH or CSI-RS reception or PUSCH transmission without UCI or an SRS transmission is regarded as low priority for NCR-MT.

For example, a transmission or reception by NCR-Fwd can be prioritized based on a corresponding beam indication method on the Access link or a corresponding priority flag. For example, a transmission or reception associated with aperiodic (AP) Access link beam indication or associated with semi-persistent (SP) or periodic (P) beam indication with priority flag is prioritized over a transmission or reception associated with SP/P beam indication without priority flag.

In one example, methods described herein can be combined. For example, prioritization can be first based on SCS or based on starting/ending timing or based on priority levels of transmissions or receptions, and when a transmission and an overlapping reception have a same SCS or a same starting/ending time or a same priority level, then prioritization can be based on the corresponding entity (e.g., NCR-MT being prioritized over NCR-Fwd, or vice versa) or based on the link direction (e.g., DL reception being prioritized over UL transmission or vice versa).

In one example, a decision to drop a transmission/reception by NCR-MT or NCR-Fwd is up to NCR implementation.

In one example, NCR behavior described herein for dropping overlapping transmissions or receptions in case an NCR without capability for handling different or conflicting TDD configurations can also apply in case of transmissions or receptions that have (in time) a gap smaller than a threshold.

For example, when an UL transmission or DL reception by NCR-Fwd (respectively, NCR-MT) would start earlier than N symbols or slots after an ending symbol or slot of a DL reception or an UL transmission by NCR-MT (respectively, NCR-Fwd), the NCR-Fwd (respectively, NCR-MT) drops the corresponding UL transmission or DL reception, or the NCR-MT (respectively, NCR-Fwd) drops the corresponding DL reception or UL transmission, for example, based on priority rules as discussed earlier or based on NCR implementation. For example, the value N can be predetermined in the specifications of system operations, or can be (pre)configured via OAM or by common/dedicated RRC or can be based on NCR capability reporting.

FIG. 12 illustrates a flowchart of an example NCR procedure 1200 for reporting of recommended/non-desired BH beams according to embodiments of the present disclosure. For example, procedure 1200 for reporting of recommended/non-desired BH beams can be followed by the NCR 610 of FIG. 6. This example is for illustration only and other embodiments can be used without departing from the scope of the present disclosure.

The procedure begins in 1210, a NCR includes an NCR-MT entity operating in a first frequency band and an NCR-Fwd entity operating in a second frequency band. In 1220, the NCR declares/reports that the NCR-MT and the NCR-Fwd support simultaneous transmission and reception (Tx-Rx) on the first and the second bands. In 1230, the NCR-MT receives a first common/dedicated TDD configuration for the C-link. In 1240, the NCR-MT receives a second common/dedicated TDD configuration for the BH-link, with UL-DL indications conflicting with the first TDD configuration. In 1250, the NCR-MT reports (via MAC-CE) a first set of recommended NCR-Fwd beams or a second set of non-desired NCR-Fwd beams on the BH-link in association with an NCR-MT beam on the C-link. For example, the first set of recommended NCR-Fwd beams or the second set of non-desired NCR-Fwd beams on the BH-link apply to symbols/slots with conflicting UL-DL indication between the first and the second TDD configurations.

In one embodiment, an NCR-MT can report a set of downlink or uplink recommended beams or non-desired beams to the gNB. Such report can be by indicating recommended beams or non-desired TCI states, SSB indexes, CSI-RS indexes, or SRIs corresponding to C-link of NCR-MT or BH-link of NCR-Fwd. Such report can be assistance information to the gNB (e.g. the BS 102) for selection of beams for C-link or BH-link, for example, to accommodate spatial division multiplexing (SDM) or to reduce self-interference between NCR-MT and NCR-Fwd in case of conflicting TDD configurations/indications between the two NCR entities. The reported recommended or non-desired beams can be in association with certain time or frequency resources, such as time-domain configurations for the Access link or such as cells/passband of NCR-Fwd. Such report can also/only include beam quality metrics such as RSRP, RSSI or SINR values corresponding to the beams or beam pairs of C-link or BH-link. To determine such recommended or non-desired beams, the NCR can be provided measurement gaps or measurement settings (including for beam repetition/sweeping) to receive and measure corresponding reference signals or channels.

In one example, an NCR can indicate/report a set of recommended beams or non-desired/restricted beams for receptions or transmissions of NCR-Fwd, for example, to minimize self-interference on simultaneous or overlapping transmissions or reception by NCR-MT on the C-link. Herein, beams can refer to spatial relations or QCL properties or TCI states or SRIs and so on. For example, recommended beam or non-desired/restricted beams for NCR-Fwd can be applicable to one or more of:

Symbols or slots where TDD configurations (or other RRC configurations or DCI formats indicating/implying an UL-DL link direction information) for NCR-MT and NCR-Fwd are conflicting, such as DL for NCR-MT and UL for NCR-Fwd, or UL for NCR-MT and DL for NCR-Fwd;

Symbols or slots where TDD configurations (or other RRC configurations or DCI formats indicating/implying an UL-DL link direction information) for NCR-MT and NCR-Fwd are consistent, such as DL for NCR-MT and DL (or flexible) for NCR-Fwd, or UL for NCR-MT and UL (or flexible) for NCR-Fwd; or Any symbol or slot regardless of the link direction for NCR-MT and NCR-Fwd.

For example, the NCR can report such sets of recommended beams or non-desired beams separately for the cases herein (or a subset of them, such as only the first case), or can report a same set of recommended beams or a same set of non-desired beams for the cases herein.

For example, the NCR can report such recommended or non-desired beams when the NCR supports conflicting TDD configurations or supports simultaneous/overlapping transmission and reception by NCR-MT on the C-link and NCR-Fwd on the BH-link, or vice versa. For example, the NCR operation is not subject to a half-duplex constraint (e.g., can operate in full-duplex mode) between C-link and BH-link. In such case, reporting the recommended or non-desired beams by the NCR provides assistance information to the gNB for beam selection for the C-link and the BH-link such that self-interference is minimized, when applicable, by accommodating sufficient spatial isolation between BH-link and C-link (for example, spatial division multiplexing), which can help the NCR implementation/operation as well (such as less need for precise RF filtering requirements, digital interference cancellation, and so on, as applicable to full duplex operation).

For example, the NCR can also report such recommended or non-desired beams when the NCR does not support conflicting TDD configurations or does not support simultaneous/overlapping transmission and reception by NCR-MT on the C-link and NCR-Fwd on the BH-link, or vice versa. For example, the NCR operation is subject to a half-duplex constraint between C-link and BH-link, and self-interference is avoided by sufficient spatial isolation in terms of beam selection for the C-link and the BH-link.

For example, recommended beams or non-desired/restricted beams can refer to recommended or non-desired/restricted TCI states providing QCL properties or SRIs providing spatial relation for receptions or transmissions, respectively, by the NCR-Fwd on the BH-link.

In another example, recommended or non-desired/restricted beams can refer to those corresponding to NCR-MT operation on the C-link, such as recommended or non-desired/restricted TCI states or SRIs for receptions or transmissions, respectively, that impact the NCR-Fwd performance on the BH-link.

In yet another example, recommended or non-desired/restricted beams can refer to those corresponding to any of NCR-MT or NCR-Fwd.

For example, recommended or non-desired/restricted beams can refer to UL Tx beams or corresponding UL spatial relations that impact a DL reception by the NCR, regardless of the NCR entity. For example, the NCR-MT can report recommended or non-desired/restricted SRIs corresponding to the BH-link that favorably or adversely impact DL receptions by NCR-MT on the C-link, or recommended or non-desired/restricted SRIs corresponding to the C-link that favorably or adversely impact DL receptions by NCR-Fwd on the BH-link.

For example, recommended or non-desired/restricted beams can refer to DL Rx beams or corresponding QCL properties that impact an UL transmission by the NCR, regardless of the NCR entity. For example, the NCR-MT can report recommended or non-desired/restricted TCI states corresponding to the BH-link that favorably or adversely impact UL transmissions by NCR-MT on the C-link, or recommended or non-desired/restricted TCI states corresponding to the C-link that favorably or adversely impact UL transmissions by NCR-Fwd on the BH-link.

When recommended or non-desired/restricted beams can refer to such beams for both NCR-MT and NCR-Fwd, NCR-MT can provide separate reports, such as separate MAC-CEs, to indicate such beams for each NCR entity, that can also include a header such as a 1-bit flag to distinguish which NCR entity it refers to, or can provided a same report, such as a same MAC-CE, to indicate such beams for both NCR entities, wherein the report can include an additional field for each beam index or each group of beam indexes to indicate whether the beams index or the group of beam indexes correspond to NCR-MT or NCR-Fwd.

For example, the NCR can report such recommended beams or non-desired beams using RRC signaling, such as part of NCR capability reporting, or using UL MAC-CE signaling, wherein the NCR-MT can indicate indexes of such recommended or non-desired TCI states or SRIs for NCR-Fwd operation. For example, the NCR-MT can provide a first MAC-CE to indicate the recommended TCI states/SRIs and a second, separate MAC-CE to indicate the non-desired TCI states/SRIs. For example, the NCR-MT can provide a same MAC-CE for both purposes. For example, the NCR-MT can provide separate MAC-CEs for indication of such SRIs and for indication of such TCI states. For example, the NCR-MT can provide a same MAC-CE that indicates both SRIs and TCI states. For example, SRI indication is not needed when the UE (e.g. the UE 116) is configured joint DL/UL TCI states, while for separate DL and UL TCI states, one of UL TCI state or SRI can be indicated in the MAC-CE.

For example, a header field can be used for each index to indicate whether the corresponding index is for a TCI state or for an SRI. For example, the field can include 1 bit to indicate DL/Joint TCI state index (e.g., value '0') or UL TCI state or SRI (e.g., value '1'). For example, a field for beam index can have a fixed size such as 8 bits, and a number of bits from the 8 bits can be used based on the beam index type, such as 7 bits for DL/Joint TCI state, 6 bits for UL TCI state, or 4 bits for SRI. In another example, the field can include 2 bits to indicate TCI state index (e.g., value '00') or SSB index (e.g., value '01') or NZP CSI-RS index (value '10') or SRI (value '11'). For example, one value can indicate the beam index type as SSB index along with SSB Transmission Configuration (STC) index. For example, a field for beam index can have a fixed size such as 8 bits, and a number of bits from the 8 bits can be used based on the beam index type, such as 7 bits for TCI state, or 6 bits for SSB, or 6 bits for SSB index along with 2 bits for STC index, or 8 bits for CSI-RS, or 4 bits for SRI, and any remaining leftmost bits can be set to 0.

For example, the recommended or non-desired beams can be indicated in terms of pairs of beams from NCR-MT and NCR-Fwd so that an association is indicated to the gNB to indicate which NCR-Fwd beams are recommended or not desired in association with a given NCR-MT beam, or vice versa. For example, some NCR-MT beams can be consistent/operable with different NCR-Fwd beams and no indication of recommended or non-desired beams may be provided in association with such NCR-MT beams.

For example, the recommended or non-desired beams can be associated with a time or frequency resource or a list/set of time or frequency resources. For example, the NCR can be configured a list of time or frequency (T/F) resources and the NCR report, such as the MAC-CE, can indicate a T/F resource from the list of T/F resources for which the recommended or non-desired beams are applicable. For example, the NCR can be configured a number L of lists of T/F resources, and the NCR report, such as the MAC-CE, can indicate a list of T/F resources from the L lists of T/F resources for which the recommended or non-desired beams are applicable. For example, the lists can include only time resources or only frequency resources. For example, the frequency resources can be in terms of applicable cells/passbands, such as NCR-MT cells or NCR-Fwd cells/passbands, for which the recommended or non-desired beams are applicable. In another example, the frequency resources can be in finer granularity, such as sub-bands or resource block group (RBG) or resource block (RB) level.

In another example, an applicable T/F resources for the recommended or non-desired beams can be based on the T/F resources configured for Access link forwarding, such as periodic (P) or semi-persistent (SP) or aperiodic (AP) forwarding resources. For example, the NCR reporting, such as MAC-CE, for the recommended or non-desired beams can include a field (e.g., 2 bits) to indicate whether the applicable T/F resources are from Access link configurations for periodic (e.g., value '00') or semi-persistent (e.g., value '01'), or aperiodic (e.g., value '10') forwarding resources, or an independent T/F resource configuration (e.g., value '11') separate from Access link configurations. For example, the MAC-CE can include an index or a set of indexes for the persistent (P)/semi-persistent (SP)/aperiodic (AP) resources or sets/lists of P/SP/AP resources for which the recommended or non-desired beams are applicable.

In another example, the NCR report, such as the MAC-CE, does not include any explicit time/frequency resource associated with the recommended or non-desired beams. For example, the NCR report such as the MAC-CE applies: (i) from a symbol or slot (or from K symbols or slots after) the NCR transmits such MAC-CE until the NCR transmits a new such MAC-CE indicating new recommended or non-desired beams, or (ii) during the symbols or slots in which the NCR applies a corresponding BH-link beam or C-link beam as indicated by such MAC-CE, for example, from a symbol or slot (or from K symbols or slots after) the NCR-MT starts to operate with a given beam for the C-link until the symbol or slot in which the NCR-MT is configured/indicated or determines to operate with a new beam for the C-link.

In one example, determination, by NCR-MT, of a set of beams to be reported as recommended or non-desired beams is up to NCR implementation.

In another example, to accommodate such reporting of recommended or non-desired beams, the NCR can be configured or indicated by DCI measurement gaps or measurement settings wherein the NCR-MT can receive and/or measure a subset or configured BH-link beams, such as reference signals (e.g., SSB or CSI-RS) corresponding to some or each of the configured TCI states for the BH-link. For example, the measurement settings can be with repetition set to 'on' or 'enabled' so that beam sweeping operation can be accommodated. For example, the NCR-MT can set a first beam for the C-link in N (consecutive) occasions, such as symbols or slots, and receive and/or measure a signal quality such as self-interference for N different NCR-Fwd beams on the BH-link, such as N different TCI states or SRIs. The NCR can perform the same procedure for other beams, such as a second/third/ . . . beam for the C-link.

For example, the NCR report about recommended or non-desired beams can include an associated beam quality attribute such as an associated RSRP or RSRQ or RSSI or SINR, per L1 measurement or with L3 filtering. For example, the beam quality can be in terms of a reference signal reception on the C-link (or BH-link), such as SSB or CSI-RS reception or DMRS of PDCCH or PDSCH reception.

For example, the NCR can be provided thresholds to determine recommended or non-desired beams. For example, the NCR determines a beam as recommended beam when a corresponding beam quality is better than a first threshold, such as RSRP or RSSI or SINR larger than the first threshold. For example, the NCR determines a beam as non-desired beam when a corresponding beam quality is worse than a second threshold, such as RSRP or RSSI or SINR smaller than the second threshold. For example, the first/second thresholds can be predetermined in the specifications of system operation or can be provided via OAM or via higher layer signaling such as SIB1 or SIBx or common/dedicated RRC signaling.

For example, the NCR can be indicated a maximum number M for beams that can be reported as recommended or non-desired. For example, M=2 or M=4. For example, the NCR reports M beams with the best beam quality, such as M beams with largest RSRP or RSSI or SINR (above the first threshold), as the recommended beams. For example, the NCR reports M beams with the lowest beam quality, such as M beams with smallest RSRP or RSSI or SINR (below the second threshold), as the non-desired beams. The NCR can also report both a first number M of recommended beams and a second number M (can be different than the first number M) of non-desired beams.

For example, a maximum number M of beams to be reported can be based on the signaling design. For example, the MAC-CE can include a field with 2 or 4 or 8 bits so that the NCR can report the actual number of recommended or non-desired beams that are being reported; in such case, the number of reported beams, by design, cannot exceed 4 or 16 or 64 beams, while the NCR can report a smaller number of beams.

In one example, the NCR reports only beam quality, such as RSRP, RSSI, or SINR, as previously described, for a subset of beams without indicating them as recommended or non-desired. For example, it is up to the gNB implementation to determine recommended/desired or non-desired/restricted beams.

FIG. 13 illustrates a flowchart of an example NCR procedure 1300 for power control according to embodiments of the present disclosure. For example, procedure 1300 for power control can be followed by the NCR 710 of FIG. 7. This example is for illustration only and other embodiments can be used without departing from the scope of the present disclosure.

The procedure begins in 1310, a NCR includes an NCR-MT entity operating in a first frequency band and an NCR-Fwd entity operating in a second frequency band. In 1320, the NCR declares/reports that the NCR-MT and the NCR-Fwd support simultaneous transmission and reception (Tx-Rx) on the first and the second bands. In 1330, the NCR-MT receives a first common/dedicated TDD configuration for the C-link. In 1340, the NCR-MT receives a second common/dedicated TDD configuration for the BH-link, with UL-DL indications conflicting with the first TDD configuration. In 1350, the NCR-MT is provided (e.g., via MAC-CE) an adjustment offset or a scaling factor for a DL energy per resource element (EPRE) ratio or a Tx power/PSD for transmissions/receptions on the C-link or for amplification gain or output power for transmissions on the BH-link. For example, the provided adjustment offset, or a scaling factor applies to symbols/slots with conflicting UL-DL indications between the first and the second TDD configuration.

In one embodiment, when the NCR-MT and NCR-Fwd are configured/indicated different or conflicting TDD configurations (or other RRC configurations or DCI formats indicating/implying an UL-DL link direction information), that would result in overlapping UL transmission by NCR-MT and DL reception by NCR-Fwd (respectively, overlapping DL reception by NCR-MT and UL transmission by NCR-Fwd) in one or more symbols or slots, the NCR such as NCR-MT or NCR-Fwd can apply power control, such as power boosting or power scaling to a corresponding UL transmission in the one or more symbols or slots. Such power control can be in association with recommended beams or non-desired beams reported by the NCR. Additionally, or alternatively, the NCR can report to the gNB recommended power control parameters such as desired ranges of PSD adjustment applicable for NCR-MT or NCR-Fwd transmissions or receptions. Such methods can apply, for example, to NCR nodes capable of simultaneous transmission on NCR-Fwd BH-link and reception on NCR-MT C-link, or vice versa, to reduce a level of applicable self-interference.

In one example, the NCR-MT (respectively, the NCR-Fwd) is configured/indicated to decrease a transmission power for a corresponding UL transmission to minimize a self-interference impact on the other NCR entity performing DL reception. The power reduction can apply to corresponding symbols or slots of the UL transmissions, or only to one or more symbols or slots that overlap with the DL reception by the other NCR entity.

For example, the NCR-MT can be provided/indicated separate power control parameters, such as separate P0, alpha, pathloss reference signal, closed-loop transmit power control (TPC) power control command, and so on, as described for a UE (e.g. the UE 116) in TS 38.213 [REF3] v18.0.0, to apply to a corresponding UL transmission on the C-link in case of such overlap. For example, the NCR-MT can apply a Tx power adjustment offset or a scaling factor to a calculated/determined transmission power for a corresponding UL transmission. For example, the NCR-MT determines the UL transmission power as the {calculated Tx power+Tx power adjustment offset} or as {calculated Tx power−Tx power adjustment offset} or as {calculated Tx power×scaling factor}. For example, the NCR-MT can be provided a value of such Tx power adjustment offset or scaling factor via OAM or via RRC configuration or MAC-CE signaling. For example, the NCR-MT can determine a value for the Tx power adjustment offset or the scaling factor for the UL transmission such that a (modified) transmission power for the corresponding power after application of the power scaling does not exceed a predetermined or (pre)configured power limit, such as P_CMAX.

For example, the NCR-MT can be provided/indicated a different (e.g., smaller) amplification gain or a different (e.g., smaller) output power for a corresponding UL transmission for NCR-Fwd on the BH-link in case of such overlap. For example, the NCR-MT can be provided information of a Tx power/gain adjustment offset or a scaling factor to be applied to a current amplification gain or output power of the NCR-Fwd on the BH-link. For example, the NCR-MT determines the NCR-Fwd amplification gain or output power as {Declared/Configured/Indicated amplification gain/output power+Tx gain/power adjustment offset} or as {Declared/Configured/Indicated amplification gain/output power−Tx gain/power adjustment offset} or as {Declared/Configured/Indicated output power×scaling factor}. For example, a value of the Tx power/gain adjustment offset, or the scaling factor can be provided via OAM or via RRC signaling or via MAC-CE.

In one example, the NCR-MT can be provided separate downlink power control parameters for DL receptions by the NCR-MT or NCR-Fwd for some symbols or slots. For example, the NCR applies such DL power control parameters to a DL reception on the C-link that overlaps with an UL transmission on the BH-link, or a DL reception on the BH-link that overlaps with an UL transmission on the C-link. For example, such DL power control parameter as separate from those applies when there is no such overlap. For example, the NCR-MT can be provided separate EPRE values or ratios for NCR-MT, such as for SSB reception EPRE or for EPRE ratio between CSI-RS and SSB, or for EPRE ratio between SSB/CSI-RS and PDSCH, and so on. For example, the NCR-MT can be provided DL Rx power adjustment offsets or power scaling factors for corresponding DL receptions by NCR-MT. For example, values of power adjustment offsets or power scaling factors can be same or separate for DL receptions and UL transmissions. For example, separate DL power control parameters, such as separate values or separate adjustment offsets or scaling factors, can be provided for NCR-Fwd. For example, various embodiment apply when a DL reception on the C-link overlaps with an UL transmission on the BH-link.

In one example, the NCR can apply power boosting or power scaling for UL transmissions (or DL receptions) that use QCL properties or spatial relations according to the recommended beams or non-desired beams. For example, the indicated Tx or Rx power/gain adjustment offset or the scaling factor for NCR-MT or for NCR-Fwd or corresponding recommended quantities reported by the NCR-MT can be in association of NCR-MT beams or NCR-Fwd beams, such as TCI states or SRIs (or SSB indexes or NZP CSI-RS indexes) corresponding to NCR-MT or NCR-Fwd. For example, a corresponding MAC-CE can include a number of beams and a set of beam indexes (or a set of pairs of beam indexes) for which an indicated or recommended Tx or Rx power/gain adjustment offset or scaling factor applies.

In one example, an NCR-MT can report to the gNB recommended power control parameters for NCR-MT (such as Tx/Rx PSD range or values of P0, alpha, and so on) or recommended values of the Tx or Rx power/gain adjustment offset or the scaling factor for NCR-MT or for NCR-Fwd. Such report can be via manufactures' declaration, or via RRC signaling such as capability reporting, or can be via MAC-CE. For example, such reporting of recommended power control/PSD parameters can be in association with the recommended or non-desired beams of NCR-MT or NCR-Fwd.

For example, application of such power scaling or power boosting can be based on an NCR capability. For example, the NCR reports (separate or joint) capability(ies) for NCR-MT and/or NCR-Fwd to support such power scaling or power boosting. For example, the NCR reports such capability per NCR-MT or per band or per BC, such as among bands or BCs that are supported by NCR-Fwd or NCR-MT.

FIG. 14 illustrates a flowchart of an example NCR procedure 1400 for SSB-less/RACH-less indication of DL/UL timing according to embodiments of the present disclosure. For example, procedure 1400 for SSB-less/RACH-less indication of DL/UL timing can be performed by either NCR 610 or NCR 710. This example is for illustration only and other embodiments can be used without departing from the scope of the present disclosure.

The procedure begins in 1410, a NCR includes an NCR-MT entity operating in a first frequency band and an NCR-Fwd entity operating in a second frequency band. In 1420, the NCR-MT acquires a first DL/UL timing for receptions or transmissions on the C-link. In 1430, the NCR-MT is provided or determines a first timing offset value for receptions on the BH-link or a second timing offset value for transmissions on the BH-link, relative to the first DL/UL timing on the C-link. In 1440, the NCR-MT determines a second DL timing based on the first DL timing and the first timing offset value, or a second UL timing based on the first UL timing and the second timing offset value. In 1450, the NCR-MT receives or transmits on the C-link based on the first DL/UL timing. In 1460. the NCR-Fwd receives or transmits on the BH-link based on the second DL/UL timing.

Figure 15:
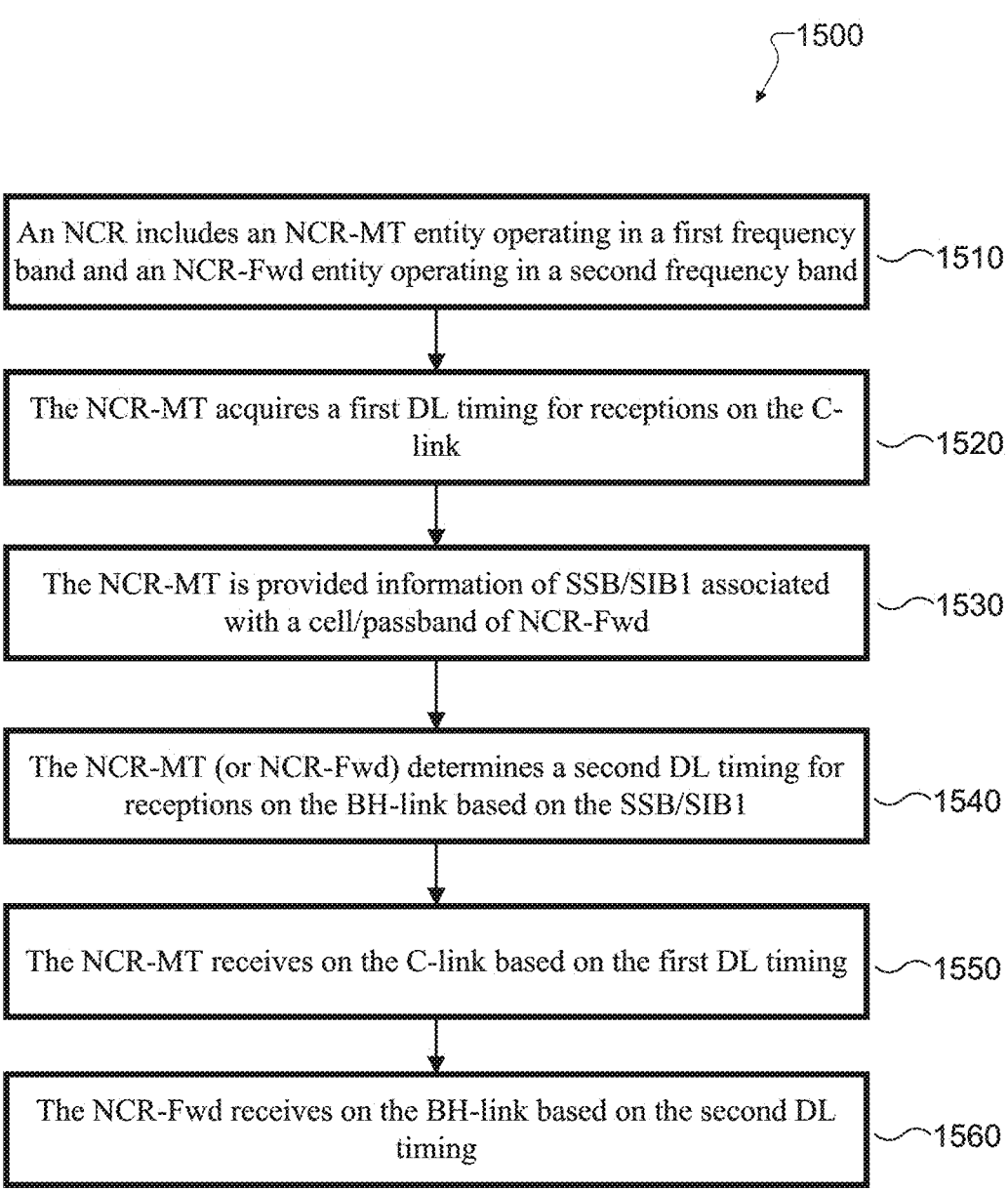
FIG. 15 illustrates a flowchart of an example NCR procedure for SSB-based determination of DL timing according to embodiments of the present disclosure.

FIG. 15 illustrates a flowchart of an example NCR procedure 1500 for SSB-based determination of DL timing according to embodiments of the present disclosure. For example, procedure 1500 for SSB-based determination of DL timing can be followed by the NCR 610 of FIG. 6. This example is for illustration only and other embodiments can be used without departing from the scope of the present disclosure.

The procedure begins in 1510, a NCR includes an NCR-MT entity operating in a first frequency band and an NCR-Fwd entity operating in a second frequency band. In 1520, the NCR-MT acquires a first DL timing for receptions on the C-link. In 1530, the NCR-MT is provided information of SSB/SIB1 associated with a cell/passband of NCR-Fwd. In 1540, the NCR-MT (or NCR-Fwd) determines a second DL timing for receptions on the BH-link based on the SSB/SIB1. In 1550, the NCR-MT receives on the C-link based on the first DL timing. In 1560, the NCR-Fwd receives on the BH-link based on the second DL timing.

FIG. 16 illustrates a flowchart of an example NCR procedure 1600 for RACH-based determination of UL timing according to embodiments of the present disclosure. For example, procedure 1600 for RACH-based determination of UL timing can be followed by the NCR 710 of FIG. 7. This example is for illustration only and other embodiments can be used without departing from the scope of the present disclosure.

The procedure begins in 1610, a NCR includes an NCR-MT entity operating in a first frequency band and an NCR-Fwd entity operating in a second frequency band. In 1620, the NCR-MT acquires a first UL timing for transmissions on the C-link. In 1630, the NCR-MT is provided information of random access (RA) associated with a cell/passband of NCR-Fwd. In 1640, the NCR-MT receives a PDCCH order triggering a RA procedure associated with the cell/passband of NCR-Fwd. In 1650, the NCR-MT (or NCR-Fwd) transmits a PRACH on the cell/passband associated with NCR-Fwd based on the PDCCH order. In 1660, the NCR-MT receives an indication of a second UL timing in response to the PRACH transmission. In 1670, the NCR-MT transmits on the C-link based on the first UL timing. In 1680, the NCR-Fwd transmits on the BH-link based on the second UL timing.

In one embodiment, for out-of-band NCR operation, the DL receiving timing of the NCR-Fwd can be non-aligned with the DL receiving timing of the NCR-MT, or the UL transmitting timing of the NCR-Fwd can be non-aligned with the UL transmitting timing of the NCR-MT. Different approaches can be used to acquire the DL/UL timing for NCR-Fwd on the BH-link based on NCR capability or higher layer signaling. In a first approach (referred to as SSB-less/RACH-less approach), a DL/UL timing of the NCR-Fwd on the BH-link can be indicated by the gNB, such as by indication of DL/UL timing offset/adjustment values relative to a DL/UL timing of the NCR-MT, such as by RRC or MAC-CE signaling. The determination of such DL/UL timing offset/adjustment values can be up to gNB implementation or can be based on NCR assistance information such as transmission by NCR-MT of SRSs corresponding to an NCR-Fwd cell/passband. In a second approach (referred to as SSB-based/RACH-based approach), the NCR-Fwd acquires the DL/UL timing, for example, based on reception/acquisition by NCR-MT of SSB/SIB1 assistance information corresponding to NCR-Fwd or by random access procedure by NCR-MT based on resources/configuration corresponding to NCR-Fwd. A PRACH transmission by NCR-MT corresponding to NCR-Fwd can be triggered, for example, by a PDCCH order using an explicit indication or by indicating an SSB index or a cell index corresponding to NCR-Fwd. An absolute or short/adjustment timing advance value can be provided via MAC RAR or via a separate timing MAC-CE command.

In a first approach (referred to as SSB-less/RACH-less approach), a DL/UL timing of the NCR-Fwd on the BH-link can be indicated by the gNB (e.g. the BS 102) with partial or no assistance information/transmission provided by the NCR.

For example, the NCR can identify a DL receiving timing for the NCR-Fwd separate from the DL receiving timing of the NCR-MT. For example, the NCR can identify an UL transmitting timing for the NCR-Fwd separate from an UL transmitting timing of the NCR-MT.

For example, the NCR can be provided or can determine a first time offset N_offset_DL_Fwd for DL receiving timing for the NCR-Fwd such that the DL receiving timing of the NCR-Fwd is N_offset_DL_Fwd after (or before) a DL receiving timing of the NCR-MT. For example, the NCR can be provided or can determine a second time offset N_offset_UL_Fwd for UL transmitting timing for the NCR-Fwd such that the UL transmitting timing of the NCR-Fwd is N_offset_UL_Fwd after (or before) a UL transmitting timing of the NCR-MT.

For example, the DL transmitting timing of the NCR-Fwd (on the Access link) is delayed after the DL receiving timing of the NCR-MT (on the C-link) by the summation of internal NCR delay and the first time offset N_offset_DL_Fwd.

For example, the DL transmitting timing of the NCR-Fwd (on the Access link) is delayed after the DL receiving timing of the NCR-Fwd (on the BH link) by the internal NCR delay.

For example, the UL receiving timing of the NCR-Fwd (on the Access link) is advanced before the UL transmitting timing of the NCR-MT (on the C-link) by the summation of the internal NCR delay and the second time offset N_offset_UL_Fwd. For example, N_offset_UL_Fwd can be regarded as a TA command or a TA adjustment command or a parameter thereof.

For example, the UL receiving timing of the NCR-Fwd (on the Access link) is advanced before the UL transmitting timing of the NCR-Fwd (or the BH link) by the internal NCR delay.

For example, the first and second time offsets N_offset_DL_Fwd and N_offset_UL_Fwd can be predetermined in the specifications of system operations or can be a manufacturer's declaration or can be (pre)configured via OAM or via RRC signaling, or can be provided via MAC-CE such as during an initial/random procedures of the NCR or a separate MAC-CE or can be based on an NCR-MT capability and/or an NCR-Fwd capability.

For example, the first and second time offsets N_offset_DL_Fwd and N_offset_UL_Fwd can be in terms of absolute time units, such as a number of micro-seconds or milli-seconds. For example, the first and second time offsets N_offset_DL_Fwd and N_offset_UL_Fwd can be in terms of a number of symbols or slots in a reference SCS or predetermined SCS configuration, such as 15 kHz, or an SCS configuration that can be (pre)configured via OAM or via SIB1 or SIBx (dedicated to NCR nodes), or via RRC signaling, or can be provided via a MAC-CE as described herein, or an SCS configuration of the (active DL/UL BWP) of the NCR-MT/C-link, or an SCS configuration of the BH-link such as one provided for a corresponding TDD configuration or for a corresponding active BWP of NCR-Fwd, if applicable. In one example, the first and second time offsets N_offset_DL_Fwd and N_offset_UL_Fwd can be with respect to an SCS configuration of an absolute TA value provided by MAC RAR or provided by a separate MAC-CE, such as one provided for the C-link. For example, the SCS can be for a first/earliest UL transmission by the NCR-MT on the C-link after reception of the absolute TA value provided by the MAC RAR or provided by the separate MAC-CE.

For example, the first and second time offsets N_offset_DL_Fwd and N_offset_UL_Fwd can be same for carrier frequencies/bands/band combinations (BCs)/ranges, or can be dependent on an operating carrier frequency/band/range, such as different values for FR1 and FR2, or can be based on a pair of operating carrier frequencies/bands/BCs/ranges for NCR-MT and NCR-Fwd. For example, the first and second time offsets N_offset_DL_Fwd and N_offset_UL_Fwd can be separate, so separate values apply to DL compared to UL. In another example, the first and second time offsets N_offset_DL_Fwd and N_offset_UL_Fwd can be same, so a same value applies to both DL and UL.

For example, a value from the candidate values for the first or second time offsets N_offset_DL_Fwd or N_offset_UL_Fwd can be zero, such as when NCR-MT and NCR-Fwd operate in different carrier frequencies of a same passband or a same frequency band/range (similar to intra-band contiguous CA, or intra-band non-contiguous CA).

For example, separate absolute TA commands $(N_{TA})$ can apply to NCR-MT and NCR-Fwd. For example, separate TA adjustment commands $(N_{TA,offset})$ can apply to NCR-MT and NCR-Fwd. For example, an absolute TA value for NCR-Fwd can be 0 or can be same as the absolute TA value for NCR-MT. For example, the NCR-Fwd can operate with a first accumulation for UL timing of NCR-MT and a second accumulation for UL timing of NCR-Fwd. For example, the NCR-MT receives first TA adjustment offsets for NCR-MT and second TA adjustment offsets for NCR-Fwd. For example, there can be a field in the MAC-CE signaling to indicate an entity for an indicated absolute/adjustment TA command. For example, a value '0' can indicate that the indicated absolute/adjustment TA command is for NCR-MT, and a value '1' can indicate that the absolute/adjustment TA command is for NCR-Fwd. For example, a MAC-CE for timing can include two values for corresponding absolute/adjustment TA commands with a predetermined ordering, such as the first one corresponding to NCR-MT and the second value corresponding to NCR-Fwd. In one example, other signaling methods such as RRC signaling may be used instead of MAC-CE.

In one example, a method for gNB to determine DL/UL timing offset or adjustment values can be up to the gNB implementation and transparent to the NCR without any impact on NCR procedures. For example, the NCR does not report any measurements or does not transmit any signals or channels to accommodate the gNB in such determination.

In another example, the gNB determines a TA value for the NCR-Fwd based on uplink transmissions such as SRS transmissions. For example, for uplink transmissions on the BH-link, such as for UE UL transmissions forwarded by the NCR-Fwd on the BH-link, or such as NCR-MT transmission or NCR-Fwd transmission, if applicable, of SRS on carrier frequencies corresponding to NCR-Fwd, if applicable, the NCR-MT initially sets a corresponding TA value to be same as a TA value for NCR-MT (corresponding to UL transmission in the carrier frequency of the NCR-MT) or to certain other values, such as a TA value equal to zero.

For example, the NCR-MT operates in FR1. The NCR-MT also transmits SRS corresponding to FR2 frequency bands that are associated with NCR-Fwd. For example, the gNB makes measurements of NCR-MT transmissions of SRSs configured in carrier frequencies/cells/passbands corresponding to NCR-Fwd, and accordingly determines a TA adjustment for uplink transmissions on the BH-link via NCR-Fwd (or uplink transmissions via NCR-MT corresponding to NCR-Fwd).

The TA values or TA adjustment values are with respect to an SCS configuration for the BH-link/NCR-Fwd, for example, as provided for a corresponding TDD configuration, or for an active BWP of the BH-link, if applicable. For example, a DL timing offset for NCR-Fwd can be same as the UL timing adjustment, and therefore a same value, such as the UL timing advance adjustment value, can be indicated or applied for both DL and UL by the NCR-Fwd.

For example, an additional third (or a fourth) timing offset can also be applied in the examples described herein for the DL transmitting timing or for the UL receiving timing, for example, for the case of non-negligible/long internal delay, wherein the additional third (or fourth) timing offset values can be predetermined in the specifications for system operation or can be provided by OAM or via higher layer signaling such as SIB1 or SIBx (dedicated to NCR nodes) or common/dedicated RRC signaling.

In a second approach (referred to as SSB-based/RACH-based approach), the NCR-Fwd acquires the DL/UL timing, for example, based on reception/acquisition by NCR-MT of SSB/SIB1 assistance information corresponding to NCR-Fwd or by random access procedure by NCR-MT based on resources/configuration corresponding to NCR-Fwd.

In one example, an NCR-MT can determine a timing for NCR-Fwd separately than a timing for NCR-MT. For example, the NCR-MT can be provided SSB/SIB1 information corresponding to a cell/passband for NCR-Fwd, and the NCR-MT can determine a downlink timing corresponding to the NCR-Fwd based on the associated SSB/SIB1 information.

For example, such determination of DL timing corresponding to NCR-Fwd based on SSB/SIB1 assistance information can be based on an NCR capability. For example, the NCR can be provided a higher layer signaling such as an RRC signaling whether determination of DL timing is based on SSB/SIB1 information or directly provided by the gNB, such as relative timing offset values N_offset_DL_Fwd and N_offset_UL_Fwd as previously described. For example, the RRC signaling can be without a separate RRC IE to indicate the 'mode'/method for DL timing determination, for example, depending on receiving RRC signaling for SSB/SIB1 corresponding to NCR-Fwd or RRC signaling for N_offset_DL_Fwd and N_offset_UL_Fwd.

For example, the NCR-MT can be provided random access configuration corresponding to a cell/passband for NCR-Fwd. For example, the NCR-MT can transmit a PRACH in a cell/frequency band corresponding to NCR-Fwd. For example, when applicable, the NCR-Fwd can transmit a PRACH in a cell/passband/carrier frequency/frequency band corresponding to the NCR-Fwd. For example, the PRACH corresponding to the NCR-Fwd can be triggered via a PDCCH order while the NCR-MT is in CONNECTED mode.

For example, a PDCCH order can include a field using a 1-bit field, for example from reserved bits of the PDCCH order, to indicate whether the PDCCH order is with respect to NCR-MT itself or with respect to NCR-Fwd. For example, a value '0' indicates that the PRACH corresponds to NCR-MT, and a value '1' indicates that the PRACH corresponds to NCR-Fwd.

For example, separate cell indexes can be associated with NCR-MT and NCR-Fwd, and a cell index field in the PDCCH order can indicate an NCR entity. For example, when an indicated value of the cell field in the PDCCH order is from a first set of cell indexes corresponding to NCR-MT, the random access procedure corresponds to the NCR-MT, and when an indicated value of the cell index field in the PDCCH order is from a second set of cell indexes corresponding to NCR-Fwd, the random access procedure corresponds to the NCR-Fwd.

In another example, NCR-MT can be provided different sets of SSBs for NCR-MT and NCR-Fwd, such a first set of SSB indexes for NCR-MT and a second set of SSB indexes for NCR-Fwd. For example, the NCR-MT can determine from the SSB indexes indicated in the PDCCH order whether the PRACH corresponds to NCR-MT or NCR-Fwd. For example, if the indicated SSB index is from the first set of SSB indexes, the PRACH corresponds to NCR-MT, and if the indicated SSB index in the PDCCH order is from the second set of SSB indexes, the PRACH corresponds to NCR-Fwd.

In one example, the NCR-MT procedure can continue the RA procedure as in a typical UE procedure, such as RAR reception, Msg3 PUSCH transmission, and Msg4 PDCCH/PDSCH reception, as described in TS 38.213 [REF3], v17.6.0. In another example, the NCR-MT does not continue the remaining random access procedures after PRACH transmissions, for example, since the NCR does not intend to establish a separate RRC connection for NCR-Fwd. For example, the NCR does not receive a RAR in response to a (PDCCH ordered) PRACH corresponding to NCR-Fwd. For example, the NCR-MT receives a TA command, such as in the form of a separate (absolute) TA MAC-CE command. For example, the NCR-MT receives a RAR, including a TA value, in response to the PRACH, and so completes the random access procedure without Msg3/4 steps, for example, as in contention-free random access. For example, a TA command received in the RAR, or an absolute TA provided in a separate MAC-CE command is in the SCS of the BH-link as provided for a TDD configuration or for a corresponding active BWP, if applicable. For example, a reference SCS can be an SCS of an earliest UL transmission after reception of the RAR or after reception of the MAC-CE that provides the absolute TA command.

For example, the NCR-MT can be provided via higher layers an indication for whether RAR is to be received, or whether a RAR-less operation is to be performed.

For example, the NCR-MT can report an indication whether the NCR supports determination of UL timing using a RACH-based method, such as via a RA procedure by NCR-MT with configuration/resources corresponding to NCR-MT, or using a RACH-less method, such as by UL timing advance offset/adjustment values indicated by the gNB without any RA procedure. For example, an NCR capability can include whether the NCR-MT performs UL transmissions on the C-link corresponding to NCR-Fwd carrier frequency, such as SRS transmissions corresponding to NCR-Fwd, or whether UL timing determination is up to the gNB without any NCR-Fwd-specific transmission (such as SRS) by the NCR.

FIG. 17 illustrates a flowchart of an example NCR procedure 1700 for cross-carrier beam indication for NCR-Fwd BH-beam determination according to embodiments of the present disclosure. For example, procedure 1700 for cross-carrier beam indication for NCR-Fwd BH-beam determination can be performed by either NCR 610 or NCR 710. This example is for illustration only and other embodiments can be used without departing from the scope of the present disclosure.

The procedure begins in 1710, a NCR includes an NCR-MT entity operating in a first cell of a first frequency band and an NCR-Fwd entity operating: (i) in a second frequency band and the NCR-MT and the NCR-Fwd does not support simultaneous Tx-Rx on the first and the second bands, or (ii) in a second cell/passband of the first frequency band. In 1720, the NCR-MT is provided a set of TCI states or UL spatial relations for the C-link. In 1730, the NCR-MT identifies (e.g., is provided or determined) a first TCI state or a first UL spatial relation, from the set of TCI states or UL spatial relations, as QCL properties for a first DL reception or as a spatial relation for a first UL transmission on the C-link. In 1740, the NCR-MT identifies a second TCI state or a second UL spatial relation, from the set of TCI states or UL spatial relations for the C-link, as QCL properties for a second DL reception or as a spatial relation for a second UL transmission on the BH-link. In 1750, the NCR-MT receives the first DL reception on the C-link based on the first TCI state, or transmits the first UL transmission on the C-link based on the first UL spatial relation. In 1760, the NCR-Fwd receives the second DL reception on the BH-link based on the second TCI state, or transmits the second UL transmission on the BH-link based on the second UL spatial relation.

In one embodiment, for example for out-of-band NCR operation, a beam or a set of beams (such as spatial relations or QCL assumptions corresponding to TCI states, SRIs, or antenna beam patterns) applicable to the BH-link of NCR-Fwd can be different from a beam or set of beams applicable to the C-link of NCR-MT. Various approaches can be applicable. In a first approach (referred to as cross-carrier beam indication), a BH-link beam indication for NCR-Fwd can be same as or based on a beam indication corresponding to C-link on the NCR-MT, and can include refinement of the gNB UL Rx or DL Tx beam. In a second approach (referred as nested/two-stage cross-carrier beam indication), a BH-link beam indication for NCR-Fwd can be based on cross-carrier beam indication together with an indication of a corresponding beam pattern, such as a logical beam index or a (reference signal) repetition/resource index. For example, the BH-link beam can be regarded as a finer beam that can be generated by the NCR-Fwd within a wide beam that is used by the NCR-MT for transmission or reception of a source reference signal. In a third approach (referred to as beam index-based BH beam indication), a transmission or reception by NCR-Fwd on the BH-link is based on a spatial transmission or reception filter according to a beam from a set of (logical or physical) beam indexes corresponding to antenna beam patterns that can be generated by the NCR-Fwd on the BH-link. In a fourth approach (referred to as NCR-Fwd-specific TCI/SRI for BH-link beam determination), a BH-link beam indication for NCR-Fwd can be in the form of TCI states or SRIs, configured/indicated for NCR-MT (or for NCR-Fwd), that are based on reference signals such as SSBs or CSI-RS or SRSs associated with a cell/passband of NCR-Fwd. A gNB-based variation of the fourth approach evaluates transmission, by NCR-MT (or NCR-Fwd), of SRSs associated with the cell/passband of NCR-Fwd, while an NCR-assisted variation of the fourth approach evaluates reception and measurement reporting, by NCR-MT (or NCR-Fwd), of SSBs or CSI-RSs associated with the cell/passband of NCR-Fwd.

For out-of-band NCR operation, a beam or set of beams applicable to the BH-link of NCR-Fwd can be different from a beam or set of beams applicable to the C-link of NCR-MT. Herein, a beam or set of beams refers to a spatial relation for an UL transmission such as one for PUCCH or SRS for example, as indicated by an SRI or an UL TCI state or a joint UL/DL TCI state, or QCL properties for a DL reception such as a TCI state, a DL TCI state or a joint DL/UL TCI state, or a set thereof.

Various approaches can be evaluated for determination and indication of a beam for transmission or reception on the BH-link of the NCR-Fwd when operating in a cell/passband or a carrier frequency or a frequency band/range that is different from that for NCR-MT.

In a first approach (referred to as cross-carrier beam indication), a BH-link beam indication for NCR-Fwd can be based on a beam indication, such as a reference signal or a TCI state or an SRI corresponding to C-link on the NCR-MT (rather than NCR-Fwd itself). For example, BH beam indication can be per same procedures as for an in-band NCR operation.

For example, a set of reference signals such as SSB or CSI-RS or SRS that are used by the gNB as source RSs for TCI states or SRIs to determine a beam for the BH-link of the NCR-Fwd can be same as a set of reference signals that are configured on a cell of NCR-MT for NCR-MT operation, such as for determination of spatial relation for PDCCH/PDSCH or PUSCH/PUCCH for NCR-MT. For example, the NCR-MT may not be configured any reference signals corresponding to a cell/passband of NCR-Fwd (e.g., in FR2). For example, the NCR-MT transmits the corresponding P/SP/AP SRSs with spatial relations that are based on reference signals configured in a cell/passband of NCR-MT (e.g., in FR1).

For example, while a set of SSBs/CSI-RSs/SRSs/TCIs used for beam indication for NCR-Fwd on the BH-link is same as those for NCR-MT on the C-link, an indicated/determined beam from the set for the BH-link can be same or different from an indicated/determined beam for the C-link. In one example, such same or different beam can apply also when NCR-MT and NCR-Fwd have simultaneous or overlapping transmissions or receptions.

The first approach can enable a simple implementation with little/no change compared to the in-band operation. The first approach can be beneficial, for example, when NCR-MT and NCR-Fwd operate in different carrier frequencies/cells/passbands of a same frequency band (similar to intra-band contiguous CA or intra-band non-contiguous CA), or in different, closely spaced frequency bands.

In a variation of the first approach, the reference signals used as source RSs for the TCI states or SRIs associated with the NCR-MT and utilized for BH beam indication are configured with NCR-repetition set to 'on' to accommodate gNB's DL Tx or gNB's UL Rx beam sweeping. For example, the gNB can transmit an SSB or a CSI-RS (from a same resource or a same resource set) corresponding to the NCR-MT with a finer DL Tx beam or can receive an SRS (from a same SRS resource or a same SRS resource set) corresponding to the NCR-MT with a finer UL Rx beam, while the NCR-MT (or NCR-Fwd) maintains a same DL Rx beam for the SSB/CSI-RS or a same UL Tx beam for the SRS, respectively. The use of finer gNB beams increases the BH-link quality and improves the robustness of the BH-link. Since such beam repetition/sweeping is performed at the gNB side, there is no impact on the NCR-side BH-link beam indication, compared to the in-band NCR operation (e.g., with NCR-MT in FR1). In another example, such operation may be transparent to the NCR, and may be achieved based on beam sweeping based on repetition of reference signals corresponding to UEs that are served by the gNB through the NCR-Fwd.

Figure 18:
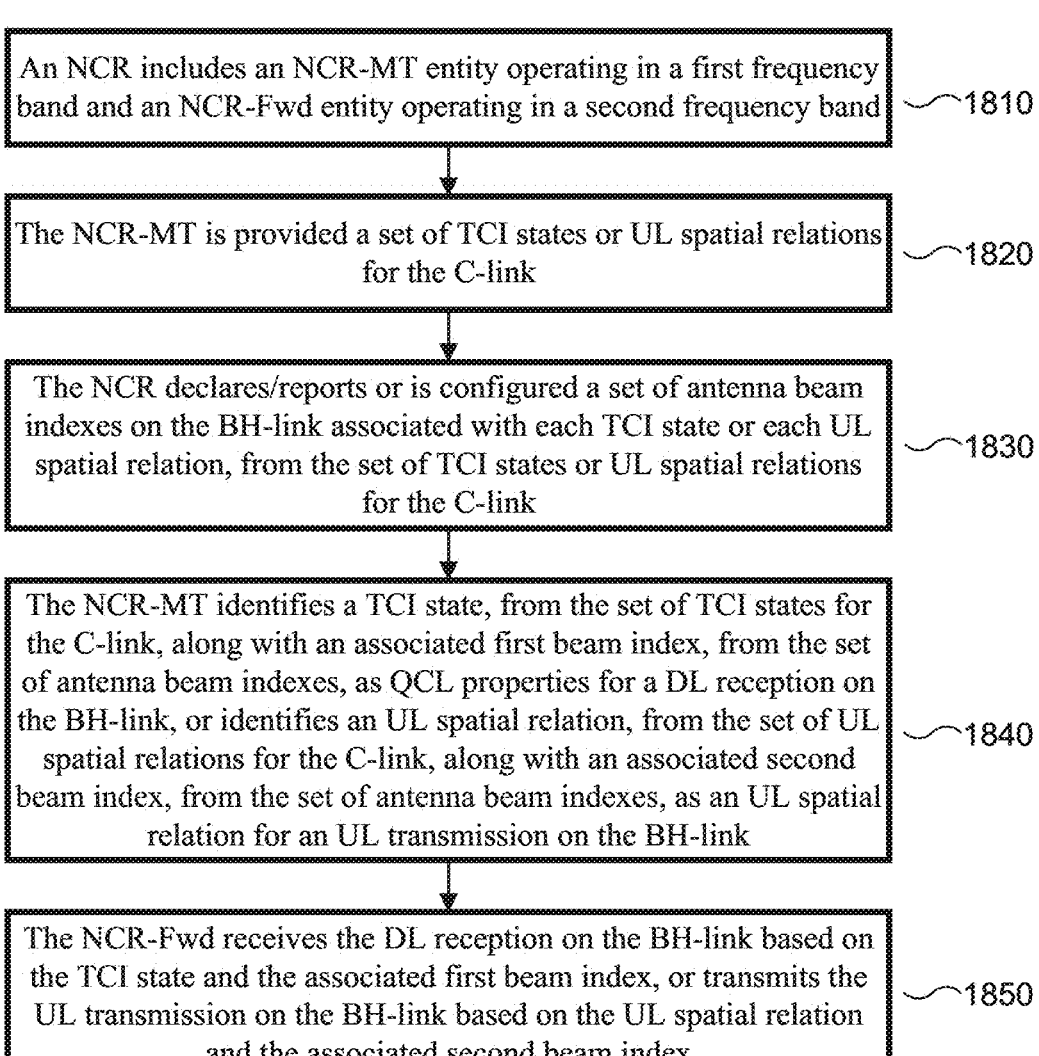
FIG. 18 illustrates a flowchart of an example NCR procedure for nested/two-stage BH-link beam indication according to embodiments of the present disclosure.

FIG. 18 illustrates a flowchart of an example NCR procedure 1800 for nested/two-stage BH-link beam indication according to embodiments of the present disclosure. For example, procedure 1800 for nested/two-stage BH-link beam indication can be followed by the NCR 610 of FIG. 6. This example is for illustration only and other embodiments can be used without departing from the scope of the present disclosure.

The procedure begins in 1810, a NCR includes an NCR-MT entity operating in a first frequency band and an NCR-Fwd entity operating in a second frequency band. In 1820, the NCR-MT is provided a set of TCI states or UL spatial relations for the C-link. In 1830, the NCR declares/reports or is configured a set of antenna beam indexes on the BH-link associated with each TCI state or each UL spatial relation, from the set of TCI states or UL spatial relations for the C-link. In 1840, the NCR-MT identifies a TCI state, from the set of TCI states for the C-link, along with an associated first beam index, from the set of antenna beam indexes, as QCL properties for a DL reception on the BH-link, or identifies an UL spatial relation, from the set of UL spatial relations for the C-link, along with an associated second beam index, from the set of antenna beam indexes, as an UL spatial relation for an UL transmission on the BH-link. In 1850, the NCR-Fwd receives the DL reception on the BH-link based on the TCI state and the associated first beam index, or transmits the UL transmission on the BH-link based on the UL spatial relation and the associated second beam index.

In a second approach (referred as nested/two-stage cross-carrier beam indication), a BH-link beam indication for NCR-Fwd can be based on cross-carrier beam indication along with a finer indication of a corresponding beam pattern, such as a logical beam index or an RS repetition index or an RS resource index. For example, an indicated beam for the BH-link can be in terms of a pair/combination of a TCI state or an SRI associated with an SSB/CSI-RS/SRS configured for NCR-MT along with a corresponding (logical) beam index or RS repetition/resource index.

For example, the BH-link beam can be regarded as a finer beam, indicated by the logical beam index or the RS repetition index or the RS resource index, that can be generated by the NCR-Fwd within a wide beam that is generated by the NCR-MT for transmission or reception of a source RS, such as SSB or CSI-RS or SRS, that is indicated by the TCI state or SRI corresponding to NCR-MT.

For example, the reference signals used as source RSs for the TCI states or SRIs associated with the NCR-MT and utilized for BH beam indication are configured with gNB-repetition set to 'on' to accommodate NCR-Fwd's DL Rx or NCR-Fwd's UL Tx beam sweeping. For example, the NCR-MT (or NCR-Fwd) can receive an SSB or a CSI-RS, from a same resource or a same resource set, corresponding to the NCR-MT with a finer DL Rx beam or can transmit an SRS (from a same SRS resource or a same SRS resource set) corresponding to the NCR-MT with a finer UL Tx beam (corresponding to narrower beams of the NCR-Fwd), while the gNB maintains a same UL Rx beam for the SRS or a same DL Tx for the SSB/CSI-RS, respectively.

For example, different NCR-Fwd's DL Rx beams or UL Tx beams in different repetitions/sweeps are associated with different hypothetical DL TCI states or joint DL/UL TCI states or UL TCI states or SRIs that correspond to a cell/passband of NCR-Fwd (e.g., in FR2). For example, the NCR-Fwd can receive an indicated SSB or a CSI-RS corresponding to a cell of NCR-MT with M=4 repetitions, wherein each of the M=4 repetitions use a different DL Rx beam from M=4 DL Rx beam patterns generated by the NCR-Fwd for the indicated SSB or CSI-RS. For example, the NCR-Fwd can transmit an indicated SRS corresponding to a cell of NCR-MT with M=4 repetitions, wherein each of the M=4 repetitions use a different UL Tx beam from M=4 UL Tx beam patterns generated by the NCR-Fwd for the indicated SRS. For example, the M=4 UL Tx beam patterns can correspond to physical or logical beams or beam indexes generated by the NCR-Fwd in a corresponding cell/passband of NCR-Fwd (e.g., in FR2). For example, the M=4 DL Rx/UL Tx beam patterns can correspond to M=4 narrower beam patterns in different spatial directions corresponding to (such as, within a main lobe of) a wide beam pattern associated with the spatial reception/transmission filter used for reception/transmission of the corresponding SSB or CSI-RS/SRS in a cell of the NCR-MT (in FR1). For example, a first repetition corresponds to a first DL Rx/UL Tx beam (pattern), and a second repetition corresponds to a second DL Rx/UL Tx beam (pattern) associated with the cell/passband of NCR-Fwd.

The second approach can be beneficial, for example, because the NCR-MT or NCR-Fwd do not need to receive/transmit SSBs or CSI-RSs/SRSs (or other reference signals) in an FR2 band corresponding to NCR-Fwd (or in general, in a cell/passband corresponding to NCR-Fwd that is not supported/operated by NCR-MT), while the NCR-Fwd can generate FR2-like beams that can be used for BH-link beam indication.

In one example, other values of M can be also supported, such as M=2 or 4 or 8 or 16. For example, supported values of M can be reported as NCR-Fwd capability, per NCR-MT or per band or per BC or per pair of bands or per pair of BCs for NCR-MT and NCR-Fwd, and the gNB (e.g. the BS 102) can configure a value for NCR operation from among the supported M values. In one example, a same value of M applies to different SSBs/CSI-RSs/SRSs. In another example, different M values can be configured/indicated for different SSBs/CSI-RSs/SRSs. For example, reference signals or TCI states with QCL assumptions (e.g., Type-D) or spatial relations within or close to line-of-sight between the NCR node and the gNB can be configured/indicated a larger value of M, while those with QCL assumptions (e.g., Type-D) or spatial relations farther away from the line-of-sight between the NCR node and the gNB can be configured/ indicated a smaller value of M.

In one example, when dedicated beam indication is not supported for NCR-Fwd or a dedicated beam indication is not provided for the NCR-Fwd, the NCR-Fwd can transmit or receive on the BH-link using a predetermined or default beam, such as:

If the NCR does not receive an indication of a unified TCI state for receptions by the NCR-MT, receptions on the backhaul link use same QCL parameters as the ones for PDCCH receptions in a CORESET with the lowest controlResourceSetId along with a corresponding smallest beam index (or smallest repetition/resource index when repetition is set to 'on'), Else, receptions on the backhaul link use the QCL parameters provided by an indicated unified TCI state for receptions by the NCR-MT along with a corresponding smallest beam index (or smallest repetition/resource index when repetition is set to 'on'); and/or If the NCR does not receive an indication of a unified TCI state for transmissions by the NCR-MT, transmissions on the backhaul link use a same spatial filter as the one associated with the PUCCH resource with the smallest pucch-ResourceId in PUCCH-ResourceSet along with a corresponding smallest beam index (or smallest repetition/resource index when repetition is set to 'on'), Else, transmissions on the backhaul link use a spatial filter corresponding to an indicated unified TCI state for transmissions by the NCR-MT along with a corresponding smallest beam index (or smallest repetition/resource index when repetition is set to 'on').

FIG. 19 illustrates a flowchart of an example NCR procedure 1900 for beam-index-based indication of BH-link beam according to embodiments of the present disclosure. For example, procedure 1900 for beam-index-based indication of BH-link beam can be followed by the NCR 710 of FIG. 7. This example is for illustration only and other embodiments can be used without departing from the scope of the present disclosure.

The procedure begins in 1910, a NCR includes an NCR-MT entity operating in a first frequency band and an NCR-Fwd entity operating in a second frequency band. In 1920, the NCR-MT is provided a set of TCI states or UL spatial relations for the C-link. In 1930, the NCR declares/ reports or is provided a set of antenna beam indexes for the BH-link of NCR-Fwd. In 1940, the NCR-MT identifies a first TCI state, from the set of TCI states, as QCL properties for a first DL reception on the C-link, or a first UL spatial relation, from the set of UL spatial relations, as an UL spatial relation for a first UL transmission on the C-link. In 1950, the NCR-MT identifies a first beam index, from the set of antenna beam indexes, as a DL spatial filter for a second DL reception on the BH-link, or identifies a second beam index, from the set of antenna beam indexes, as an UL spatial filter for a second UL transmission on the BH-link. In 1960, the NCR-MT receives the first DL reception on the C-link based on the first TCI state, or transmits the first UL transmission on the C-link based on the first UL spatial relation. In 1970, the NCR-Fwd receives the second DL reception on the BH-link based on the first beam index, or transmits the second UL transmission on the BH-link based on the second beam index.

In a third approach (referred to as beam index-based BH beam indication), a transmission or reception by NCR-Fwd on the BH-link is based on a spatial transmission or reception filter according to a beam from a set of (logical or physical) beam indexes.

For example, the NCR-Fwd can generate a total of N beams or beam patterns on the BH-link. A beam indication for BH link includes an indication of a beam index or a beam pattern index from a set {1, 2, . . . , N} (or from a set {0, 1, . . . , N−1}). For example, a set of beams or beam patterns, and corresponding beamforming characteristics (for example, power/PSD, spatial directions, directivity, and so on) can be provided via manufacturer's declaration such as by OAM or via reported NCR-Fwd capability such as by RRC signaling. For example, a set of NCR-Fwd beams or beam patterns can be sequential indexes, for example, in a same order as reported by the manufacturer's declaration or by NCR-Fwd capability reporting.

For example, the NCR-MT or NCR-Fwd may not be configured/indicated to transmit or receive any RS on the C-link or the BH-link in association with the NCR-Fwd beams/beam patterns. For example, a beam indication for the BH-link does not include or involve any configuration or indication of an RS index or TCI state index corresponding to NCR-MT or NCR-Fwd, or transmissions or receptions of any reference signals by NCR-MT on the C-link or NCR-Fwd on the BH-link.

In one example, a MAC-CE can indicate an applicable BH beam index that the NCR-Fwd applies until receiving a next BH beam indication. For example, the NCR-MT receives a first MAC-CE indicating a first BH beam index, and the NCR-Fwd applies the first BH beam index starting from (a first/earliest slot that is after) slot $$k + 3N_{slot}^{subframe,\mu}$$

where k is the slot where the NCR-MT would transmit a PUCCH with HARQ-ACK information associated with the PDSCH providing the first MAC CE command and y is the SCS configuration for the PUCCH transmission. For example, the NCR-Fwd continues to apply the first BH beam index until the NCR-Fwd goes to OFF state or until the NCR-MT receives a second MAC-CE indicating a second BH beam index, which the NCR-Fwd applies starting from (a first/earliest slot that is after) slot $$n + 3N_{slot}^{subframe,\mu}$$

where n is the slot where the NCR-MT would transmit a second PUCCH with HARQ-ACK information associated with a second PDSCH providing the second MAC CE command.

In another example, a BH-link beam index is provided jointly with an Access-link beam index. For example, an RRC configuration providing periodic (P) Access-link beam indication or a MAC-CE command activating semi-persistent (SP) Access-link beam indication or a DCI format 2_8 (or a new DCI format 2_X) indicating aperiodic (AP) Access-link beam indication also includes information of an applicable BH-link beams index for the corresponding time/ frequency resources. For example, a BH-link beam index can be configured separately for each P/SP/AP time/frequency forwarding resource or commonly per P/SP/AP forwarding resource set or per list of P/SP/AP forwarding resource sets. When separate BH beam indexes are to be provided for different P/SP/AP resources in a resource set, such BH beam indexes can be provided using explicitly separate fields or can be jointly encoded into a single index based on a predetermined or (pre)configured mapping/table. For example, the mapping/table can include a number of rows, and each row includes a number of BH beam indexes, for example, equal to a number of forwarding resources in the corresponding forwarding resource set. When the NCR is provided a row index indicating a row of the mapping/table, the NCR uses the number of BH beams indexes provided in the indicated row.

In one example, a beam index for the Access link and a corresponding index of the BH-link can be provided separately. In another example, a beam index for the Access link and a corresponding index of the BH-link can be jointly encoded into a single index such that the single index provides a combination/pair of the Access beam and BH beam based on a predetermined or (pre)configured mapping/table.

For example, when a MAC-CE command activates or deactivates a list of SP forwarding resources, the MAC-CE can activate the corresponding Access link beam indications as per RRC configuration of the indicated list, or can indicate a number of Access link beam indexes to replace the configured Access link beam indexes associated with the list of resources. For example, the MAC-CE can also include an indication to a number of BH-link beam indexes to replace the configured BH-link beam indexes associated with the list of resources. For example, the MAC-CE can an indication to replace one or both of configured Access link beam indexes and BH-link beam indexes associated with the list of SP forwarding resources. For example, the MAC-CE can only replace beam indexes for both Access link and BH-link or for none of them. For example, when the MAC-CE replaces beam indexes for both Access link and BH-link, the corresponding beam indexes can be provided separately for the Access link and BH-link or can be jointly encoded into a single index based on a predetermined or (pre)configured mapping/table.

In another example, a beam index for BH-link can be provided separately from Access-link beam indication, while the corresponding P/SP/AP forwarding resources can be re-used. For example, the NCR-MT can be provided separate RRC configuration or MAC-CE command or DCI format 2_X that provides BH-link beam indexes in association with P/SP/AP forwarding resources or resource sets or lists of resource sets.

In one example, the NCR declares/reports or is provided/configured/indicated a same set of antenna beam indexes for both uplink transmissions and downlink receptions on the BH-link of the NCR-Fwd. In another example, the NCR declares/reports or is provided/configured/indicated separate sets of antenna beam indexes for uplink transmissions and downlink receptions on the BH-link of the NCR-Fwd, such as a first (larger) set of (narrower) beams for DL receptions and a second (smaller) set of (wider) beams for UL transmission.

In one example, the NCR-MT can be provided indication of a set of restricted beams for BH-link of the NCR-Fwd, wherein the indication can be based on RRC signaling or via MAC-CE command. The set of restricted beams can be associated with a resource or a set of resources, such as a time or frequency resources, or only time-domain resources, or a forwarding resource, or a set thereof, or a list of sets thereof. For example, the set of restricted beams can apply from a first indication until a next indication, such as from an application time of a first MAC-CE command until an application time of a next MAC-CE command.

For example, the NCR-MT reports a set of undesired BH-link beam indexes to be regarded to be included in the set of restricted beams. For example, the gNB indicates to the NCR-MT a set of restricted beams for the BH-link. For example, the NCR does not expect a beam indication for the BH-link, such as a DCI format or a MAC-CE command indicating a BH-link beam index, to indicate a beam index from the set of restricted beams for the BH-link.

For example, when the NCR does not support reception of a dedicated indication, such as a MAC-CE for BH beam indication, or when a BH-link beam indication is not applicable, such as before an application time of a first/earliest such MAC-CE, or when the dedicated indication does not provide a beam indication for a given time or frequency resources, the NCR-Fwd can apply a predetermined/default beam index, such as a BH-link beam with smallest beam index among non-restricted beam indexes. When there is no configuration/indication of restricted beams, a default/predetermined beam can be a beam with smallest beam index among the beam indexes declared/reported for the NCR-Fwd or among the beam indexes configured/indicated for the NCR-Fwd, for example, on (an active BWP or a smallest index BWP) a corresponding cell/passband (or a smallest index cell/passband) associated with the NCR-Fwd.

FIG. 20 illustrates a flowchart of an example NCR procedure 2000 for BH beam indication according to embodiments of the present disclosure. For example, procedure 2000 for BH beam indication can be performed by either NCR 610 or NCR 710. This example is for illustration only and other embodiments can be used without departing from the scope of the present disclosure.

The procedure begins in 2010, a NCR includes an NCR-MT entity operating in a first frequency band and an NCR-Fwd entity operating in a second frequency band. In 2020, the NCR-MT is provided a first set of TCI states or UL spatial relations for the C-link based on a first set of RSs configured for the C-link. In 2030, the NCR-MT is provided a second set of TCI states or UL spatial relations for the BH-link based on a second set of RSs configured for the BH-link. In 2040, the NCR-MT identifies a first TCI state, from the first set of TCI states, as QCL properties for a first DL reception on the C-link, or a first UL spatial relation, from the first set of UL spatial relations, as an UL spatial relation for a first UL transmission on the C-link. In 2050, the NCR-MT identifies a second TCI state, from the second set of TCI states, as QCL properties for a second DL reception on the BH-link, or a second UL spatial relation, from the second set of UL spatial relations, as an UL spatial relation for a second UL transmission on the BH-link. In 2060, the NCR-MT receives the first DL reception on the C-link based on the first TCI state, or transmits the first UL transmission on the C-link based on the first UL spatial relation. In 2070, the NCR-Fwd receives the second DL reception on the BH-link based on the second TCI state, or transmits the second UL transmission on the BH-link based on the second UL spatial relation.

In a fourth approach (referred to as NCR-Fwd-specific TCI/SRI for BH-link beam determination), a BH-link beam indication for NCR-Fwd can be in the form of TCI states or SRIs that are based on reference signals, such as SSBs or CSI-RS or SRSs associated with a cell/passband of NCR-Fwd, and are configured/indicated for NCR-MT (or for NCR-Fwd). When SRSs are used, the BH-link beam determination may only require transmission of the configured/indicated SRSs, while remaining processing such as measurements can be performed by the gNB. Such method can apply in a gNB-based variation of the fourth approach. When SSBs or CSI-RSs are used, the BH-link beam determination can involve reception, measurement and reporting, by NCR-MT, corresponding to the configured/indicated SSBs or CSI-RSs. Such method can apply in an NCR-based variation of the fourth approach.

In one example, for out-of-band NCR operation, the NCR can be provided separate sets of spatial relations, such as TCI states or SRIs, for NCR-MT/C-link and NCR-Fwd/BH-link. For example, the NCR-MT can be provided a first set of TCI states or SRIs, including an empty set, and the NCR-Fwd can be provided a second set of TCI states or SRIs.

For example, the second set of spatial relations such as the second set of TCI states or SRIs can be with respect to reference signals (RSs) configured on (one or multiple BWPs of) a cell or passband or carrier frequency or frequency band/range that is applicable to NCR-Fwd. For example, the NCR-MT can be provided information of a second set of SSBs or CSI-RSs or SRSs (such as corresponding resources and parameters) that are applicable to NCR-Fwd, for example, in FR2.

For example, the second set of SSBs or CSI-RSs or SRSs are separate from a first set of SSBs or CSI-RSs or SRSs that are applicable to NCR-MT on the C-link. For example, the TCI states or SRIs corresponding to the second set of RSs may not be used as spatial relations for PDCCH/PDSCH receptions or PUCCH/PUSCH transmission for the NCR-MT on the C-link.

In one example, the configuration of the second set of RSs, such as SSBs or CSI-RSs or SRSs, can be per cell or per passband or per carrier frequency or per frequency band or per frequency range of NCR-Fwd. For example, such configuration of the second set of RSs can be irrespective of BWPs configured for the cell applicable to NCR-Fwd, or can be same for BWPs configured for the cell applicable to NCR-Fwd. For example, the NCR-Fwd may not have any BWP configuration.

In another example, the configuration of the second set of RSs can be per BWP of the cell or passband applicable to NCR-Fwd. For example, the second set of RSs can include a first group of RSs corresponding to a first BWP of the cell/passband of NCR-Fwd, and a second group of RSs corresponding to a second BWP of the cell/passband of NCR-Fwd.

For example, when the configuration of the second set of RSs is per BWP of NCR-Fwd, the UE (e.g. the UE 116) can receive information to indicate an applicable "active" BWP to be used for determining a corresponding TCI state or SRI or corresponding RS such as SSB or CSI-RS or SRS. For example, an indication of the applicable/"active" BWP of NCR-Fwd can be via a signaling, such as a MAC-CE or a DCI, that is separate from a signaling of the TCI state or SRI. For example, such signaling can apply to another subsequent backhaul beam indication until the NCR receives a new signaling indicating a new applicable/"active" BWP. In another example, an indication of the applicable/"active" BWP of NCR-Fwd can be included in a same signaling used for indication of an applicable TCI state or SRI for the NCR-Fwd. For example, a MAC-CE can indicate an applicable TCI state for the BH-link and can also indicate a corresponding BWP.

For example, when a DCI format or a MAC-CE command indicates an "active" BWP for the NCR-Fwd, the NCR such as NCR-MT or NCR-Fwd applies the indicated "active" BWP after a switching/processing time, such as in (a first slot after) a slot n+K+1, wherein n is a slot for PDCCH/DCI reception and K is a slot offset that is predetermined in the specifications or is provided by higher layer signaling or can depend on the NCR capability, and wherein the slots are in terms of the SCS of the NCR-MT/C-link or the SCS of the current/old or new/indicated active BWP of the NCR-Fwd on BH-link.

In one example, BWPs for NCR-Fwd are linked to BWPs configured for NCR-MT. For example, an "active" BWP for NCR-Fwd can be same as an active BWP for the NCR-MT. For example, higher layer signaling can provided a mapping between BWPs of NCR-MT and BWPs of NCR-Fwd. For example, the NCR-MT can be provided, on/for a first configured BWP of the NCR-MT, configuration for a first groups of RSs such as a first group of SSBs or CSI-RSs or SRSs corresponding to a cell/passband of NCR-Fwd, and can be provided, on/for a second configured BWP of the NCR-MT, configuration for a second groups of RSs such as a second group of SSBs or CSI-RSs or SRSs corresponding to the cell/passband of NCR-Fwd.

For example, a second spatial relation, such as a second TCI state or a second SRI, applicable to NCR-Fwd on the BH-link can be different from a first spatial relation, such as a first TCI state or a first SRI, applicable to NCR-MT on the C-link. For example, the first TCI state/SRI and the second TCI state/SRI can correspond to DL receptions or UL transmissions that are in same or overlapping symbols or slots for NCR-MT and NCR-Fwd.

For example, the NCR can be provided information whether same or different spatial relation/beam/TCI state/SRI (or sets thereof) applies to the NCR-MT and NCR-Fwd.

For example, for an NCR without capability to support dedicated BH beam indication such as via MAC-CE, the NCR can apply a predetermined or default spatial relation, such as a predetermined/(pre)configured/default TCI state or SRI, for the NCR-Fwd on the BH-link. For example, the NCR can be predetermined/preconfigured with a fixed beam for the BH link. For example, NCR-Fwd supports only a single beam (characterized via OAM) for the BH-link. For example, the NCR can be configured a single TCI state or a single SRI for NCR-Fwd operation on the BH-link. For example, the beam such TCI state or SRI corresponding to the BH-link can be reconfigured and a new TCI state or a new SRI can be applicable to the BH-link (unlike the case of fixed beam). For example, the NCR can be provided a set of TCI states for operation of NCR-Fwd. For example, the NCR-Fwd can operate with a predetermined or default TCI state, such as one from the set of TCI states for operation of NCR-Fwd. For example, NCR-Fwd receptions on the BH-link can use same QCL properties as a smallest/largest index TCI state among the set of TCI states, or a (sole or smallest index) TCI state in an active BWP of a corresponding cell/passband of NCR-Fwd or in a lowest index BWP (of a corresponding cell/passband or of a smallest index cell/passband) configured for the NCR-Fwd. Similar can hold for uplink transmissions on the backhaul link using (a sole or) a smallest/largest index SRI or smallest/largest index UL TCI state in the active BPW (or in a smallest index BWP) of a corresponding cell/passband (or a smallest index cell) associated with NCR-Fwd.

In a gNB-based variation of the fourth approach, the gNB selects and indicates a beam for the BH-link based on gNB's own measurements of NCR reference signals, such as periodic (P) or semi-persistent (SP) or aperiodic (AP) SRSs transmitted by NCR-MT (or by NCR-Fwd). For example, the NCR-MT can be provided configuration information of P/SP/AP SRSs in a cell/passband or carrier frequency of the NCR-Fwd, along with corresponding UL spatial relations. For example, gNB receives and measures such P/SP/AP SRSs to determine a beam for the NCR-Fwd on the BH-link. For example, the NCR-MT receives a BH beam indication in terms of an SRI indicating spatial relations with respect to an indicated SRS from the P/SP/AP SRSs.

For example, a BH-link beam indicated by the gNB can be with respect to uplink spatial relations of a corresponding P/SP/AP SRS associated with the cell/passband or carrier frequency of the NCR-Fwd. For example, beam reciprocity can be expected between DL receptions and UL transmissions corresponding to NCR-Fwd, and the same uplink spatial relation can be also used as QCL assumption/TCI state for DL receptions on the BH-link by the NCR-MT on the corresponding cell/passband or carrier frequency of the NCR-Fwd. For example, a source RS of the TCI state indicated by the gNB for DL reception on the BH-link can be a P/SP/AP SRS, such as the determined P/SP/AP SRS determined by the gNB. For example, the TCI state can be a unified Joint DL/UL TCI state that applies to both DL receptions and UL transmissions.

In one example, such P/SP/AP SRSs corresponding to NCR-Fwd can be configured with NCR-repetition set to 'on' such that the gNB can perform beam sweeping with respect to gNB's UL Rx beams and determine a suitable UL Rx beam such as with high RSRP or SINR, while the NCR-MT (or NCR-Fwd) maintains a same UL spatial relation or a same UL Tx beam/uplink spatial transmission filter.

In one example, such P/SP/AP SRSs corresponding to NCR-Fwd can be configured with gNB-repetition set to 'on' such that the NCR-MT (or NCR-Fwd) can perform beam sweeping with respect to NCR's UL Tx beams and determine a suitable UL Tx beam such as with high RSRP or SINR, while the gNB maintains a same UL spatial relation or a same UL Rx beam/uplink spatial reception filter.

In an NCR-assisted variation of the fourth approach, the NCR-MT can be provided configuration or indication for reception, by NCR-MT (or by NCR-Fwd), of SSBs or CSI-RSs associated with a cell/passband of NCR-Fwd. For example, the NCR-MT (or NCR-Fwd) can receive the corresponding SSBs or CSI-RSs, or can make measurements based on them, or can report corresponding qualities, such as beam reporting quantities for example one or more of RSRP or RSRQ or RSSI or SINR, as L1 measurements or L3-filtered measurements, or CSI reporting quantities, such as one or more of channel quality indicator (CQI), precoding matrix indicator (PMI), location indicator (LI), and so on. For example, the NCR-MT receives a BH beam indication in terms of a TCI state indicating QCL properties with respect to an SSB or CSI-RS from such SSBs or CSI-RSs.

In one example, an NCR is expected to support both the gNB-based or NCR-assisted variations of the fourth approach. In another example, a selection of the gNB-based variation or NCR-assisted variation of the fourth approach can be based on NCR capability. For example, the NCR can report a capability for none, one, or both of: (i) reception or measurement reporting, by NCR-MT (or NCR-Fwd), of NCR-Fwd-specific/out-of-band SSBs or CSI-RSs as previously described for NCR-assisted method; and (ii) transmission of NCR-Fwd-specific/out-of-band SRSs as previously described for the gNB-based method. For example, item (ii) can be supported as baseline for an NCR supporting out-of-band operation, and the UE can report a capability or not only for item (i). For example, when the NCR supports a capability for both items (i) and (ii), the NCR can be indicated to apply only the NCR-based variation or can be indicated to apply either or both gNB-based or NCR-assisted variations.

For example, the UE is (pre)configured via OAM or via RRC signaling, using for example a separate RRC parameter, which method to apply. For example, a separate RRC parameter may not be used, and an indication to use which method can be based on which reference signals, for example, SSB/CSI-RS or SRS, are configured for NCR operation. In one example, no selection may be provided, and some BH-link beams may be based on SSBs/CSI-RSs associated with NCR-Fwd and some other BH-link beams may be based on SRSs associated with NCR-Fwd.

For example, the NCR can be provided an 'indicated' unified TCI state for operation of NCR-Fwd, and NCR-Fwd receptions/transmissions on the BH-link use the QCL properties provided by the indicated unified TCI state for NCR-Fwd. For example, the indicated unified TCI state for NCR-Fwd is among the set of TCI states configured for operation of NCR-Fwd on the BH link. For example, NCR-MT can receive a TCI state that provides an indicated TCI state for the NCR-Fwd. For example, the NCR-MT can receive a DCI format 1_1 or 1_2 with repurposed fields (such as MCS, new data indicator (NDI), redundancy version (RV), and frequency domain resource assignment (FDRA), as described in TS 38.214[REF4], v17.6.0 and with configured scheduling RNTI (CS-RNTI)) to provide the indicated unified TCI state for NCR-Fwd.

For example, the DCI format 1_1 or 1_2 can include another repurposed field, such as one of DMRS sequence initialization or SRS request or antenna ports or time domain resource assignment (TDRA), wherein a predetermined value such as '1' indicates that the indicated unified TCI state applies to the NCR-Fwd. For example, a value '0' for the repurposed field, such as the one of DMRS sequence initialization or SRS request or antenna ports or TDRA field, can indicate that the indicated unified TCI state applies to the NCR-MT. For example, when a field that is to be repurposed for NCR entity indication is predetermined/configured to include more than one bit, such as SRS request or antenna ports or TDRA field, a least significant bit (LSB) or most significant bit (MSB) of the corresponding field is used for NCR entity indication and other bits are set to predetermined values, such as 0s (or 1s).

For example, the NCR-MT can receive a dedicated signaling such as a MAC-CE that indicates a spatial relation/QCL properties/TCI state/SRI for transmission or reception on the BH-link by the NCR-Fwd. For example, the NCR-MT can provide an indicated unified TCI state index, such as an index of a DL TCI or a UL TCI or joint DL/UL TCI state.

In one example, when the gNB (e.g. the BS 102) provides the NCR-MT with a set of restricted beams, such as a set of restricted TCI states or SRIs, and when the NCR is not provided an indication for a BH beam, the NCR-Fwd can apply a predetermined beam from the non-restricted beams, such as a TCI state or an SRI with smallest index among non-restricted TCI states or non-restricted SRIs. Such method can apply when the NCR does not support a capability for reception of dedicated beam indication for the BH-link or when the NCR does not receive a valid beam indication for the BH-link for a certain time or frequency resource (or resource set or list of resource sets) or for a duration of time, such as before a first/earliest MAC-CE command indicating a beam indication for the BH-link or such as after NCR-Fwd resuming to operating following an OFF state, such as after resuming RRC connection from INACTIVE or IDLE state or after (successful) completion of a BFR or RLF, and before receiving a dedicated beam indication for the BH-link.

In one example, an NCR is predetermined in the specifications of system operation to only operate for BH beam determination/indication based on one approach among the first or second or third or fourth approach as previously described. In another example, more than one approach can be supported in the specifications of system operations, and the NCR operates based on one approach among the supported approaches based on NCR capability and higher layer signaling. For example, an NCR can report a capability to support one or more of the first/second/third/fourth approaches. For example, supporting the first approach can be baseline without any capability reporting. For example, the NCR reports a capability to support none, one, or more of the second/third/fourth approaches. For example, the NCR is expected to support at least one of the second/third/fourth approaches. For example, the NCR can be provided higher layer signaling such as dedicated RRC parameter indicating which approach to use for BH-link beam determination/indication. For example, the NCR may not be provided a separate/dedicated RRC parameter to indicate an applicable approach, and the NCR determines an applicable approach based on corresponding configurations, such as configuration of NCR-specific TCI states or SRIs, or repetition parameter, and so on.

Figure 21:
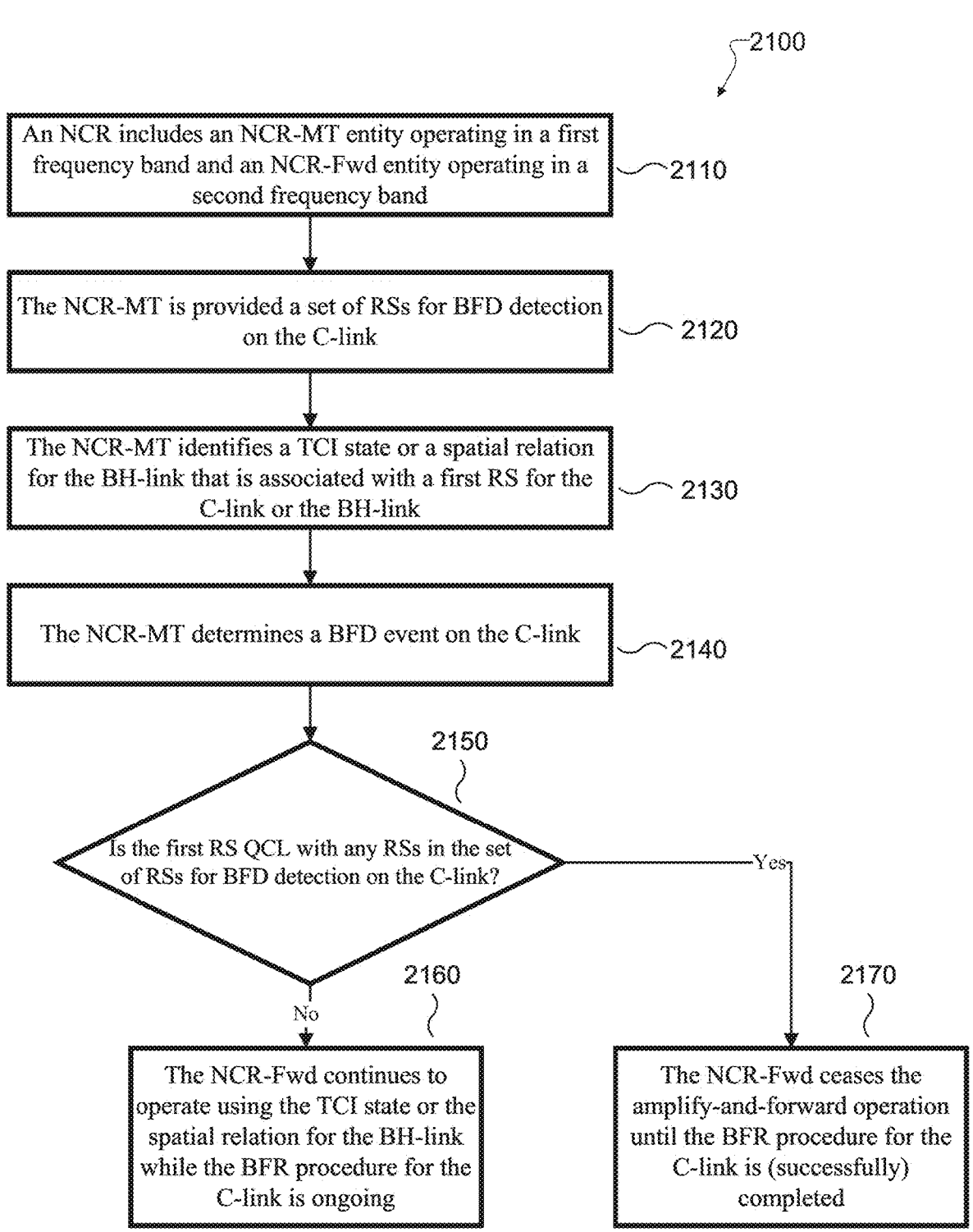
FIG. 21 illustrates a flowchart of an example NCR procedure for NCR-Fwd operation on BH-link according to embodiments of the present disclosure.

FIG. 21 illustrates a flowchart of an example NCR procedure 2100 for NCR-Fwd operation on BH-link according to embodiments of the present disclosure. For example, procedure 2100 for NCR-Fwd operation on BH-link can be followed by the NCR 610 of FIG. 6. This example is for illustration only and other embodiments can be used without departing from the scope of the present disclosure.

The procedure begins in 2110, a NCR includes an NCR-MT entity operating in a first frequency band and an NCR-Fwd entity operating in a second frequency band. In 2120, the NCR-MT is provided a set of RSs for BFD detection on the C-link. In 2130, the NCR-MT identifies a TCI state or a spatial relation for the BH-link that is associated with a first RS for the C-link or the BH-link. In 2140, the NCR-MT determines a BFD event on the C-link. In 2150, the NCR-MT determines whether the first RS is QCL with any RSs in the set of RSs for BFD detection on the C-link. When the NCR-MT determines that the first RS is not QCL with any RSs in the set of RSs for BFD detection on the C-link, in 2160, the NCR-Fwd continues to operate using the TCI state or the spatial relation for the BH-link while the BFR procedure for the C-link is ongoing. When the NCR-MT determines that the first RS is QCL with an RS in the set of RSs for BFD detection on the C-link, in 2170, the NCR-Fwd ceases the amplify-and-forward operation until the BFR procedure for the C-link is (successfully) completed.

FIG. 22 illustrates a flowchart of an example NCR procedure 2200 for gNB-based determination/indication of BFD/BFR according to embodiments of the present disclosure. For example, procedure 2200 for gNB-based determination/indication of BFD/BFR can be followed by the NCR 710 of FIG. 7. This example is for illustration only and other embodiments can be used without departing from the scope of the present disclosure.

The procedure begins in 2210, a NCR includes an NCR-MT entity operating in a first frequency band and an NCR-Fwd entity operating in a second frequency band. In 2220, the NCR-Fwd performs amplify-and-forward (AF) operation using a first TCI state or a first UL spatial relation for the BH-link. In 2230, the NCR-MT is provided a BH-BFD MAC-CE that indicates a BFD event on the BH-link, for example, based on the gNB measurements of SRSs transmitted by the NCR. In 2240, upon reception of the BH-BFD MAC-CE by the NCR-MT, or after some processing time as previously described, the NCR-Fwd ceases the AF operation. In 2250, the NCR-MT receives a BH-BFR MAC-CE that indicates: (i) a BFR procedure for the BH-link is successfully completed, and (ii) a second TCI state or a second UL spatial relation for the BH-link. In 2260, upon reception of the BH-BFR MAC-CE by the NCR-MT, or after some processing time, as described herein, the NCR-Fwd resumes the AF operation using the second TCI state or the second UL spatial relation for the BH-link.

FIG. 23 illustrates a flowchart of an example NCR procedure 2300 for NCR-based determination/indication of BFD/BFR. For example, procedure 2300 for NCR-based determination/indication of BFD/BFR can be performed by either NCR 610 or NCR 710. This example is for illustration only and other embodiments can be used without departing from the scope of the present disclosure.

The procedure begins in 2310, a NCR includes an NCR-MT entity operating in a first frequency band and an NCR-Fwd entity operating in a second frequency band. In 2320, the NCR-MT is provided a first set of RSs for the BH-link for BFD detection on the BH-link, and a second set of RSs for the BH-link for candidate new beam identification for the BH-link. In 2330, the NCR-Fwd performs amplify-and-forward (AF) operation using a first TCI state or a first UL spatial relation for the BH-link. In 2340, the NCR-MT determines a BFD event on the BH-link based on measurements of the first set of RSs. In 2350, the NCR-Fwd ceases the AF operation. In 2360, the NCR-MT determines a second TCI state or a second UL spatial relation for the BH-link, associated with an RS from the second set of RSs, and successfully completes the BFR procedure for the BH-link. In 2370, the NCR-Fwd resumes the AF operation using the second TCI state or the second UL spatial relation for the BH-link.

In one embodiment, when an NCR is provided a set of beams for NCR-Fwd separate from that for NCR-MT, such as for out-of-band NCR operation, the NCR-Fwd can continue to operate on the Access link and BH-link when a BFD event for the C-link occurs, at least when a BH-link beam is not same as or is not QCL (Type-D) with BFD detection reference signals (RSs) for the C-link. On the other hand, the gNB or the NCR-MT (or NCR-Fwd) can determine a BFD event on the BH-link, and the NCR-Fwd can cease the amplify-and-forward (AF) operation (or go to OFF state) until the NCR completes the BFR procedure.

In a gNB-based variation for BFR, the gNB can detect a BFD event on the BH-link based on measurements of periodic SRSs associated with a cell/passband of NCR-Fwd. Upon such detection, the gNB can indicate to the NCR-MT via a BH-BFD MAC-CE to stop the AF operation for the NCR-Fwd, and trigger transmission, by the NCR-MT (or NCR-Fwd), of candidate periodic or semi-persistent SRSs for determination of a new beam for the BH-link. The gNB can indicate to the NCR-MT via a BH-BFR MAC-CE when a BFR procedure is (successfully) completed, and a new BH-link beam to be used by the NCR-Fwd.

In an NCR-based variation for BFR, the NCR-MT (or NCR-Fwd) can detect a BFD event on the BH-link based on measurements of SSBs or periodic CSI-RSs associated with a cell/passband of NCR-Fwd. Upon such detection, the NCR-Fwd ceases the AF operation on the BH-link, and the NCR-MT indicates the BFD event and a new BH beam to the gNB via a PRACH or PUCCH/PUSCH transmission on the C-link. The gNB can indicate to the NCR-MT on the C-link that the BFR procedure for the BH-link is (successfully) completed.

Upon (successful) completion of the BFR procedure for the BH-link, until reception of new dedicated beam indication for BH-link or Access link, the NCR can resume the AF operation using the old/new BH beam or using last configurations available for Access link beam indication.

Such methods can also apply in the event of RLF and corresponding RRC/radio link re-establishment procedure, if applicable for BH-link of NCR-Fwd.

In one example, for out-of-band NCR operation, when an NCR-MT determines a radio link failure (RLF), or a beam failure (BFD), for the C-link/NCR-MT, the NCR-Fwd can continue to operate based on last configurations available for the BH-link and Access link, including one or more of Access-link beam configurations, BH-link beam configurations/indications, power control configurations, and so on. For example, the NCR-Fwd may not go to OFF state (unlike in-band NCR operation).

For example, during RRC re-establishment or BFR procedure of NCR-MT as triggered by RLF/BFD on the C-link, the NCR-Fwd can continue to transmit or receive on the BH-link based on a last configuration or indication for the BH-link beam, such as a fixed/configured BH-link beam, or based on a (logical) beam index or (reference signal) repetition/resource index, or based on an indicated unified TCI state, or based on a predetermined/default beam or based on a dedicated TCI state/SRI provided for NCR-Fwd operation, such as by a MAC-CE.

For example, during RRC re-establishment or BFR procedure of NCR-MT as triggered by RLF/BFD on the C-link, the NCR-Fwd can continue to operate on the Access link based on a last configuration/indication of the Access link beam, such as periodic (P) beam indications, or semi-persistent (SP) beam indications, or aperiodic (AP) beam indication for the Access link.

For example, during RRC re-establishment or BFR procedure of NCR-MT as triggered by RLF/BFD on the C-link, an operation of (out-of-band) NCR using SP beam indication for Access link may not be supported or may be supported conditioned on receiving a corresponding activation MAC-CE no earlier than a time offset N before the RLF/BFD determination. For example, if the NCR-MT has received the activation MAC-CE for an SP beam indication earlier than the time offset N before the symbol/slot in which the NCR determines the RLF/BFD, the NCR does not operate using the SP beam indication, or at least until successful link re-establishment or successful beam failure recovery (BFR). For example, the time offset N can be predetermined in the specifications of system operation, or can be (pre)configured via OAM or RRC, or can be based on NCR capability.

For example, during RRC re-establishment or BFR procedure of NCR-MT as triggered by RLF/BFD on the C-link for out-of-band operation, an NCR-Fwd can transmit or receive on the Access link, and therefore on the BH link, on time resources that are indicated by the aperiodic Access-link beam indication provided by a DCI format 2_8, including when the indicated time resources are after RLF/BFD determination or before successful completion of link re-establishment or BFR.

Various embodiments and examples herein can apply when:

The RLF/BFD determination is replaced with an indication of the corresponding failure event to the gNB, such as by a corresponding PRACH transmission; and/or Successful completion of link re-establishment or BFR is replaced with completion of link re-establishment or BFR, regardless of whether the procedure is completed successfully or not.

Various embodiments and examples herein can apply when:

A beam/TCI/SRI (or corresponding source RS), or a set thereof, for BH-link is different from or is not QCL (such as QCL Type-D) with a set of beams/TCIs/SRIs (or corresponding source RSs, such as SSBs or CSI-RSs) that was used for determination of RLF/BFD for NCR-MT on the C-link.

For example, when a beam/TCI/SRI (or corresponding source RS), or a set thereof, for BH-link is among a set of beams/TCIs/SRIs (or corresponding source RSs, such as SSBs or CSI-RSs) or is QCL with an RS (such as SSB or CSI-RS) that was used for determination of RLF/BFD for NCR-MT on the C-link, the NCR-Fwd also goes to OFF state or ceases the amplify-and-forward (AF) operation.

In one example, "an RS (such as SSB or CSI-RS) that was used for determination of RLF/BFD" can refer to (only/any) one of:

A RS that was configured as a reference signal for RLF/BFD detection, for example configured among RadioLinkMonitoringRS or among failureDetection-ResourcesToAddModList, regardless of whether measurements corresponding to the RS resulted in the NCR-MT declaring the RLF/BFD for the NCR-MT on the BH-link for example based on corresponding counters, timers, and so on; or A RS that was configured as a reference signal for RLF/BFD detection, for example configured among RadioLinkMonitoringRS or among failureDetection-ResourcesToAddModList, and measurements corresponding to the RS resulted in the NCR-MT declaring the RLF/BFD for the NCR-MT on the BH-link for example based on corresponding counters, timers, and so on.

For example, in case of operation based on (ii), the NCR-Fwd can continue to operate based on last available configurations for the BH-link and Access link when:

A beam/TCI/SRI (or corresponding source RS), or a set thereof, for BH-link corresponds to or is QCL with an RS such as an SSB or CSI-RS;

The RS is configured as a reference signal for RLF/BFD detection, for example configured among RadioLink-MonitoringRS or among failureDetectionResources-ToAddModList; and/or Measurements corresponding to the RS did not result in the NCR-MT declaring the RLF/BFD for the NCR-MT on the BH-link (for example based on corresponding counters, timers, and so on).

In one example, a radio link failure (RLF) event, or a beam/link failure detection (BFD) event, can be defined for NCR-Fwd on the BH-link. In one example, in case of out-of-band operation, only BFD/BFR is applicable to NCR-Fwd BH-link, and RLF or RRC/radio link reestablishment is not applicable to NCR-Fwd/BH-link. In another example, both BFD and RLF and corresponding recovery procedures, BFR and RRC/radio link reestablishment, are applicable to BH-link of NCR-Fwd.

Determination of BFD/RLF and corresponding recovery procedures, BFR and RRC/radio link reestablishment, for the NCR_Fwd on the BH-link can be up to the gNB implementation (referred to as gNB-based variation) or can be based on NCR determination (referred to as NCR-based variation).

According to the gNB-based variation for RLF/BFD determination for the BH-link, the NCR-MT (or NCR-Fwd) can be configured or indicated to transmit SRSs, such as periodic (P), semi-persistent (SP), or aperiodic (AP) SRS resources (or resource sets) for BFD/RLF determination associated with a cell/passband of NCR-Fwd. For example, such P/SP/AP SRSs can be dedicated to link/beam failure monitoring, for example, as a new 'usage' for the corresponding SRSs, or can be among P/SP/AP SRSs that are configured to the NCR-MT for other 'usage' such as SRS for beam management. For example, the NCR-MT (or NCR-Fwd) transmits the periodic SRSs based on corresponding periodicity and offset. For example, the NCR-MT (or NCR-Fwd) transmits or stops transmitting SP SRSs based on corresponding periodicity and offset and activation/deactivation signaling such as MAC-CE. For example, the NCR-MT (or NCR-Fwd) transmits AP SRSs in resource (sets) or per offset value as indicated by a DCI format.

In one example, spatial relations for P/SP/AP SRSs for link/beam failure monitoring can be up to NCR implementation or can be QCL with SSBs or CSI-RSs or SRSs configured for NCR-MT on the C-link. In another example, a spatial relation for P/SP/AP SRSs for link/beam failure monitoring can be based on a nested/two-stage indication, as previously described, such as a combination/pair of an RS for example SRI (or TCI or an SSB index or a CSI-RS index) along with (physical/logical) antenna beam index or an RS repetition/resource index, as previously described. In yet another example, a spatial relation for P/SP/AP SRSs for link/beam failure monitoring may include no RS or TCI/SRI indication and can be (fully) based on a (physical/logical) antenna beam index for the BH-link, as previously described. For example, the P/SP/AP SRSs can be separately configured on the cell/passband associated with NCR-Fwd, as previously described, and can have corresponding spatial relations based on reference signals such as SSBs or CSI-RSs or (other) SRSs in the corresponding cell (or can have no spatial relation configuration).

For example, there can be predetermined rules in the specifications of the system operations for spatial relations of the P/SP/AP SRS for link/beam failure monitoring. For example, an NCR-MT (or NCR-Fwd) is expected to apply different spatial transmission filters for different SRS resources in a same SRS resource set with usage as (or when used for) link/beam failure monitoring for BH-link.

For example, the gNB determines that an RLF or BFD event has occurred on the BH-link. For example, a procedure for determination, by gNB, of RLF/BFD event on the BH-link, such as corresponding measurement thresholds, counters or timers, and so on, can be up to the gNB implementation and transparent to the NCR.

For example, the gNB determines a new beam, such as a new SRI (or a new TCI state index) or a new antenna beam index or a new RS repetition/resource index to be used as the new BH-link beam after RLF/BFD event. In one example, details of gNB determination of the new beam/SRI/TCI can be up to gNB implementation. In another example, to determine the new beam/SRI/TCI for the BH-link, the NCR-MT (or NCR-Fwd) can be provided a set of candidate beams, such as a set of candidate SRS resources (or a set of TCI states or a set of candidate SSBs or CSI-RSs) or a set of candidate antenna beam indexes or a set of RS repetition/resource indexes that are associated with a cell/passband of NCR-MT or NCR-Fwd. For example, the candidate RSs can be periodic (such as periodic SRS or periodic CSI-RS or SSB) without need for any trigger for transmission (or reception). For example, the candidate RSs can be semi-persistent (such as SP SRS or SP CSI-RS) that are activated by a MAC-CE triggering command. For example, the gNB triggers transmission, by NCR-MT (or NCR-Fwd), of the candidate SRSs to enable corresponding gNB measurements (with details of measurements up to gNB implementation). For example, the gNB determines a new beam/SRI/TCI, from the set of candidate beams/SRIs/TCIs, based on gNB measurement (wherein the determination procedure is up to the gNB implementation).

For example, the gNB can indicate to the NCR-MT that an RLF or BFD event has occurred on the BH-link. For example, an indication can be via a new "BH-BFD" MAC-CE that is provided by the gNB to the NCR-MT. For example, the NCR-MT can receive the BH-BFD MAC-CE on the C-link at least when the C-link is reliable, that is, no RLF/BFD occurred or occurring for the C-link/NCR-MT (otherwise, the NCR-MT would trigger an RRC reestablishment or BFR procedure for the C-link as per TS 38.213 [REF3]v18.0.0). For example, the BH-BFD MAC-CE can be a zero-size MAC-CE without any fields.

For example, upon reception of the BH-BFD MAC-CE, the NCR-Fwd goes to OFF state or stops the amplify-and-forward (AF) operation on the BH-link/Access link. For example, the NCR-Fwd stops the AF operation in (a first/earliest slot after) a slot where the NCR-MT receives the BH-BFD MAC-CE. For example, the NCR-Fwd stops the AF operation after a processing time from reception of the BH-BFD MAC-CE, such as in (a first/earliest slot after) a slot $$k + 3N_{slot}^{subframe,\mu}$$

where k is the slot where the NCR-MT would transmit a PUCCH with HARQ-ACK information associated with the PDSCH providing the BH-BFD MAC-CE command and y is the SCS configuration for the PUCCH transmission.

For example, the BH-BFD MAC-CE can also be used to trigger the transmission of candidate SRS resources (or reception of candidate SSBs/CSI-RSs). For example, the BH-BFD MAC-CE can include one or more fields to indicate one or more SRIs (or TCIs/SSB resource indicators (SSBRIs)/CRIs) from the set of candidate SRIs (or candidate TCI states/SSBs/CSI-RSs). For example, the NCR-MT (or NCR-Fwd) transmits the candidate SRIs that are indicated by the BH-BFD MAC-CE. For example, the NCR-MT (or NCR-Fwd) starts to transmit the indicated SRS resources from (a first/earliest slot after) a slot $$k + 3N_{slot}^{subframe,\mu}$$

where k is the slot where the NCR-MT would transmit a PUCCH with HARQ-ACK information associated with the PDSCH providing the BH-BFD MAC-CE command and y is the SCS configuration for the PUCCH transmission.

For example, the gNB can provide the NCR-MT a new "BH-BFR" MAC-CE to indicate a (successful) completion of the BH-link RLF/BFR procedure. For example, the BH-BFR MAC-CE can be a zero-size MAC-CE without any field. For example, upon reception of the BH-BFR MAC-CE (or after a processing time after reception of the BH-BFR MAC-CE, as previously described for the "BH-BFD" MAC-CE), the NCR-Fwd resumes the AF operation using previously provided beam indications for the Access link and using for the BH-link: (i) the last indicated/applied beam/SRI/TCI for the BH-link before the RLF/BFD for the BH-link was indicated by the gNB, or (ii) a beam/SRI indicated in the "BH-BFD" MAC-CE if the beam/SRI was the only beam/SRI/TCI provided by the "BH-BFR" MAC-CE, (iii) a beam/SRI/TCI up to NCR-Fwd implementation.

For example, upon reception of the BH-BFR MAC-CE (or after a processing time after reception of the BH-BFR MAC-CE, as previously described for the "BH-BFD" MAC-CE), the NCR-Fwd resumes the AF operation using previously provided beam indications for the Access link and using for the BH-link: (i) the last indicated/applied beam/SRI for the BH-link before the RLF/BFD for the BH-link was indicated by the gNB, or (ii) a beam/SRI indicated in the "BH-BFD" MAC-CE if the beam/SRI was the only beam/SRI provided by the "BH-BFR" MAC-CE, or (ii) a beam/SRI up to NCR-Fwd implementation.

For example, the BH-BFR MAC-CE also deactivates a transmission (or reception) of candidate RSs that were used for determination of the new beam for the BH-link. In one example, such deactivation is automatic upon reception of the BH-BFR MAC-CE (or after a corresponding processing time as previously described). In another example, the BH-BFR includes a field to indicate such deactivation.

In another example, the BH-BFR MAC-CE can also include a field for the new beam to be used for the BH-link. For example, upon reception of the BH-BFR MAC-CE (or after a processing time after reception of the BH-BFR MAC-CE, as previously described for the "BH-BFD" MAC-CE), the NCR-Fwd resumes the AF operation using previously provided beam indications for the Access link and using the new beam indicated for the BH-link via the BH-BFR MAC-CE.

In another example, the NCR-Fwd does not resume the AF operation on the BH-link and Access link after completion of the BFR procedure or radio link re-establishment for the BH-link, for example, as indicated by a BH-BFR MAC-CE. For example, the NCR-Fwd ceases the AF operation after receiving an indication of the BFD/RLF on the BH-link, for example as indicated by a BH-BFD MAC-CE, until the NCR-MT receives new configurations/indication for the Access link beam.

In one example, a same "BH-BFD" MAC-CE (can also be called "BH-BFD-RLF" MAC-CE) can be used for indicating both BFD and RLF events and triggering transmission/reception of candidate RSs for new BH beam determination. In another example, separate MAC-CEs can be used, such as a first "BH-BFD" MAC-CE for indicating BFD event on the BH-link, and a second "BH-RLF" MAC-CE for indicating RLF event on the BH-link, each also triggering transmission/reception of corresponding candidate RSs for new BH beam determination.

In one example, a same "BH-BFR" MAC-CE (can also be called "BH-BFD-RRS" MAC-CE with 'RRS' standing for 'RRC Re-establishment) can be used for indicating a completion of both BFR and RRC/radio link re-establishment procedures and indicating corresponding new beams for the BH-link. In another example, separate MAC-CEs can be used, such as a first "BH-BFR" MAC-CE for indicating completion of BFR procedure on the BH-link and indication of new BH-link beam, and a second "BH-RRS" MAC-CE for indicating completion of RRC/radio link re-establishment procedures for the BH-link. For example, a "BH-RRS" may or may not include a field for indication of new BH-link beam.

In various examples, a DL/UL/joint TCI state can be indicated instead of, or in addition to, SRI.

In various examples, gNB indications such as MAC-CE can include separate beams for DL and UL, such a TCI for DL and an SRI for UL. In various example, a TCI may be provided that applies to both DL and UL.

According to the NCR-based variation to RLF/BFD determination for the BH-link, the RLF/BFD event for the BH-link can be based on measurements, by NCR-MT (or NCR-Fwd), of certain RSs corresponding to a cell/passband of NCR-Fwd. For example, one or more RSs, such as SSBs or CSI-RSs, corresponding to BH-link can be (pre)configured, to NCR-MT (or NCR-Fwd), for measurements corresponding to RLF/BFD for NCR-Fwd on the BH-link. For example, the one or more RSs/SSBs/CSI-RSs can be on a carrier frequency associated with the cell/passband of NCR-Fwd, and separate from RSs/SSBs/CSI-RSs configured on a cell of NCR-MT. For example, for determination of BFD/RLF on the BH-link, the NCR-MT (or NCR-Fwd) can be configured one or more RSs, such as SSBs or CSI-RSs, corresponding to C-link/NCR-MT along with one or more (physical or logical) antenna beam indexes or one or more RS repetition/resource indexes, as previously described. For example, for determination of BFD/RLF on the BH-link, no RSs may be indicated, and the NCR-MT (or NCR-Fwd) can be (pre)configured (only) one or more (physical or logical) antenna beam indexes, as previously described. Similar methods can apply to a configuration of candidate beams used for determination of a new BH-link beam.

For example, RLF/BFD on BH-link/NCR-Fwd can be defined similar to those on C-link/NCR-MT as described in [TS 38.213 v18.0.0][REF3], for example, using signal quality thresholds, such as RSRP thresholds, or corresponding in-sync or out-of-sync counters or timers, and so on. For example, such thresholds and timers for RLF/BFR determination for BH-link/NCR-Fwd can be configured and operated separately from those for RLF/BFR determination for C-link/NCR-MT.

For example, an indication, by the NCR-MT to the gNB, of a BFR/RLF on the BH-link can be using a PRACH transmission, such as a contention-free random access (CFRA) or contention-based random access (CBRA), on the C-link or a (dedicated) PUCCH transmission with a link recovery request (LRR). For example, the PRACH or PUCCH transmission can indicate whether the indication corresponds to a BFD/RLF on the BH-link or a BFR on an SCell of NCR-MT, if applicable. For example, for indication of a BFD/RLF on the BH-link, the NCR-MT (or NCR-Fwd) can be configured separate resources, such as separate resource occasions (ROs) or separate SSB/CSI-RS indexes or separate preamble indexes, for a PRACH transmission or a dedicated PUCCH resource than those corresponding to an indication of BFR on an SCell of NCR-MT, if applicable. For example, an explicit parameter or field can be used in the LRR to distinguish an BFR/RLF for BH-link from a BFR for an SCell of NCR-MT, if applicable.

For example, when the gNB (e.g. the BS 102) determines an RLF/BFD event for NCR-Fwd on the BH-link, the gNB indicates to NCR-Fwd to go to OFF state and to not transmit/receive/forward on the BH-link and correspondingly on the Access link. For example, when NCR-MT (or NCR-Fwd) determines an RLF/BFD event for NCR-Fwd on the BH-link, the NCR-Fwd goes to OFF state and does not transmit/receive/forward on the BH-link and correspondingly on the Access link. For example, such an OFF state determination applies at least for out-of-band NCR operation. For example, such an OFF state indication/determination for NCR-Fwd due to RLF/BFD of BH-link continues until (successful) completion of link re-establishment or BFR for the BH-link.

For example, the NCR-Fwd resumes the AF operation on the Access link and BH-link upon gNB indication of the (successful) completion of the BFR procedure for the NCR- Fwd. For example, the NCR-Fwd resumes the AF operation, using previously provided beam configurations/indications for the Access link, (28 symbols) after receiving, by NCR-MT:

A last symbol of a PDCCH reception in a search space set provided by recoverySearchSpaceId for which the NCR-MT detects a DCI format with CRC scrambled by cell RNTI (C-RNTI) or modulation and coding scheme (MCS)-C-RNTI;

A last symbol of a PDCCH reception that determines a completion of a contention based random access procedure as described in clause 5.1.4a or in clause 5.1.5 of [TS 38.321][REF6]; and/or A last symbol of a PDCCH reception with a DCI format scheduling a PUSCH transmission with a same HARQ process number as for the transmission of a first PUSCH and having a toggled NDI field value, wherein the first PUSCH provides a MAC-CE with LRR for the BH-link BFD/BFR.

For example, the SCS configuration for the 28 symbols is a smallest SCS among an SCS configuration for a cell of NCR-MT/C-link and SCS configuration(s) for (active BWP, if applicable) for associated cell(s)/passbands of NCR-Fwd, as previously described.

For example, from a symbol/slot that the NCR-Fwd resumes the AF operation on the BH-link, as described herein, until receiving a dedicated beam indication for the BH-link, the NCR-Fwd can resume the AF operation on the BH-link using the previous beam/TCI/SRI determined/indicated for the BH-link before the RLF/BFD determination, or using a new beam/TCI/SRI such as q_new determined in the radio link re-establishment or BFR procedure, for example, as indicated by the corresponding PRACH or PUCCH transmission or using a BH-link beam/TCI/SRI up to NCR implementation. For example, after the (successful) completion of link re-establishment or BFR for the BH-link, the NCR-Fwd can continue to operate on the Access link based on previous beam configurations/indication, such as P/SP/AP beam configurations/indications. For example, the NCR-Fwd continues the OFF state until receiving new beam configurations/indications for one or both of BH-link beam or Access link.

In one example, an NCR is expected to support both the gNB-based or NCR-based variations to RLF/BFD determination for the BH-link. In another example, a selection of the gNB-based variation or NCR-based variation can be based on NCR capability. For example, the NCR can report a capability to support RLF/BFD determination for the BH-link based on one or both of: (i) transmission of NCR-Fwd-specific/out-of-band SRSs as previously described for the gNB-based method, and (ii) reception or measurement reporting, by NCR-MT (or NCR-Fwd), of NCR-Fwd-specific/out-of-band SSBs or CSI-RSs as previously described for the NCR-based method. For example, the NCR supports the item (i) as baseline/default behavior for an NCR supporting out-of-band operation. For example, the NCR only reports a capability or not for item (ii). For example, when the NCR supports both items (i) and (ii), the NCR can be indicated to only apply the NCR-based method or can be indicated to apply either or both gNB-based or NCR-based methods.

For example, the UE (e.g. the UE 116) can be (pre) configured via OAM or via RRC signaling, such as using a dedicated/separate RRC parameter, which method to apply. For example, a separate RRC parameter may not be used, and an indication to use which method can be based on which reference signals (for example, SSB/CSI-RS or SRS)

are configured/indicated for RLF/BFD determination for the BH-link. In one example, no selection may be provided, and reference signals for RLF/BFD determination for the BH-link can include both SSBs/CSI-RS and SRSs.

The impact due to out-of-band operation on system specifications such as [TS 38.213 v18.0.0][REF3] is evaluated.

A procedure for the NCR-MT to perform cell search, system information acquisition, random access procedure, UCI reporting, or PDCCH monitoring can be same as a corresponding one for a UE. A procedure for the NCR-MT to perform PDSCH reception, CSI-RS measurements and CSI determination, PUSCH transmission, or SRS transmission can be same as a corresponding one for a UE as described in [TS 38.214 v18.0.0][REF4].

The NCR-Fwd transmits or receives only after the NCR-MT receives on the control link an indication for one or more beams [TS 38.106][REF14] for the NCR-Fwd to use for transmissions or receptions over corresponding one or more time resources on the access link.

When the NCR-Fwd operates in a same [carrier frequency or frequency band] as the NCR-MT [or when a source reference signal for QCL properties or spatial relations of transmissions or receptions of the NCR-Fwd is included in failureDetectionResourcesToAddModList of an active BWP of the NCR-MT] and, when the NCR-MT performs a link recovery procedure for the C-link as described in Clause 6 of [TS 38.213][REF3], the NCR-Fwd does not transmit or receive until the link recovery procedure for the C-link is complete [TS 38.321][REF6].

When the NCR-MT performs a link recovery procedure for the backhaul link the NCR-Fwd does not transmit or receive until the link recovery procedure for the backhaul link is complete.

When the NCR-MT is provided a BH-BFD MAC CE that indicates a link recovery procedure for the backhaul link, the NCR-Fwd does not transmit or receive until the NCR-MT receives a BH-BFR MAC-CE that indicates the link recovery procedure for the backhaul link is complete.

The NCR can be provided, through the NCR-MT, tdd-UL-DL-ConfigurationCommon and, additionally, tdd-UL-DL-ConfigurationDedicated [for NCR-MT]. The NCR can be provided, through the NCR-MT, tdd-UL-DL-ConfigurationCommon-BH and, additionally, tdd-UL-DL-ConfigurationDedicated-BH for NCR-Fwd. The NCR-Fwd receives on the backhaul link or transmits on the access link only in symbols indicated as downlink by tdd-UL-DL-ConfigurationCommon-BH or tdd-UL-DL-ConfigurationDedicated-BH, when provided, otherwise by tdd-UL-DL-ConfigurationCommon or tdd-UL-DL-ConfigurationDedicated. The NCR-Fwd receives on the access link or transmits on the backhaul link only in symbols indicated as uplink by tdd-UL-DL-ConfigurationCommon-BH or tdd-UL-DL-ConfigurationDedicated-BH, when provided, otherwise by tdd-UL-DL-ConfigurationCommon or tdd-UL-DL-ConfigurationDedicated.

When the NCR-Fwd operates in a same [carrier frequency or frequency band] as the NCR-MT [or when the NCR-MT is not provided TCI-State-BH for the backhaul link] and, when the NCR simultaneously receives via both the control link and the backhaul link in a set of symbols, a TCI state for receptions on the backhaul link is same as a TCI state for receptions on the control link in the set of symbols. When the NCR-Fwd operates in a same [carrier frequency or frequency band] as the NCR-MT [or when the NCR-MT is not provided TCI-UL-State-BH or srs-ResourceSetToAddModList-BH for the backhaul link] and, When the NCR simultaneously transmits via both the control link and the backhaul link in a set of symbols, a spatial filter for transmissions on the backhaul link is same as a spatial filter for transmissions on the control link in the set of symbols.

When the NCR-Fwd operates in a same [carrier frequency or frequency band] as the NCR-MT [or when the NCR-MT is not provided [TCI-State-BH for the backhaul link] and the NCR does not simultaneously receive on the control link and the backhaul link:

If the NCR does not support determination of a TCI state for receptions on the backhaul link based on an indication of a TCI state by the serving cell, or if the NCR does not receive an indication of a TCI state, for receptions on the backhaul link [TS 38.321][REF6]:

If the NCR does not receive an indication of a unified TCI state for receptions by the NCR-MT, receptions on the backhaul link use same QCL parameters as the ones for PDCCH receptions in a CORESET with the lowest controlResourceSetId.

Else, receptions on the backhaul link use the QCL parameters provided by an indicated unified TCI state for receptions by the NCR-MT.

Else receptions on the backhaul link use QCL parameters provided by a TCI state in a MAC CE [TS 38.321] [REF6].

When the NCR-Fwd operates in a same [carrier frequency or frequency band] as the NCR-MT [or when the NCR-MT is not provided TCI-UL-State-BH or srs-ResourceSetToAddModList-BH for the backhaul link] and the NCR does not simultaneously transmit on the control link and the backhaul link:

If the NCR does not support determination of a spatial filter for transmissions on the backhaul link based on an indication of a unified TCI state or SRI by the serving cell, or if the NCR-MT does not receive an indication of a unified TCI state or SRI for determining a spatial filter, for transmissions on the backhaul link:

If the NCR does not receive an indication of a unified TCI state for transmissions by the NCR-MT, transmissions on the backhaul link use a same spatial filter as the one associated with the PUCCH resource with the smallest pucch-ResourceId in PUCCH-ResourceSet.

Else, transmissions on the backhaul link use a spatial filter corresponding to an indicated unified TCI state for transmissions by the NCR-MT.

Else transmissions on the backhaul link use a spatial filter corresponding to a unified TCI state or SRI provided by a MAC CE [TS 38.321][REF6].

When NCR-Fwd operates in a different [carrier frequency or frequency band] than NCR-MT or when NCR-Fwd is provided TCI-State-BH for the backhaul link:

If the NCR does not support determination of a TCI state for receptions on the backhaul link based on an indication of a TCI state for a corresponding cell of NCR-Fwd, or if the NCR does not receive an indication of a TCI state, for receptions on the backhaul link [TS 38.321][REF6]:

If the NCR does not receive an indication of a unified TCI state for receptions by the NCR-MT and NCR-Fwd, receptions on the backhaul link use same QCL parameters as the ones for PDCCH receptions in a CORESET with the lowest controlResourceSetId along with a corresponding smallest beam index [TS 38.106][REF14](or a corresponding smallest repetition/resource index when repetition is set to 'on') or a (smallest index) TCI state configured for the NCR-Fwd.

Else if the NCR does not receive an indication of a unified TCI state for receptions by the NCR-Fwd, receptions on the backhaul link use the QCL parameters provided by an indicated unified TCI state for receptions by the NCR-MT along with a corresponding indicated beam index [TS 38.106][REF14](or a corresponding indicated repetition/resource index when repetition is set to 'on');

[Else, receptions on the backhaul link use a beam index [TS 38.106][REF14] for the backhaul link, when provided]; and/or Else, receptions on the backhaul link use the QCL parameters provided by an indicated unified TCI state for receptions by the NCR-Fwd.

Else receptions on the backhaul link use QCL parameters provided by a TCI state from TCI-State-BH in a MAC CE [TS 38.321][REF6].

When NCR-Fwd operates in a different frequency band than NCR-MT or when NCR-Fwd is provided TCI-UL-State-BH or srs-ResourceSetToAddModList-BH for the backhaul link:

If the NCR does not support determination of a spatial filter for transmissions on the backhaul link based on an indication of a unified TCI state or SRI for a corresponding cell of NCR-Fwd, or if the NCR-MT does not receive an indication of a unified TCI state or SRI for determining a spatial filter, for transmissions on the backhaul link:

If the NCR does not receive an indication of a unified TCI state for transmissions by the NCR-MT and NCR-Fwd, transmissions on the backhaul link use a same spatial filter as the one associated with the PUCCH resource with the smallest pucch-ResourceId in PUCCH-ResourceSet along with a corresponding smallest beam index [TS 38.106][REF14](or a corresponding smallest repetition/resource index when repetition is set to 'on'), or as the one associated with a (smallest index) TCI state or SRS resource configured for the NCR-Fwd.

Else if the NCR does not receive an indication of a unified TCI state for transmissions by the NCR-Fwd, transmissions on the backhaul link use the QCL parameters provided by an indicated unified TCI state for receptions by the NCR-MT along with a corresponding indicated beam index [TS 38.106][REF14](or a corresponding indicated repetition/resource index when repetition is set to 'on');

[Else, transmissions on the backhaul link use a beam index [TS 38.106][REF14] for the backhaul link, when provided]; and/or Else, transmissions on the backhaul link use a spatial filter corresponding to an indicated unified TCI state for transmissions by the NCR-Fwd.

Else transmissions on the backhaul link use a spatial filter corresponding to a unified TCI state or SRI from TCI-UL-State-BH or srs-ResourceSetToAddModList-BH provided by a MAC CE [TS 38.321][REF6].

For example, a MAC-CE command for indication of recommended beams or non-desired beams for NCR-Fwd in association with NCR-MT beams can include one or more of the following fields:

T/F Resource type (2 bits)
T/F resource index ([4-8] bits)
NCR-MT beam type ([1-2] bits)
NCR-MT beam index (7 bits)
Number M of BH-link beams ([1-4] bits)

BH-link beam type ([1-2] bits)*M times (for indicating M
    BH-link beams)
BH beam index ([7] bits)*M times (for respective M
    BH-link beams)
Beam quality metric (X bits)*M times (for respective M
    BH-link beams)

Any of the variation embodiments can be utilized independently or in combination with at least one other variation embodiment. The above flowchart(s) illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of the present disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the descriptions in this application should be read as implying that any particular element, step, or function is an essential element that must be included in the claims scope. The scope of patented subject matter is defined by the claims.

What is claimed is:

1. A method for a network-controlled repeater (NCR), the method comprising:
    identifying, by an NCR mobile termination (NCR-MT) entity:
        first information for first time-division duplex (TDD) uplink-downlink (UL-DL) patterns for a first cell associated with an NCR control link (C-link), and
        second information for second TDD UL-DL patterns for a second cell associated with an NCR backhaul link (BH-link);
    receiving, by the NCR-MT entity on the NCR C-link, downlink signals or channels on the first cell in first downlink (D) or flexible (F) symbols or slots of the first TDD UL-DL patterns; and
    receiving, by an NCR forwarding (NCR-Fwd) entity on the NCR BH-link, radio frequency (RF) signals on the second cell in second D or F symbols or slots of the second TDD UL-DL patterns, wherein:
        the first cell is associated with a first carrier frequency,
        the second cell is associated with a second carrier frequency,
        the first carrier frequency is different from the second carrier frequency, and
        the first TDD UL-DL patterns are different from the second TDD UL-DL patterns.

2. The method of claim 1, wherein the second information is provided in:
    a system information block (SIB),
    operation and management (OAM) information,
    a radio resource control (RRC) signaling, or a side control information for beam indication for an NCR access link (AC-link) associated with the second cell.

3. The method of claim 1, further comprising:
    identifying, by the NCR-MT entity:
        the NCR-MT entity to be a reference entity, or the first cell to be a reference cell, for a TDD UL-DL determination for the NCR; and
        a symbol or slot of the second TDD UL-DL patterns to be (i) among the second D or F symbols or slots for the second cell or (ii) a symbol or slot without amplify-and-forward by the NCR-Fwd entity on the second cell, when the symbol or slot is indicated as D or F for the first cell by one of:
            radio resource control (RRC) information providing the first TDD UL-DL patterns,
            a downlink control information (DCI) format indicating the first TDD UL-DL patterns,
            RRC information for reception of a downlink signal or channel in the symbol or slot, or
            a DCI format scheduling a downlink signal or channel in the symbol or slot.

4. The method of claim 1, further comprising:
    receiving, by the NCR-MT entity:
        third information for reception, by the NCR-MT entity, of a downlink signal or channel on the first cell in a first D or F symbol or slot of the first TDD UL-DL patterns, and
        fourth information for transmission, by the NCR-Fwd entity, of an RF signal on the second cell in a second uplink (U) or F symbol or slot of the second TDD UL-DL patterns, wherein the second U or F symbol or slot overlaps with the first D or F symbol;
    receiving, by the NCR-MT entity, the downlink signal or channel on the first cell in the first D or F symbol or slot; and
    skip transmitting, by the NCR-Fwd entity, the RF signal on the second cell in the second U or F symbol or slot when at least one of:
        the NCR-MT entity is predetermined to be prioritized over the NCR-Fwd entity,
        the downlink signal or channel starts before the RF signal, and
        the downlink signal or channel is a high-priority signal or channel, and the RF signal is associated with a beam indication on an NCR Access link (AC-link), wherein the beam indication has low priority and has no priority flag.

5. The method of claim 1, further comprising:
    identifying, by the NCR-MT entity, second uplink (U) symbols or slots of the second TDD UL-DL patterns for the second cell, wherein the second U symbols or slots overlap with the first D symbols or slots of the first TDD UL-DL patterns for the first cell;
    receiving, by the NCR-MT entity, a downlink signal or channel on the first cell in a first D symbol or slot from the first D symbols or slots; and
    transmitting, by the NCR-Fwd entity, a first RF signal on the second cell in a second U symbol or slot, from the second U symbols or slots, at least when:
        the first cell and the second cell are associated with different frequency bands, or
        the NCR-MT indicates a capability for simultaneous reception by the NCR-MT entity and transmission by the NCR-Fwd entity on the first cell and on the second cell, respectively.

6. The method of claim 5, further comprising:

transmitting, by the NCR-MT entity:

first assistance information of recommended or non-desired beams for transmission or reception on (i) the first cell by the NCR-MT entity on the NCR C-link or (ii) the second cell by the NCR-Fwd entity on the NCR BH-link, or second assistance information of (i) recommended uplink power spectral density (PSD) range or uplink power control parameters for the NCR-MT entity or (ii) recommended amplification gain or output power for the NCR-Fwd entity, wherein the first assistance information or the second assistance information is associated at least with the second U symbols or slots.

7. The method of claim 5, further comprising:

receiving, by the NCR-MT entity, third information for first and second uplink power control parameters for transmissions by (i) the NCR-MT entity on the NCR C-link or (ii) the NCR-Fwd entity on the NCR BH-link, wherein:

the first uplink power control parameters are associated with the second U symbols or slots, and the second uplink power control parameters are associated with U symbols or slots of the first TDD UL-DL patterns, except for the second U symbols or slots; and transmitting, by the NCR-MT entity, an uplink signal or channel on the first cell using:

the first uplink power control parameters when the uplink signal or channel overlaps with the second U symbols or slots, and the second uplink power control parameters when the uplink signal or channel does not overlap with the second U symbols or slots; or transmitting, by the NCR-Fwd entity, a second RF signal on the second cell using:

the first uplink power control parameters when the second RF signal overlaps with the second U symbols or slots, and the second uplink power control parameters when the second RF signal does not overlap with the second U symbols or slots.

8. A network-controlled repeater (NCR) comprising:

a processor of an NCR mobile termination (NCR-MT) entity configured to identify:

first information for first time-division duplex (TDD) uplink-downlink (UL-DL) patterns for a first cell associated with an NCR control link (C-link), and second information for second TDD UL-DL patterns for a second cell associated with an NCR backhaul link (BH-link);

a transceiver of the NCR-MT entity operably coupled with the processor of the NCR-MT entity, the transceiver of the NCR-MT entity configured to receive, on the NCR C-link, downlink signals or channels on the first cell in first downlink (D) or flexible (F) symbols or slots of the first TDD UL-DL patterns; and a transceiver of an NCR forwarding (NCR-Fwd) entity operably coupled with the processor of the NCR-MT entity, the transceiver of the NCR-Fwd entity configured to receive, on the NCR BH-link, radio frequency (RF) signals on the second cell in second D or F symbols or slots of the second TDD UL-DL patterns, wherein:

the first cell is associated with a first carrier frequency, the second cell is associated with a second carrier frequency, the first carrier frequency is different from the second carrier frequency, and the first TDD UL-DL patterns are different from the second TDD UL-DL patterns.

9. The NCR of claim 8, wherein the second information is provided in:

a system information block (SIB), operation and management (OAM) information, a radio resource control (RRC) signaling, or a side control information for beam indication for an NCR access link (AC-link) associated with the second cell.

10. The NCR of claim 8, wherein the processor of the NCR-MT entity is further configured to identify:

the NCR-MT entity to be a reference entity, or the first cell to be a reference cell, for a TDD UL-DL determination for the NCR; and a symbol or slot of the second TDD UL-DL patterns to be (i) among the second D or F symbols or slots for the second cell or (ii) a symbol or slot without amplify-and-forward by the NCR-Fwd entity on the second cell, when the symbol or slot is indicated as D or F for the first cell by one of:

radio resource control (RRC) information providing the first TDD UL-DL patterns, a downlink control information (DCI) format indicating the first TDD UL-DL patterns, RRC information for reception of a downlink signal or channel in the symbol or slot, or a DCI format scheduling a downlink signal or channel in the symbol or slot.

11. The NCR of claim 8, wherein:

the transceiver of the NCR-MT entity is further configured to receive:

third information for reception, by the NCR-MT entity, of a downlink signal or channel on the first cell in a first D or F symbol or slot of the first TDD UL-DL patterns, fourth information for transmission, by the NCR-Fwd entity, of an RF signal on the second cell in a second uplink (U) or F symbol or slot of the second TDD UL-DL patterns, wherein the second U or F symbol or slot overlaps with the first D or F symbol, and the downlink signal or channel on the first cell in the first D or F symbol or slot; and the transceiver of the NCR-Fwd entity is further configured to skip transmission of the RF signal on the second cell in the second U or F symbol or slot when at least one of:

the NCR-MT entity is predetermined to be prioritized over the NCR-Fwd entity, the downlink signal or channel starts before the RF signal, and the downlink signal or channel is a high-priority signal or channel, and the RF signal is associated with a low-priority beam indication on an NCR Access link (AC-link), wherein the beam indication has low priority and has no priority flag.

12. The NCR of claim 8, wherein:

the processor of the NCR-MT entity is further configured to identify second uplink (U) symbols or slots of the second TDD UL-DL patterns for the second cell, wherein the second U symbols or slots overlap with the first D symbols or slots of the first TDD UL-DL patterns for the first cell, the transceiver of the NCR-MT entity is further config-
ured to receive a downlink signal or channel on the first
cell in a first D symbol or slot from the first D symbols
or slots, and
the transceiver of the NCR-Fwd entity is further config-
ured to transmit a first RF signal on the second cell in
a second U symbol or slot, from the second U symbols
or slots, at least when:
  the first cell and the second cell are associated with
    different frequency bands, or
  the NCR-MT entity indicates a capability for simulta-
    neous reception by the NCR-MT entity and trans-
    mission by the NCR-Fwd entity on the first cell and
    on the second cell, respectively.
13. The NCR of claim 12, wherein:
the transceiver of the NCR-MT entity is further config-
ured to transmit:
  first assistance information of recommended or non-
    desired beams for transmission or reception on (i) the
    first cell by the NCR-MT entity on the NCR C-link
    or (ii) the second cell by the NCR-Fwd entity on the
    NCR BH-link, or
  second assistance information of (i) recommended
    uplink power spectral density (PSD) range or uplink
    power control parameters for the NCR-MT entity or
    (ii) recommended amplification gain or output power
    for the NCR-Fwd entity; and
the first assistance information or the second assistance
  information is associated at least with the second U
  symbols or slots.
14. The NCR of claim 12, wherein:
the transceiver of the NCR-MT entity is further config-
ured to receive third information for first and second
uplink power control parameters for transmission by (i)
the NCR-MT entity on the NCR C-link or (ii) the
NCR-Fwd entity on the NCR BH-link, wherein:
  the first uplink power control parameters are associated
    with the second U symbols or slots, and
  the second uplink power control parameters are asso-
    ciated with U symbols or slots of the first TDD
    UL-DL patterns, except for the second U symbols or
    slots; and
the transceiver of the NCR-MT entity is further config-
ured to transmit an uplink signal or channel on the first
cell using:
  the first uplink power control parameters when the
    uplink signal or channel overlaps with the second U
    symbols or slots, and
  the second uplink power control parameters when the
    uplink signal or channel does not overlap with the
    second U symbols or slots; or
the transceiver of the NCR-Fwd entity is further config-
ured to transmit a second RF signal on the second cell
using:
  the first uplink power control parameters when the
    second RF signal overlaps with the second U sym-
    bols or slots, and
  the second uplink power control parameters when the
    second RF signal does not overlap with the second U
    symbols or slots.
15. A base station comprising:
a processor configured to identify:
  first information for first time-division duplex (TDD)
    uplink-downlink (UL-DL) patterns for a first cell
    associated with a control link (C-link) of a network-
    controlled repeater (NCR), and second information for second TDD UL-DL patterns
  for a second cell associated with a backhaul link
  (BH-link) of the NCR; and
a transceiver operably coupled with the processor, the
  transceiver configured to:
transmit, to an NCR mobile termination (NCR-MT)
  entity on the NCR C-link, downlink signals or chan-
  nels on the first cell in first downlink (D) or flexible
  (F) symbols or slots of the first TDD UL-DL pat-
  terns, and
transmit, to an NCR forwarding (NCR-Fwd) entity on
  the NCR BH-link, radio frequency (RF) signals on
  the second cell in second D or F symbols or slots of
  the second TDD UL-DL patterns,
wherein:
  the first cell is associated with a first carrier frequency,
  the second cell is associated with a second carrier
    frequency,
  the first carrier frequency is different from the second
    carrier frequency, and
  the first TDD UL-DL patterns are different from the
    second TDD UL-DL patterns.
16. The base station of claim 15, wherein the second
information is provided in:
a system information block (SIB),
operation and management (OAM) information,
a radio resource control (RRC) signaling, or
a side control information for beam indication for an NCR
  access link (AC-link) associated with the second cell.
17. The base station of claim 15, wherein the processor is
further configured to identify:
  the NCR-MT entity to be a reference entity, or the first cell
    to be a reference cell, for TDD UL-DL determination
    for the NCR;
  a symbol or slot of the second TDD UL-DL patterns to be
    (i) among the second D or F symbols or slots for the
    second cell or (ii) a symbol or slot without amplify-
    and-forward by the NCR-Fwd entity on the second cell,
    when the symbol or slot is indicated as D or F for the
    first cell by one of:
    radio resource control (RRC) information providing the
      first TDD UL-DL patterns,
    a downlink control information (DCI) format indicat-
      ing the first TDD UL-DL patterns,
    RRC information for transmission of a downlink signal
      or channel in the symbol or slot, or
    a DCI format scheduling a downlink signal or channel
      in the symbol or slot.
18. The base station of claim 15, wherein:
the transceiver is further configured to transmit, to the
  NCR-MT entity:
  third information for transmission, to the NCR-MT
    entity, of a downlink signal or channel on the first
    cell in a first D or F symbol or slot of the first TDD
    UL-DL patterns,
  fourth information for reception, from the NCR-Fwd
    entity, of an RF signal on the second cell in a second
    uplink (U) or F symbol or slot of the second TDD
    UL-DL patterns, wherein the second U or F symbol
    or slot overlaps with the first D or F symbol, and
  the downlink signal or channel on the first cell in the
    first D or F symbol or slot, and
the transceiver is further configured to skip reception,
  from the NCR-Fwd entity, of the RF signal on the
  second cell in the second U or F symbol or slot when
  at least one of:

the NCR-MT entity is predetermined to be prioritized over the NCR-Fwd entity, the downlink signal or channel starts before the RF signal, and the downlink signal or channel is a high-priority signal or channel, and the RF signal is associated with a low-priority beam indication on an NCR Access link (AC-link), wherein the beam indication has low priority and has no priority flag.

19. The base station of claim 15, wherein:

the processor is further configured to identify second uplink (U) symbols or slots of the second TDD UL-DL patterns for the second cell, wherein the second U symbols or slots overlap with the first D symbols or slots of the first TDD UL-DL patterns for the first cell, the transceiver is further configured to:

transmit, to the NCR-MT entity, a downlink signal or channel on the first cell in a first D symbol or slot from the first D symbols or slots, and receive, from the NCR-Fwd entity, a first RF signal on the second cell in a second U symbol or slot, from the second U symbols or slots, at least when:

the first cell and the second cell are associated with different frequency bands, or the NCR-MT entity indicates a capability for simultaneous reception by the NCR-MT entity and transmission by the NCR-Fwd entity on the first cell and on the second cell, respectively.

20. The base station of claim 19, wherein the transceiver is further configured to:

transmit, to the NCR-MT entity, third information for first and second uplink power control parameters for transmission by (i) the NCR-MT entity on the NCR C-link or (ii) the NCR-Fwd entity on the NCR BH-link, wherein:

the first uplink power control parameters are associated with the second U symbols or slots, and the second uplink power control parameters are associated with U symbols or slots of the first TDD UL-DL patterns, except for the second U symbols or slots; and receive, from the NCR-MT entity, an uplink signal or channel on the first cell using:

the first uplink power control parameters when the uplink signal or channel overlaps with the second U symbols or slots, and the second uplink power control parameters, when the uplink signal or channel does not overlap with the second U symbols or slots; or receive, from the NCR-Fwd entity, a second RF signal on the second cell using:

the first uplink power control parameters when the second RF signal overlaps with the second U symbols or slots, and the second uplink power control parameters when the second RF signal does not overlap with the second U symbols or slots.

* * * * *